US006772433B1

(12) United States Patent
LaJoie et al.

(10) Patent No.: US 6,772,433 B1
(45) Date of Patent: Aug. 3, 2004

(54) INTERACTIVE PROGRAM GUIDE FOR DESIGNATING INFORMATION ON AN INTERACTIVE PROGRAM GUIDE DISPLAY

(75) Inventors: Mike L. LaJoie, Sherman Oaks, CA (US); Joseph G. Buehl, Van Nuys, CA (US); Haig H. Krakirian, Glendale, CA (US); Stephen M. Johnson, Burbank, CA (US); Ralph W. Brown, Boulder, CO (US)

(73) Assignee: Time Warner Entertainment Company, L.P., New York, NY (US)

( * ) Notice: Subject to any disclaimer, the term of this patent is extended or adjusted under 35 U.S.C. 154(b) by 0 days.

(21) Appl. No.: 09/185,179

(22) Filed: Nov. 3, 1998

Related U.S. Application Data

(63) Continuation of application No. 08/802,833, filed on Feb. 19, 1997, now Pat. No. 5,850,218.

(51) Int. Cl.[7] .................. H04N 5/445; H04N 7/173; G06F 3/00; G06F 13/00

(52) U.S. Cl. .................. 725/52; 725/33; 725/58; 725/104; 345/767; 345/786

(58) Field of Search .................. 725/44, 52, 53, 725/38; 345/830, 828, 829, 831, 784, 786

(56) References Cited

U.S. PATENT DOCUMENTS

| | | | |
|---|---|---|---|
| 4,203,130 A | 5/1980 | Doumit et al. |
| 4,264,925 A | 4/1981 | Freeman et al. |
| 4,381,522 A | 4/1983 | Lambert |
| 4,602,279 A | 7/1986 | Freeman |
| 4,641,205 A | 2/1987 | Beyers, Jr. |
| 4,691,351 A | 9/1987 | Hayashi et al. |
| 4,706,121 A | 11/1987 | Young |
| 4,751,578 A | 6/1988 | Reiter et al. |
| 4,807,052 A | 2/1989 | Amano |
| 4,862,268 A | 8/1989 | Campbell et al. |
| 4,890,321 A | 12/1989 | Seth-Smith et al. |
| 4,896,347 A | 1/1990 | Auber |
| 4,930,158 A | 5/1990 | Vogel |
| 4,963,994 A | 10/1990 | Levine |
| 4,977,455 A | 12/1990 | Young |
| 4,991,011 A | 2/1991 | Johnson et al. |
| 5,003,384 A | 3/1991 | Durden et al. |
| 5,027,400 A | 6/1991 | Baji et al. |
| 5,038,211 A | 8/1991 | Hallenbeck |
| 5,047,867 A | 9/1991 | Strubbe et al. |
| 5,093,718 A | 3/1992 | Hoarty et al. |

(List continued on next page.)

Primary Examiner—Vivek Srivastava
Assistant Examiner—Andrew Y. Koenig
(74) Attorney, Agent, or Firm—Fish & Neave; Garry J. Tuma

(57) ABSTRACT

A system and method are provided for providing a full service cable television system. The cable system incorporates a digital and analog transmission architecture capable of delivering a high number of high quality television programs, advanced cable services, and online services to a subscriber's home. The cable system comprises a cable headend, at least one fiber transport, at least one distribution hub, at least one hybrid fiber coax plant, and a plurality of set-top terminals. Programs and services are transmitted to the set-top terminals in both digital and analog formats to maintain downward compatibility with existing systems. The set-top terminal incorporates a central processing unit, a unified memory architecture, a memory management unit, communications circuitry, I/O control circuitry, and audio and video output circuitry. Through these components the set-top terminal provides advanced cable services such as a comprehensive channel navigator, an interactive program guide, Impulse Pay-Per-View activation, Near-Video-On-Demand and Video-On-Demand programming, and advanced configuration controls. The set-top terminal also provides online services such as World Wide Web browsing, Internet E-Mail, and Home Shopping.

20 Claims, 35 Drawing Sheets

U.S. PATENT DOCUMENTS

| | | |
|---|---|---|
| 5,144,663 A | 9/1992 | Kudelski et al. |
| 5,151,782 A | 9/1992 | Ferraro |
| 5,151,789 A | 9/1992 | Young |
| 5,168,353 A | 12/1992 | Walker et al. |
| 5,172,413 A | 12/1992 | Bradley et al. |
| 5,182,640 A | 1/1993 | Takano |
| 5,200,823 A | 4/1993 | Yoneda et al. |
| 5,220,420 A | 6/1993 | Hoarty et al. |
| 5,223,924 A | 6/1993 | Strubbe |
| 5,245,420 A | 9/1993 | Harney et al. |
| 5,247,364 A | 9/1993 | Banker et al. |
| 5,253,066 A | 10/1993 | Vogel |
| 5,293,357 A | 3/1994 | Hallenbeck |
| 5,301,028 A | 4/1994 | Banker et al. |
| 5,307,173 A | 4/1994 | Yuen et al. |
| 5,317,391 A | 5/1994 | Banker et al. |
| 5,323,240 A | 6/1994 | Amano et al. |
| 5,335,079 A | 8/1994 | Yuen et al. |
| 5,335,277 A | 8/1994 | Harvey et al. |
| 5,353,121 A | 10/1994 | Young et al. |
| 5,357,276 A | 10/1994 | Banker et al. |
| 5,359,601 A | 10/1994 | Wasilewski et al. |
| 5,361,173 A | 11/1994 | Ishii et al. |
| 5,371,795 A | 12/1994 | Vogel |
| 5,382,983 A | 1/1995 | Kwoh et al. |
| 5,400,401 A | 3/1995 | Wasilewski et al. |
| 5,404,393 A | 4/1995 | Remillard |
| 5,410,343 A | 4/1995 | Coddington et al. |
| 5,410,344 A | 4/1995 | Graves et al. |
| 5,412,416 A | 5/1995 | Nemirofsky |
| 5,412,720 A | 5/1995 | Hoarty |
| 5,416,508 A | 5/1995 | Sakuma et al. |
| 5,418,782 A | 5/1995 | Wasilewski et al. |
| 5,425,101 A | 6/1995 | Woo et al. |
| 5,434,626 A | 7/1995 | Hayashi et al. |
| 5,436,676 A | 7/1995 | Pint et al. |
| 5,440,336 A | 8/1995 | Buhro et al. |
| 5,444,499 A | 8/1995 | Saitoh |
| 5,446,488 A | 8/1995 | Vogel |
| 5,448,568 A | 9/1995 | Delpuch et al. |
| 5,459,506 A | 10/1995 | Bushnell |
| 5,459,522 A | 10/1995 | Pint |
| 5,459,789 A | 10/1995 | Tamer et al. |
| 5,465,113 A | 11/1995 | Gilboy |
| 5,465,385 A | 11/1995 | Ohga et al. |
| 5,469,206 A | 11/1995 | Strubbe et al. |
| 5,473,609 A | 12/1995 | Chaney |
| 5,477,262 A | 12/1995 | Banker et al. |
| 5,479,266 A | 12/1995 | Young et al. |
| 5,479,268 A | 12/1995 | Young et al. |
| 5,481,542 A | 1/1996 | Logston et al. |
| 5,483,278 A | 1/1996 | Strubbe et al. |
| 5,485,221 A | 1/1996 | Banker et al. |
| 5,491,748 A | 2/1996 | Auld, Jr. et al. |
| 5,493,339 A | 2/1996 | Birch et al. |
| 5,495,295 A | 2/1996 | Long |
| 5,497,187 A | 3/1996 | Banker et al. |
| 5,499,046 A | 3/1996 | Schiller et al. |
| 5,499,103 A | 3/1996 | Mankovitz |
| 5,502,504 A | 3/1996 | Marshall et al. |
| 5,508,815 A | 4/1996 | Levine |
| 5,515,106 A | 5/1996 | Chaney et al. |
| 5,515,173 A | 5/1996 | Mankovitz et al. |
| 5,517,257 A | 5/1996 | Dunn et al. |
| 5,528,304 A | 6/1996 | Cherrick et al. |
| 5,532,732 A | 7/1996 | Yuen et al. |
| 5,532,754 A | 7/1996 | Young et al. |
| 5,534,911 A | 7/1996 | Levitan |
| 5,539,391 A | 7/1996 | Yuen |
| 5,539,822 A | 7/1996 | Lett |
| 5,539,920 A | 7/1996 | Menand et al. |
| 5,541,738 A | 7/1996 | Mankovitz |
| 5,543,852 A | 8/1996 | Yuen et al. |
| 5,543,929 A | 8/1996 | Mankovitz et al. |
| 5,544,354 A | 8/1996 | May et al. |
| 5,548,345 A * | 8/1996 | Brian et al. .................. 725/27 |
| 5,548,532 A | 8/1996 | Menand et al. |
| 5,550,576 A | 8/1996 | Klosterman |
| 5,550,579 A | 8/1996 | Martinez |
| 5,552,837 A | 9/1996 | Mankovitz |
| 5,555,441 A | 9/1996 | Haddad |
| 5,555,549 A | 9/1996 | Nakaishi |
| 5,559,548 A | 9/1996 | Davis et al. |
| 5,559,550 A | 9/1996 | Mankovitz |
| 5,563,648 A | 10/1996 | Menand et al. |
| 5,576,755 A | 11/1996 | Davis et al. |
| 5,579,055 A | 11/1996 | Hamilton et al. |
| 5,579,057 A | 11/1996 | Banker et al. |
| 5,581,614 A | 12/1996 | Ng et al. |
| 5,583,560 A | 12/1996 | Florin et al. |
| 5,585,838 A | 12/1996 | Lawler et al. |
| 5,585,865 A | 12/1996 | Amano et al. |
| 5,585,866 A | 12/1996 | Miller et al. |
| 5,589,872 A | 12/1996 | Martinez |
| 5,589,892 A | 12/1996 | Knee et al. |
| 5,592,551 A | 1/1997 | Lett et al. |
| 5,594,509 A | 1/1997 | Florin et al. |
| 5,596,361 A | 1/1997 | Martinez |
| 5,600,378 A | 2/1997 | Wasilewski |
| 5,619,247 A | 4/1997 | Russo |
| 5,619,274 A | 4/1997 | Roop et al. |
| 5,621,579 A | 4/1997 | Yuen |
| 5,623,613 A | 4/1997 | Rowe et al. |
| 5,625,406 A | 4/1997 | Newberry et al. |
| 5,629,733 A | 5/1997 | Youman et al. |
| 5,630,119 A | 5/1997 | Aristides et al. |
| 5,633,683 A | 5/1997 | Rosengren et al. |
| 5,635,978 A | 6/1997 | Alten et al. |
| 5,635,989 A | 6/1997 | Rothmuller |
| 5,640,484 A | 6/1997 | Mankovitz |
| 5,642,153 A | 6/1997 | Chaney et al. |
| 5,648,824 A | 7/1997 | Dunn et al. |
| 5,654,748 A | 8/1997 | Matthews, III |
| 5,657,072 A | 8/1997 | Aristides et al. |
| 5,657,414 A | 8/1997 | Lett et al. |
| 5,659,367 A | 8/1997 | Yuen |
| 5,671,276 A | 9/1997 | Eyer et al. |
| 5,671,411 A | 9/1997 | Watts et al. |
| 5,673,089 A | 9/1997 | Yuen et al. |
| 5,677,708 A | 10/1997 | Matthews, III et al. |
| 5,684,525 A | 11/1997 | Klosterman |
| 5,734,597 A * | 3/1998 | Molnar et al. .............. 708/112 |
| 5,809,204 A | 9/1998 | Young et al. |
| 5,880,768 A * | 3/1999 | Lemmons et al. ............ 725/41 |
| 5,969,748 A * | 10/1999 | Casement et al. ............ 725/27 |

* cited by examiner

FIG. 17

Bravo BRAV 147

New York Ballet
4:00 - 4:30

New York Ballet Company
presents "The Nutcracker"

| Tu. 9/17 | ◁ 4:00pm | 4:30 pm | 5:00pm |
|---|---|---|---|
| KMEX 123 | Sally Jessie Raphael | | Sally |
| CNN 124 | ◁World Report | Money Line | Wor |
| BRAV 147 | New York Ballet | Rembrandt | OFF AIR |
| LIFE 147 | OFF AIR | Your Health | Pets |
| KNBC 4 | ◁The Simpsons | Married With... | Encounters | The |

4:19:23 pm   Currently on Ch. 2

Browse by: △ Time  B Theme  © Title

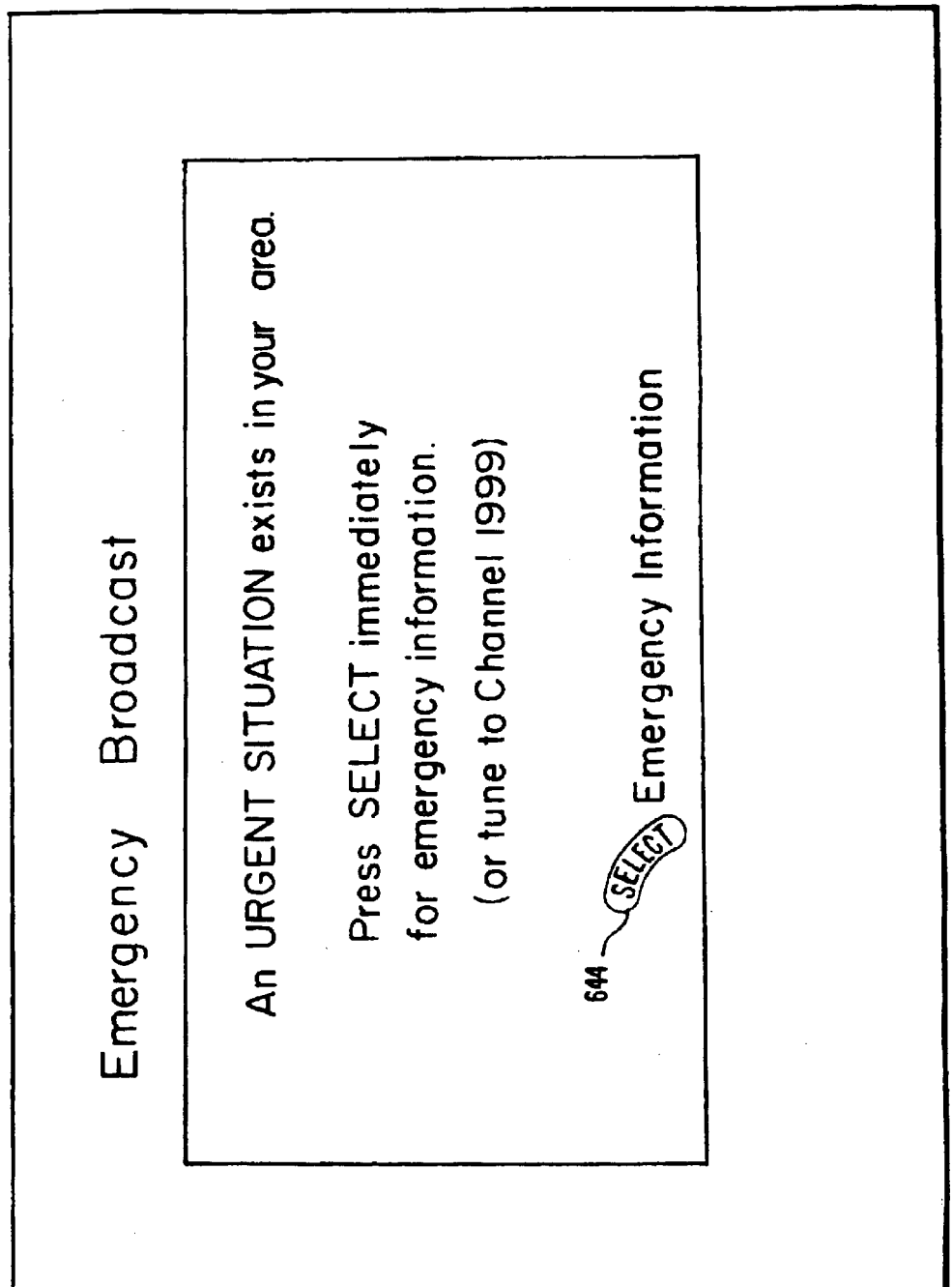

INTERACTIVE PROGRAM GUIDE FOR DESIGNATING INFORMATION ON AN INTERACTIVE PROGRAM GUIDE DISPLAY

CROSS REFERENCE TO RELATED APPLICATION

This is a continuation of commonly assigned U.S. patent application Ser. No. 08/802,833, filed Feb. 19, 1997, now U.S. Pat. No. 5,850,218.

BACKGROUND OF THE INVENTION

This invention relates generally to television systems. More particularly, this invention relates to full service television systems that use advanced storage, communications, and processing techniques to provide a variety of television services including audio and audiovisual programming, advanced navigation controls, interactive program guides, Impulse Pay-Per-View activation, Near-Video-On-Demand programming, Video-On-Demand programming, advanced configuration controls, and online services.

With recent advances in storage, communication, and processing technologies, many present-day television systems are becoming antiquated. This is especially true of many cable television systems. Traditional methods of broadcasting television programs and services in such cable television systems suffer from an inability to deliver a high number of high quality television signals on a single coaxial cable. Many existing television systems also cannot provide the advanced television services desired by their subscribers, such as, for example, a comprehensive channel navigator, an interactive program guide, Impulse Pay-Per-View activation, Near-Video-On-Demand programming, Video-On-Demand programming, and advanced configuration controls. Furthermore, most modern television systems have no provisions whatsoever for supplying services such as World Wide Web browsing, Internet E-Mail, and online services.

In view of the foregoing, it would be desirable to provide a full service television system capable of delivering a high number of high quality television signals.

It would also be desirable to provide a full service television system capable of using advanced communication techniques to deliver a high number of high quality television signals.

It would further be desirable to provide a full service television system capable of sustaining two-way communication between a cable service provider and a cable service subscriber.

It would even further be desirable to provide a full service television system capable of delivering advanced television services such as a comprehensive channel navigator, an interactive program guide, Impulse Pay-Per-View activation, Near-Video-On-Demand programming, Video-On-Demand programming, and advanced configuration controls.

It would still further be desirable to provide a full service television system capable of delivering services such as World Wide Web browsing, Internet E-Mail, and online services.

SUMMARY OF THE INVENTION

It is therefore an object of this invention to provide a full service television system capable of delivering a high number of high quality television signals.

It is also an object of this invention to provide a full service television system capable of using advanced communication techniques to deliver a high number of high quality television signals.

It is a further object of this invention to provide a full service television system capable of sustaining two-way communication between a cable service provider and a cable service subscriber.

It is a still further object of this invention to provide a full service television system capable of delivering advanced television services such as a comprehensive channel navigator, an interactive program guide, Impulse Pay-Per-View activation, Near-Video-On-Demand programming, Video-On-Demand programming, and advanced configuration controls.

It is an even further object of this invention to provide a full service television system capable of delivering services such as World Wide Web browsing, Internet E-Mail, and online services.

In accordance with these and other objects of the present invention, a full service television system is provided that includes digital and analog programs and services, an advanced communications network, and a fully programmable set-top terminal capable of implementing advanced television and online services.

In the preferred embodiments of the present invention, the full service television system is implemented as a cable television system. Although a cable television system is described herein, the present invention, and all of its features, may be implemented in other forms, such as, for example, a Direct Broadcast Satellite (DBS) system, a Multi-channel Multi-point Distribution System (MMDS), an Asymmetric Digital Subscriber Loop (ADSL) system, a Local Area Network (LAN) system, or a Wide Area Network (WAN) system.

Preferred implementations of the cable television system of the present invention include a cable headend, at least one fiber transport, at least one distribution hub, at least one hybrid fiber coax plant, and a plurality of set-top terminals. The cable headend provides programs, services, and overall system control of the cable television system. The fiber transports, distribution hubs, and hybrid fiber coax plants provide an advanced communication network for the cable television system. The set-top terminals provide interfaces, processing, and storage capability in a subscriber's home to facilitate the implementation of advanced television and online services.

To provide programs, services, and overall system control of the cable television system of the preferred embodiments of the present invention, the cable headend incorporates digital and analog satellite receivers, a broadcast cable gateway, integrated receiver decoders, analog scrambling and modulation, application and media servers, an addressable controller, a digital switch or multiplexer, and an interactive cable gateway. Although these elements will be described herein as distinct functions, each can be implemented as a portion of a single device, as a single device, or as a composition of devices.

Programs and services provided by the cable headend are supplied to the cable headend primarily through analog and digital satellite broadcasts and through digital data storage. The cable headend may also receive programs and services from sources such as, for example, analog off-air signals, digital off-air signals, and locally originated signals.

Analog and digital satellite broadcasts are received at the cable headend by a plurality of analog and digital satellite receivers. Integrated receiver decoders within the cable headend control the reception of the analog satellite broadcasts, and analog scrambling and modulation converts the analog signals into a format suitable for transmission over the cable system's communication network. Similarly, a broadcast cable gateway within the cable headend controls the reception of the digital satellite broadcasts and converts the digital signals into a format suitable for transmission over the cable system's communication network.

Programs and services are also supplied to the cable headend through digitally stored data in application and media servers. Programs and services stored in the application and media servers are first transmitted to the cable system's communication network through a digital switch or multiplexer and then through an interactive cable gateway. The digital switch or multiplexer can be implemented through an Asynchronous Transfer Mode switch, a Digital Video Broadcast Asynchronous Serial Interface (DVB ASI), or other suitable means. The application servers can be connected directly to the digital switch or multiplexer, or can be connected to the digital switch or multiplexer via an intermediate network. The media servers, however, should preferably be connected to the digital switch or multiplexer directly because of the high bandwidth requirements of the media servers and the limited bandwidth capabilities of present day networks. Programs and services transmitted through the digital switch or multiplexer from the application and media servers are converted by the interactive cable gateway to a format suitable for transmission in the cable system's communication network. By connecting the application and media servers to the interactive cable gateway through the digital switch or multiplexer, a cable system operator can add new application and media servers to the cable television system as needed.

Overall system control is provided by the cable headend primarily through an addressable controller. The functions performed by the addressable controller can include, for example, control of all equipment interaction at the cable headend, management of the cable television system's communication network, control of all equipment located in the system's communication network, configuration and management of set-top terminals (preferably both those of the present invention and those that may later be introduced into the marketplace), operational control of the distribution hubs, operational control of the interactive cable gateway, and distribution control of programs and services from the integrated receiver decoders, broadcast cable gateway, application servers, and media servers to the set-top terminals.

The communication network of the cable television systems of the preferred embodiments of the present invention includes at least one fiber transport, at least one distribution hub, and at least one hybrid fiber coax plant. The communication network preferably includes analog channels with vertical blanking interval (VBI) signals, forward application transport (FAT) channels, forward data channels (FDC), and reverse data channels (RDC). Analog channels with VBI signals maintain downward compatibility with existing cable television equipment. FAT channels provide set-top terminals with compressed digital content such as, for example, video, audio, applications, control message, and broadcast data. Forward data channels carry to the set-top terminals out-of-band Internet protocol (IP) datagrams containing messages regarding, for example, conditional access, entitlement, broadcast data, network management, application downloads, variable bit-rate (VBR) downloads, external device data services, or general matters. Furthermore, all interactive program guide data is carried to the set-top terminals exclusively over the out-of-band forward data channels. Reverse data channels carry IP datagram messages from the set-top terminals to equipment within the cable headend. These messages can relate to, for example, network management, external device data services, program/ service control and activation, or general matters.

The fiber transports carry signals between the cable headend and the distribution hubs and are preferably each physically configured in a ring connecting typically five distribution hubs to the cable headend. Each of the fiber transports includes a bundle of at least one fiber optic cable, at least one of which is used by each distribution hub on the physical ring of each fiber transport. By using selected fiber optic cables within the fiber transport's bundle, the distribution hubs may be connected to the cable headend either through adjacent hubs in a logical "ring" configuration, directly to the headend in a logical "star" configuration, or in any other logical configuration.

The distribution hubs comprise a plurality of data channel gateways, each of which receives and transmits data messages between the cable headend and the set-top terminals. The data channel gateways provide routing functions, modulation functions on the signals to the set-top terminals, and demodulation functions on the signals from the set-top terminals. The routing, modulation, and demodulation functions performed by the data channel gateways are all controllable by the addressable controller within the cable headend.

The hybrid fiber coax plants connect the distribution hubs to the set-top terminals and each includes fiber optic cable, a node, and a plurality of coaxial cables. The node in each hybrid fiber coax plant converts optical signals to electrical signals and electrical signals to optical signals such that two-way communication is maintained over the fiber optic and coaxial cables connecting the distribution hubs and set-top terminals.

The digital and analog programs and services furnished by the cable headend are presented to cable subscribers by set-top terminals within their homes. In the preferred embodiments of the present invention, the set-top terminals each include a central processing unit, memory, a memory management unit, communications circuitry, I/O control circuitry, and audio and video output circuitry. Each set-top terminal is controlled by the central processing unit which executes operating system and application software stored within memory. The memory management unit simplifies and oversees the interaction between the central processing unit and memory. Communication circuitry in the set-top terminal receives, demodulates, decrypts, decodes, and descrambles programs and services transmitted by the cable headend. Additionally, the communication circuitry also controls the two-way digital data transmissions between the headend and the set-top terminal. Input/output (I/O) control circuitry controls subscriber interaction with the set-top terminal through a keypad, an LED display, and a remote control. The I/O control circuitry also interfaces the set-top terminal with an accessories bus and external equipment (e.g., via an I/R transmitter), and is compatible with known interfaces, such as, for example, Ethernet 10-base-T, P1394, and SPDIF. Audio and video control circuitry in each set-top terminal provides graphics generation, audio synthesis, and real-time -digital video processing, and generates the outputs necessary to interface the set-top terminal with a subscriber's home audio and video system. These audio and video outputs can include, for example, AC-3 audio, baseband audio, RF video, S-Video, and baseband video outputs.

In the preferred embodiments of the present invention, application software within the set-top terminal provides the advanced cable services desired by many cable subscribers. These services include a comprehensive channel navigator, an interactive program guide, Impulse Pay-Per-View activation, Near-Video-On Demand programming, Video-On-Demand programming, and advanced configuration controls. Additionally, because the set-top terminal is upgradable via software downloads from the cable headend, new services can be added to the set-top terminal as they become available.

The comprehensive channel navigation controls provided by the application software of the set-top terminal enable a subscriber to more easily navigate through the abundance of programming and services that are available in the preferred embodiments of the present invention. For example, a program information banner can be displayed whenever a subscriber changes channels to identify the program currently being displayed on the selected channel. This banner can include the following: the channel's call sign, number, and logo; the program's name, running time, and elapsed time; the current time; a brief description of the program; information regarding the next program on that channel; or any other information that may be of interest to the subscriber.

The navigation controls of the preferred embodiments of the present invention provide a channel selection function that includes a plurality of tables that cross reference channel numbers with the type, source, parameters, and description of the various television services (e.g., audio and video programming and online services) provided by the cable system. These tables create levels of control, transparent to the subscriber, that allow the set-top terminal to identify the parameters and software needed to activate the program or service associated with a selected channel number. For example, if a subscriber selects channel 10, which is associated with an E-mail service, the set-top terminal accesses the cross-reference tables to identify the type and source of the television service associated with channel 10. The set-top terminal then obtains from the tables any necessary parameters and executes the appropriate E-mail software to activate the selected service. Thus, rather than just map channel numbers to analog broadcast video frequencies as in traditional cable systems, these tables allow channel numbers to be mapped to other sources of data, such as, for example, MPEG video, VBI, IP, and ROM.

Furthermore, unlike traditional cable systems in which channel numbers are fixed to analog broadcast frequencies, these cross-reference tables allow television services to be arranged in any channel number order, regardless of how they are transmitted by the cable system to the set-top terminal. For example, a channel table can be configured to associate channel 4 with video service 3 provided by video source 2 or, alternatively, channel 4 can be associated with music service 12 provided by music source 8. Once a set-top terminal channel number is associated with a particular service, the association is maintained even if the cable provider reassigns the cable channel numbers over which the television services are transmitted.

The preferred embodiments of the present invention also provide channel setting controls which enable a subscriber to fully configure the set-top terminal to operate as desired. For example, the subscriber can assign channels to a favorite channel list; block channels based on channel number, time, program rating, genre, etc.; set timers to record a particular program; turn the set-top terminal on or off at a particular time; or remind the subscriber that a particular program is on or that a tape has to be put in an attached video cassette recorder (VCR).

A browse feature is also provided by the comprehensive navigation controls in the preferred embodiments of the present invention. The browse feature presents a banner that can identify other programs or services that are, were, or will be available for viewing on other channels. Similar to the program information banner described previously, the browse banner can include the following: a channel's call sign, number, and logo; a program's name, running time, and elapsed time; the current time; a brief description of the current program; information regarding a program following the browse program; or any other information that may be of interest to a subscriber.

An interactive program guide within the set-top terminal of the preferred embodiments of the present invention further allows the subscriber to easily operate the set-top terminal and navigate through the abundance of programs and services available in the cable television system. This interactive program guide can include any of at least three main modes: a time mode, a theme mode, and a title mode.

In the time mode, program information is displayed in a grid arrangement with rows preferably corresponding to channel numbers, and columns preferably corresponding to times. By navigating through this grid, a subscriber can identify and review information regarding programs that were, are, or will be available for viewing.

The theme mode of the present invention displays program information of programs that were, are, or will be available for viewing based on a subscriber-selected theme category. Once a theme category has been selected, all programs within that theme are displayed to the subscriber. In some embodiments of the present invention, in addition to scrolling through programs corresponding to a selected theme, a subscriber can also scroll to other themes after reaching the end of the list of programs corresponding to the selected theme.

Similar to the theme mode, the title mode lists and displays information regarding programs available for viewing based on the titles of the programs. Once a first letter is selected, all programs having titles beginning with that letter that were, are, or will be available for viewing are displayed to the subscriber. As with themes, in some embodiments of the present invention, a subscriber is not limited to viewing only those programs with titles beginning with the selected letter, but rather the subscriber may scroll to program titles beginning with other letters once an end of the program titles beginning with the selected letter has been reached.

All modes of the interactive program guide of the preferred embodiments of the present invention can include a highlighted channel banner, a highlighted program summary, a program viewing window, and mode indicators. The highlighted channel banner preferably indicates the call sign, channel number, and channel logo of the channel highlighted in the interactive program guide display. The highlighted program summary preferably indicates the title, running time, description, and characteristics of the program highlighted in the interactive program guide display. The program viewing window can display, for example, any of the following: the program being viewed prior to entering the interactive program guide, a program selected from the interactive program guide, or a program selected at the headend. The content of the program in the program viewing window can include any of the programs or services which can be displayed by the set-top terminal. The program viewing window can also include a time and channel banner indicating the current time and the channel being displayed in the program viewing window. The mode indicators can indicate the current mode of the interactive program guide and how to activate other available program guide modes.

The interactive program guide of the preferred embodiments of the present invention also facilitates rapid navigation to programs selected by a subscriber. Once the subscriber has found a desired program in the interactive program guide, the subscriber can, by pressing a single key, switch to the program if it is currently being transmitted, set a timer to remind the subscriber of its scheduled transmission, or record the program, either now if currently transmitted or at its scheduled transmission time.

Impulse Pay-Per-View (IPPV) program purchasing is also facilitated in the preferred embodiments of the present invention. Through Impulse Pay-Per-View, a subscriber can request a Pay-Per-View event from the set-top terminal's keypad or remote control. Upon the subscriber selecting an IPPV program, which can be through either the interactive program guide, manual channel selection, or setting of a recording timer, the set-top terminal automatically identifies channels and programs which are IPPV, queries whether the subscriber would like to purchase the selected IPPV program, and authorizes the purchase if the subscriber so indicates. The preferred embodiments of the present invention also allow a subscriber to view summaries of past and currently scheduled IPPV purchases, and to cancel currently scheduled purchases. Additionally, the IPPV features of the preferred embodiments of present invention provide free preview screening of IPPV events, countdown timers to the start of an IPPV event, and automatic reminders if the subscriber has changed channels between the time of ordering and the start time of the IPPV event.

Near-Video-On-Demand (NVOD) can also be implemented in the preferred embodiments of the present invention. NVOD programming transmits each NVOD program from a plurality of sources, each source transmitting the same NVOD program at a fixed time period out of phase with the others. Upon a request to view an NVOD program, the set-top terminal displays on an NVOD channel the source that will next begin transmitting the selected NVOD program based on when the subscriber chooses to view the program.

NVOD programming can simulate the VCR functions of pausing, fast forwarding, and rewinding. This is accomplished by switching the NVOD channel to another NVOD program source. For example, to pause an NVOD program, the set-top terminal displays a pause "barker" (e.g., on-screen message) for the time period between consecutive out-of-phase transmissions of the NVOD program. Once the time period has passed, the set-top terminal switches to the source that began transmitting the program one time period after the previously displayed source's transmission. The NVOD program thus resumes at the point where paused and appears to the subscriber to have been paused by that time period. Similarly, fast forwarding and rewinding are accomplished by switching directly to another NVOD program source. For example, fast forwarding switches to a source that began transmitting the program before the currently viewed transmission, and rewinding switches to a source that began transmitting the program after the currently viewed transmission. By switching to a different NVOD program source, the NVOD program appears to have jumped by the time period between transmissions.

Video-On-Demand (VOD) programming can also be implemented in the preferred embodiments of the present invention. VOD is facilitated primarily by the media servers' ability to deliver high-speed digital data to subscribers' set-top terminals. Upon a subscriber's request to view a VOD event, a media server capable of delivering the VOD event begins digitally transmitting the program to the subscriber's set-top terminal. Unlike traditional broadcasts, this transmission is typically received only by the subscriber who requested the VOD event. A subscriber can therefore view the program at any time, and can also pause, fast forward, or rewind the program being transmitted.

Finally, the preferred embodiments of the present invention also allow messages to be transmitted to one or more subscribers. These messages can be sent to all subscribers (e.g., an emergency broadcast message) or to only one subscriber (e.g., an unpaid balance message). This message system can also send messages from one party within a household to another (e.g., an instruction by a parent to a child) or from one household to another. Thus a local messaging system within the cable system's community can be established. Additionally, these messages can be configured to activate a service at a subscriber's set-top terminal. For example, a set-top terminal can be automatically turned on to display an emergency news broadcast upon receipt of a message from the headend. Thus a subscriber can be alerted by the set-top terminal at any time, regardless of whether the set-top terminal is on or not.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which:

FIGS. 16–17 are illustrative screen displays of the time mode of an interactive program guide of a set-top terminal of a preferred embodiment of the present invention;

FIG. 35 is an illustrative screen display of a messaging function of a set-top terminal of a preferred embodiment of the present invention.

DETAILED DESCRIPTION OF THE INVENTION

Figure 1:
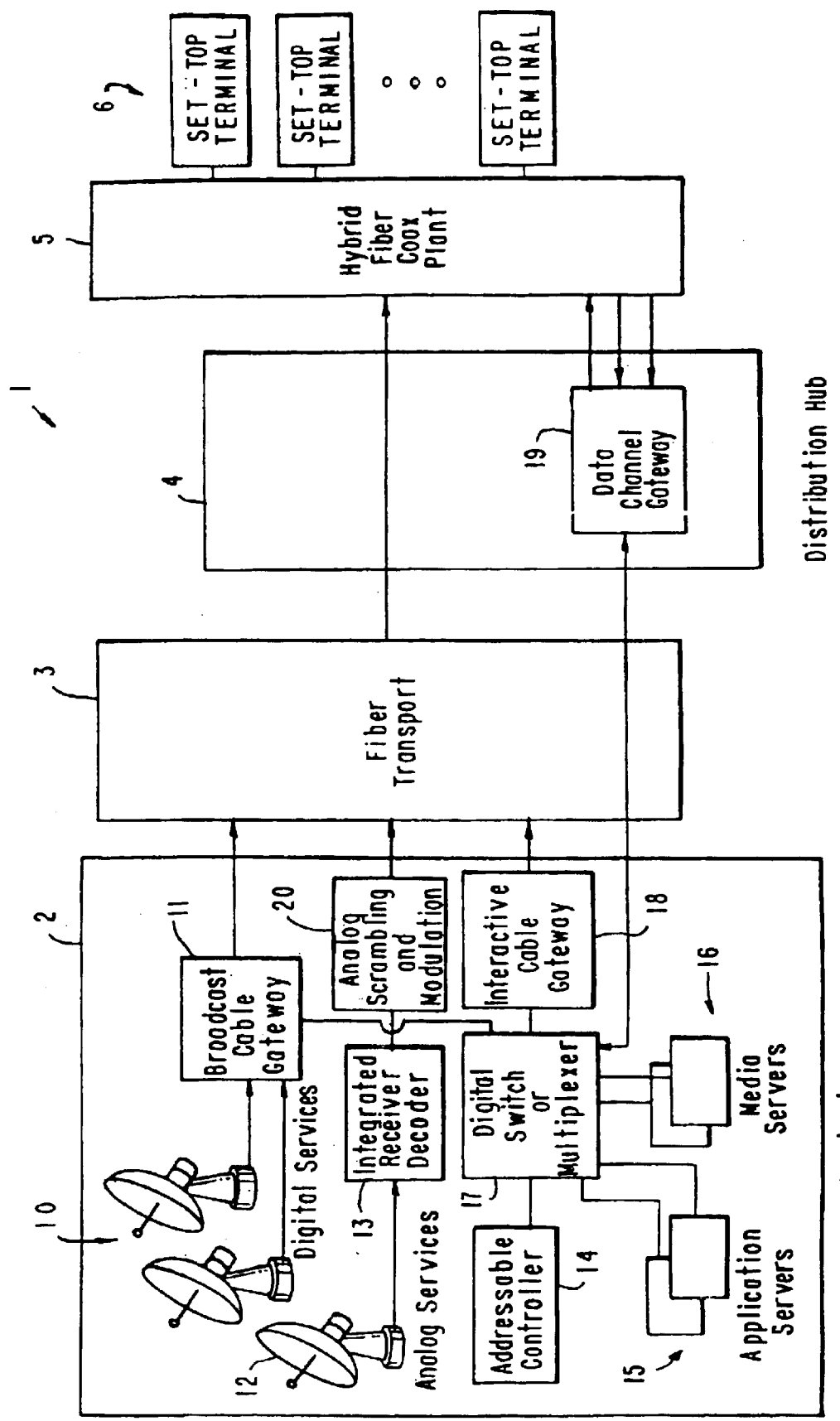
FIG. 1 is a block diagram of a cable television system of a preferred embodiment of the present invention.

A cable television system 1 of a preferred embodiment of the present invention is shown in FIG. 1. Cable system 1 includes five primary components: a headend 2; at least one fiber transport 3; at least one distribution hub 4; at least one hybrid fiber coax plant 5; and a plurality of set-top terminals 6, typically located in the homes of subscribers. Headend 2 is the primary source of programs, services, and control of cable system 1. Programs, services, and control signals are delivered to subscribers' set-top terminals 6 from headend 2 by transmitting signals through fiber transport 3, distribution hub 4, and hybrid fiber coax plant 5. These transmissions can be in the form of broadcasts to all set-top terminals, narrowcasts to a group of set-top terminals, multicasts to a list of particular set-top terminals, or unicasts to a single set-top terminal. The present invention can be implemented as a one-way cable television system in which signals are only transmitted from headend 2 to set-top terminals 6, or alternatively, in a preferred embodiment, can be implemented as a two-way interactive cable television system. Subscribers interact with the programs and services provided by headend 2 by transmitting signals from set-top terminals 6 through hybrid fiber coax 5, distribution hub 4, and fiber transport 3 to headend 2.

To provide the programs, services, and control of cable system 1, headend 2 includes a plurality of digital satellite receivers 10, a broadcast cable gateway (BCG) 11, a plurality of analog satellite receivers 12, a plurality of integrated receiver decoders (IRD) 13, analog scrambling and modulation circuitry 20, an addressable controller (AC) 14, a plurality of application servers 15, a plurality of media servers 16, a digital switch or multiplexer 17, and an interactive cable gateway (ICG) 18. Although each of these headend 2 elements are described as single functions, each can be implemented as part of a single device, as a single device, or as a plurality of devices.

The programs and services generated by headend 2 are received from four primary sources: analog satellite transmissions from analog service providers, digital satellite transmissions from digital service providers, application programs and services on application servers 15, and media programs and services on media servers 16. Programs and services can also be received at headend 2 from other sources, such as, for example, analog off-air signals, digital off-air signals, and locally originated signals. Analog and digital satellite transmissions typically provide the traditional forms of television broadcast programs and information services. Application servers typically provide, for example, executable code and data for application specific services such as database services, network management services, transactional electronic commerce services, system administration console services, application specific services (such as stock ticker, sports ticker, weather, and interactive program guide data), resource management services, connection management services, subscriber care services, billing services, operation system services, and object management services. Media servers provide time-critical media assets, such as, for example, MPEG-2 encoded video and audio, MPEG-2 encoded still images, bit-mapped graphic images, PCM digital audio, three dimensional graphic objects, application programs, and application data files. Although specific examples of programs and services and the sources that provide them (such as analog and digital satellite transmissions, application servers, and media servers) are given herein, other programs and services, and programs and services from other sources, can be provided to cable system 1 without departing from the spirit and scope of the present invention.

To provide this multitude of programs and services to a subscriber's home on a single coaxial cable, these signals-are preferably modulated onto a plurality of 6 MHZ frequency division multiplexed (FDM) channels in the RF spectrum from 5 MHZ through 860 MHZ. More specifically, the 6 MHZ FDM channels in the present invention can be used to carry analog channels with vertical blanking interval (VBI) signals, forward application transport (FAT) channels, forward data channels (FDC), and reverse data channels (RDC). In one embodiment of the present invention, analog channels are in the frequency range of 50 to 500 MHZ, FAT channels are in the frequency range of 500 to 750 MHZ, and FDCs and RDCs are in the frequency ranges of 5 to 40 MHZ and 70 to 130 MHZ, respectively. Although values for the bandwidth, upper limits, and lower limits of these channels are given herein, these values can be altered to suit the individual needs and capabilities of any system in which the present invention is implemented without departing from the spirit and scope of the present invention. For example, 1 MHZ FDM channels can be implemented wherein each of the analog channels, FAT channels, forward data channels, and reverse data channels use different sections of the RF spectrum.

Analog programs and services are received from satellite transmissions in the preferred embodiments of the present invention by analog satellite receivers 12, integrated receiver decoders 13, and analog scrambling and modulation circuitry 20. Analog satellite receivers 12 typically receive the satellite transmissions from the analog service providers in a modulated and scrambled NTSC format. Integrated receiver decoders 13 demodulate and descramble the satellite signals into NTSC signals, and then analog scrambling and modulation circuitry 20 scrambles (using the cable system's scrambling method, if desired) and modulates the NTSC signals onto an analog 6 MHZ FDM channel. The FDM modulation frequencies and scrambling techniques used for the NTSC signals are preferably selected to maintain downward compatibility with analog set-top terminals that may be used with the present invention. The demodulation, descrambling, scrambling, and modulation functions performed by integrated receiver decoders 13 and analog scrambling and modulation circuitry 20 can alternatively be performed by other dedicated devices, such as, for example, satellite receivers, satellite decoders, NTSC scramblers, and NTSC modulators.

Digital services are received from satellite transmissions by digital satellite receivers 10. The signals received by digital satellite receivers 10 typically arrive in quadrature phase shift key (QPSK) modulated, encrypted MPEG-2 transport stream format. Once the satellite transmissions have been received by the digital satellite receivers, broadcast cable gateway (BCG) 11 converts the transmissions signals for transmission over the cable system's communication network under the control of addressable controller 14 broadcast cable gateway 11 demodulates, applies forward error correction (FEC), if desired, and decrypts the satellite transmission to recover an MPEG-2 transport stream. The MPEG-2 transport stream may then be manipulated by BCG 11 to remove unwanted programs from the stream to form an MPEG-2 payload. BCG 11 then encrypts the payload (if desired) and modulates it onto a forward application transport (FAT) 6 MHZ FDM channel. The modulation of FAT channels is preferably 64 or 256 quadrature amplitude modulation (QAM), which enables the channels to carry digital data at rates typically in the range of 27 to 38 Mbps, respectively. By using MPEG-2 payloads, the present invention provides an increase in the number of programs and services that can be transmitted on a 6 MHZ channel over that available with analog technology by digitally compressing and combining a plurality of programs and services into a single MPEG-2 payload.

Application and media programs and services are provided by application and media servers 15 and 16 under the control of addressable controller 14 through digital switch or multiplexer 17, interactive cable gateway 18, and data channel gateways 19 in distribution hubs 4. The programs and services provided by application and media servers 15 and 16 are preferably provided in MPEG-2 transport stream format. Addressable controller 14 may oversee the distribution of programs and services by servers 15 and 16 by processing requests for programs and services from set-top terminals 6, instructing the servers when, where, and how to deliver a requested program or service, and directing the programs and services through the digital switch or multiplexer to the interactive cable gateway and data channel gateways in the distribution hubs.

Digital switch or multiplexer 17 connects servers 15 and 16 to addressable controller 14, to interactive cable gateway 18, and to data channel gateways 19 in distribution hubs 4. Because the programs and services provided by application servers 15 typically do not require high bandwidth, these servers can be connected to digital switch or multiplexer 17 directly (as shown) or via intermediate networks. Media servers 16, however, do require a great deal of bandwidth and accordingly should be connected to digital switch or multiplexer 17 or interactive cable gateway 18 directly until intermediate networks with sufficient bandwidth become available. Furthermore, to achieve their high bandwidth requirement, media servers 16 should incorporate storage devices having interfaces with speeds of at least SCSI Fast and SCSI Wide interfaces, and preferably speeds of Ultra SCSI and fiber channel interfaces.

Interactive cable gateway (ICG) 18 processes the servers' signals so they can be transmitted over the cable system's communication network. Signals received at ICG 18, either through digital switch or multiplexer 17 or from servers 15 or 16 directly, are optionally encrypted, optionally subjected to forward error correction (FEC), and modulated onto a 6 MHZ FAT channel using 64 or 256 quadrature amplitude modulation (QAM).

Figure 2:
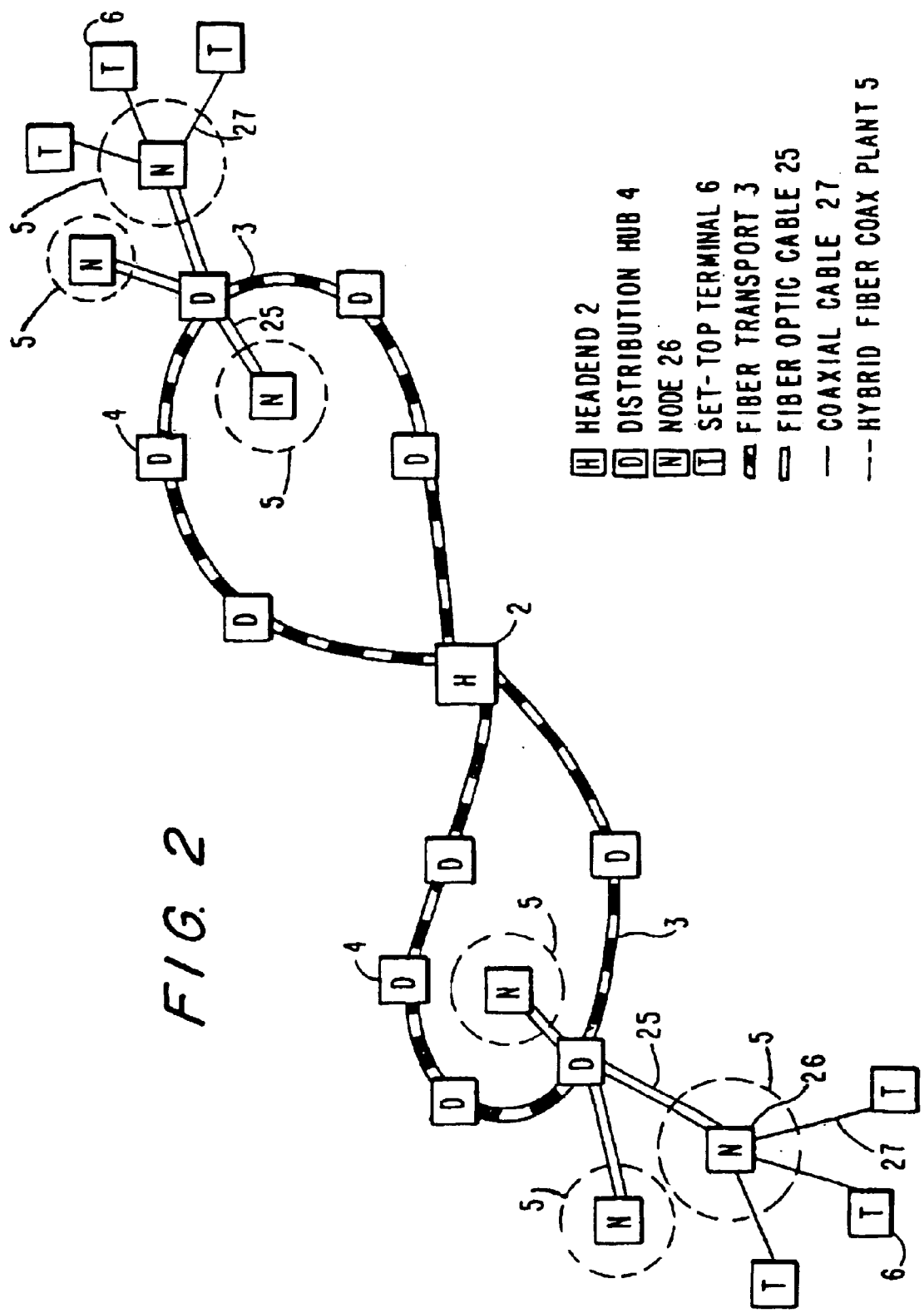
FIG. 2 is a schematic diagram of a cable television system of a preferred embodiment of the present invention.

The analog channels, forward application transport channels, forward data channels, and reverse data channels are transmitted between the cable headend and the set-top terminals over the cable systems' communication network. As shown in FIG. 2, this network comprises at least one fiber transport 3, at least one distribution hub 4, and at least one hybrid fiber coax plant 5.

Each fiber transport 3 connects headend 2 to at least one distribution hub 4. Typically fiber transport 3 is physically configured as a ring of bundled fiber optic cables. In this configuration, six cables in the bundle of each fiber transport 3 are typically dedicated to each hub 4 on the ring, and each hub 4 is typically within twenty miles of headend 2. For those hubs 4 that are more than a limiting distance (e.g., more than 20 miles) from headend 2, an intermediate distribution hub 4 may be needed to retransmit the signals in fiber transport 3.

By selecting particular fiber optic cables within the bundle of fiber transports 3, the distribution hubs can be connected to headend 2 through adjacent hubs in a logical "ring" configuration, or directly to headend 2 in a logical "star" configuration. Alternatively, other logical configurations can be used. However, an advantage of the ring configuration is that no distribution hub 4 is cut off from headend 2 by a single break in fiber transport 3.

Hybrid fiber coax plants 5 connect distribution hubs 4 to set-top terminals 6. In a preferred embodiment, hybrid fiber coax plants 5 include a plurality of fiber optic cables 25, a plurality of nodes 26, and a plurality of coaxial cables 27. A plurality of radio frequency (RF) amplifiers (not shown) may also be required at various locations throughout coaxial cables 27 to compensate for losses that occur when the coaxial cable is split to connect each set top terminal. Nodes 26 convert the optical signals in fiber optic cables 25 generated by the distribution hub 4 into electrical signals for transmission on coaxial cables 27 to set-top terminals 6. Return signals from set-top terminals 6 on coaxial cables 27 are converted to optical signals by nodes 26 for transmission in fiber optic cable 27 to distribution hubs 4.

As shown in FIG. 1, each distribution hub 4 comprises a plurality of data channel gateways 19 that support the forward and reverse data channels between headend 2 and set-top terminals 6. In the preferred embodiment of the present invention, the signals in the forward and reverse data channels between headend 2 and data channel gateways 19 are Internet protocol datagrams. Between data channel gateways 19 and set-top terminals 6, these Internet protocol datagrams may be encrypted or decrypted, as desired, and QPSK modulated or demodulated. Accordingly, data channel gateways 19 can include routing, encryption, decryption, QPSK modulation, and QPSK demodulation functions.

Figure 3:
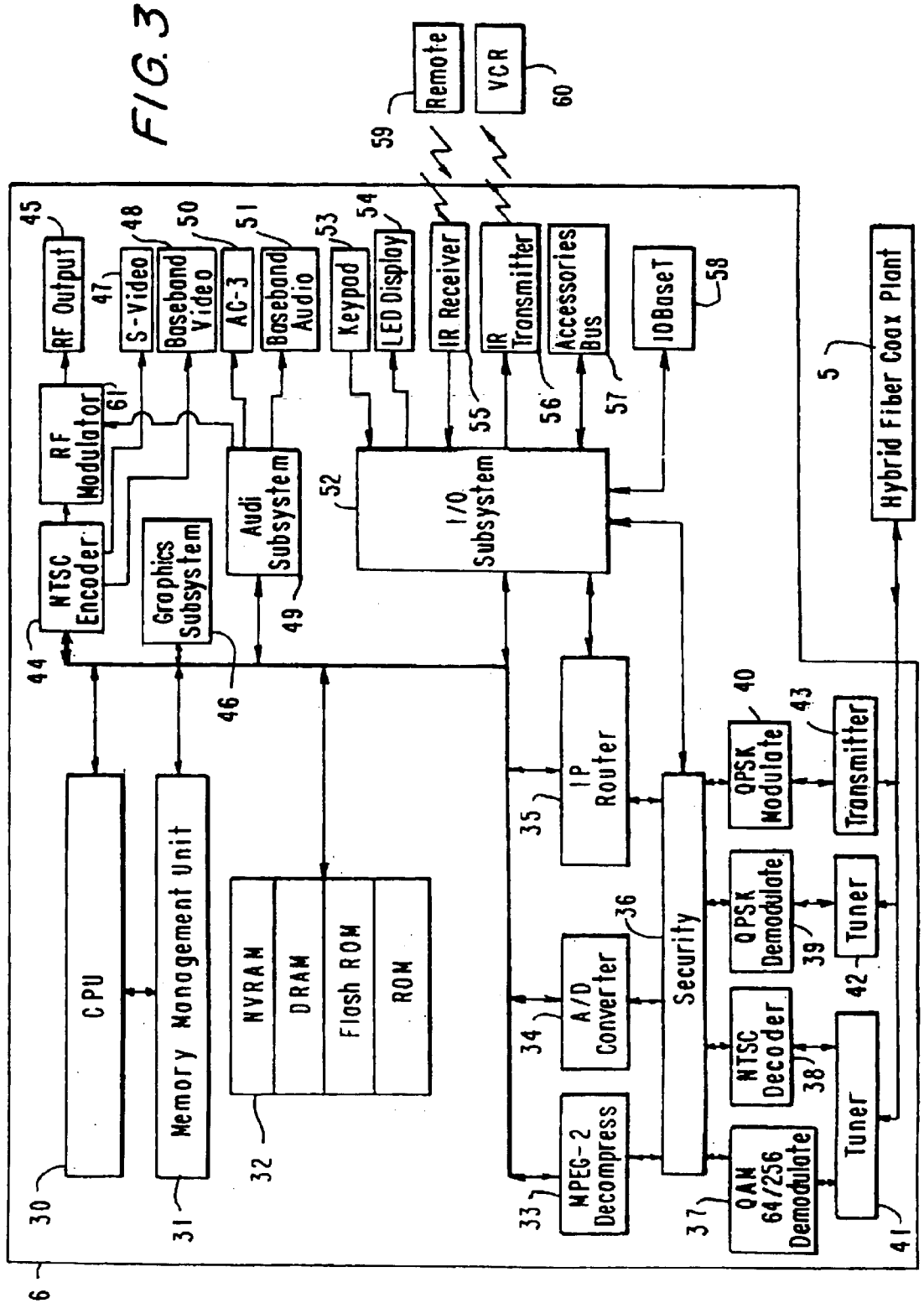
FIG. 3 is a block diagram of a set-top terminal of a preferred embodiment of the present invention.

One embodiment of set-top terminal 6 constructed in accordance with the present invention is shown in FIG. 3. Set-top terminal 6 includes the following: a central processing unit (CPU) 30, a memory management unit 31, memory 32 comprising NVRAM, DRAM, flash read only memory (ROM), and ROM, an MPEG-2 decompression unit 33, an A/D converter 34, an IP router 35, a security unit 36, a QAM 64/256 demodulator 37, an NTSC decoder 38, a QPSK demodulate unit 39, a QPSK modulate unit 40, an in-band tuner 41, an out-of-band tuner 42, an out-of-band transmitter 43, an NTSC encoder 44, an RF modulator 61, an RF output 45, an S-Video output 47, a baseband video output 48, a graphics subsystem 46, an audio subsystem 49, an AC-3 audio output 50, a baseband audio output 51, an I/O subsystem 52, a keypad 53, an LED display 54, an IR receiver 55, an IR transmitter 56, an accessories bus interface 57, and a 10-base-T interface 58.

Controlling the operation of set-top terminal 6 is central processing unit 30. Preferably CPU 30 is a processor that can support 32 bit arithmetic and logical operations, operate at speeds of at least 25 MIPS, and support a system of dynamically prioritizable hardware and software interrupts. An example of a suitable processor for CPU 30 is the SUN Micro-Systems micro-SPARC core. CPU 30 executes instructions stored in memory 32 under the control of an operating system such as the PowerTV Operating System by PowerTV, Inc., of Cupertino, Calif. CPU 30 accesses memory 32 through memory management unit (MMU) 31. MMU 31 provides memory protection for application processes and the kernel, and provides a flat address space for subscriber processes.

Memory 32 comprises non-volatile random access memory (NVRAM), dynamic random access memory (DRAM), flash read only memory (ROM), and read only memory (ROM). NVRAM is used primarily for the storage of subscriber settings and set-top terminal configuration settings, such as, for example, parental control codes, favorite channel line ups, set-top terminal setups, channel maps, authorization tables, and forward data channel address assignments. At least 2K bytes of NVRAM should be provided in memory 32. Dynamic RAM is used for most application and operating system storage requirements, such as, for example, the stack, heap, graphics, interactive program guide data, channel map, VCR codes, marketing data, and usage data, and functions such as MPEG-2 video decompression, AC-3 audio decoding, and video manipulation. At least 3M bytes of dynamic RAM should be provided in memory 32. Flash ROM is used primarily for the storage of resident application software, as well as patches to the operating system and application software which are downloaded to the set-top terminal from the headend after the set-top terminal has been deployed in the subscriber's home. At least 1M byte of flash ROM should be provided in memory 32. ROM is used primarily for the storage of the operating system. At least 1M byte of read only memory should be provided in memory 32. Although specific purposes for the NVRAM, DRAM, flash ROM, and ROM are illustrated herein, these memory elements can be used for purposes not listed and for purposes listed as corresponding to other elements without departing from the spirit and scope of the present invention.

Frequency division multiplexed (FDM) signals from headend 2 are initially received from hybrid fiber coax plant 5. In-band tuner 41 receives programs and services transmitted to the set-top terminal on analog channels and forward application transport channels. These programs and services include analog programs and services from analog satellite broadcasts, digital programs and services from digital satellite broadcasts, some digital programs and services from application servers, and digital programs and services from media servers. NTSC decoder 38 receives the analog programs and services from in-band tuner 41 and produces NTSC baseband signals. QAM 64/256 demodulator 37 receives the digital programs and services from in-band tuner 41 and demodulates the signal into MPEG-2 payloads. Out-of-band tuner 42 receives only incoming IP datagram messages from headend 2 on the forward data channel. Messages transmitted from the headend to the set-top terminals in Internet protocol datagrams on the forward data channel include interactive program guide data messages as well as other data and control messages. Messages received by out-of-band tuner 42 are QPSK demodulated by QPSK demodulator 39 to reveal the IP datagrams. The analog NTSC baseband signals, the digital MPEG-2 payloads, and the digital IP datagrams are descrambled (if necessary), decrypted (if necessary), and screened by security unit 36. Additionally, security unit 36 provides encryption, key management, authentication, and secure transaction functions, and prevents downloading of viruses by authenticating trusted sources, vandalism of software, theft of services, falsified orders by using electronic signatures, tampering with the set-top terminal, and direct cloning or remanufacturing of the set-top terminal.

After descrambling, decryption, and screening by security unit 36, the baseband signals, MPEG-2 payloads, and IP datagrams are passed on to the analog-to-digital converter 34, MPEG-2 decompress unit 33, and IP router 35. As their names imply, analog-to-digital converter 34 converts the NTSC baseband signals to digital signals; MPEG-2 decompress unit 33 decompresses the MPEG-2 payloads; and IP router 35 routes the IP datagrams toward their ultimate destination.

Outgoing IP datagram messages are also processed by IP router 35. After routing the outgoing IP datagrams, security unit 36 screens and encrypts the IP datagrams (if necessary). The IP datagrams are then QPSK modulated by QPSK modulator 40 and transmitted to hybrid fiber coax plant 5 by out-of-band transmitter 43.

The video and audio outputs of set-top terminal 6 are generated by graphics subsystem 46, audio subsystem 49, NTSC encoder 44, and RF modulator 61. Graphic subsystem 46 produces graphic images and scales MPEG-2 and NTSC video. NTSC encoder 44 generates S-Video output 47 and baseband video output 48 from digitized MPEG-2 and NTSC video. Audio subsystem 49 produces the audio outputs for set-top terminal 6 including AC-3 audio output 50 and baseband audio output 51. RF modulator 61 generates NTSC RF output 45 necessary to drive a television without S-Video or baseband inputs from signals received from NTSC encoder 44 and audio subsystem 49.

I/O subsystem 52 controls input and output functions and the 10-base-T computer interface for set-top terminal 6. As shown in FIG. 3, I/O subsystem 52 receives inputs from keypad 53, I/R receiver 55, accessories bus 57, and 10-base-T interface 58. I/O subsystem 52 also produces outputs to LED display 54, I/R transmitter 56, accessories bus 57, and 10-base-T interface 58. Keypad 53 enables the subscriber to control set-top terminal 6 without remote control 59. LED display 54 provides a numeric display for channel or time indication, and provides a plurality of single LEDs to indicate statuses such as power on, message waiting, set-top output disabled, etc. I/R receiver 54 receives and digitizes input from remote control 59. I/R transmitter 56 controls a VCR 60 and sends updates to remote control 59. Accessories bus 57 connects to external equipment such as keyboards, joysticks, mouses, I/R transmitters, etc. The 10-base-T interface can be used to connect to Ethernet interfaces in equipment such as routers, personal computers, or home entertainment equipment.

Figure 4:
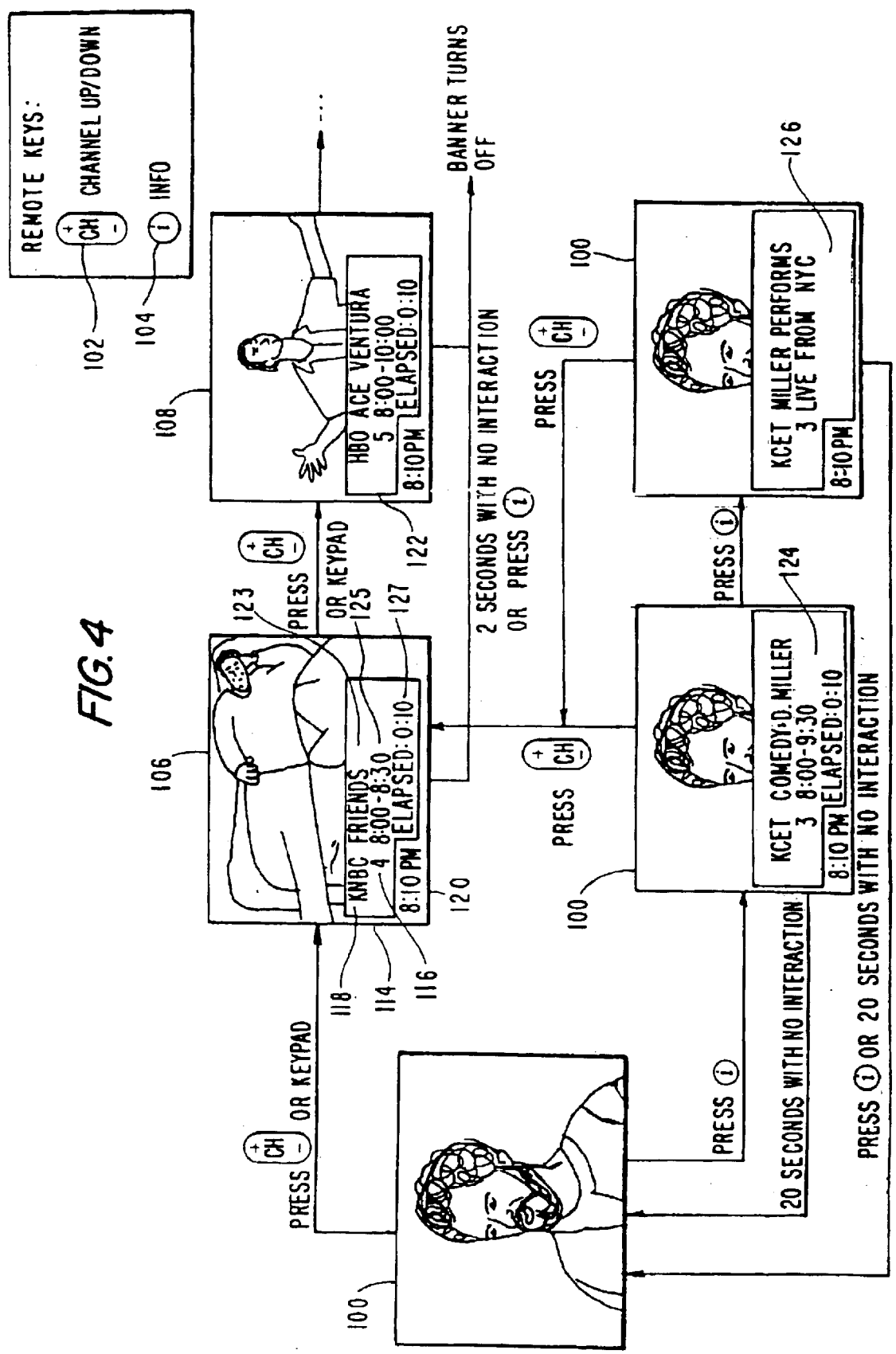
FIG. 4 is a flow diagram of a channel navigation function of a set-top terminal of a preferred embodiment of the present invention.

FIGS. 4 through 35 illustrate the operation of preferred embodiments of the application software of set-top terminal 6 of the present invention. Referring to FIG. 4, the operation of the channel selection function of one embodiment of the present invention is shown. From a first channel display 100, the channel selection function changes channels in response to pressing a channel up/down key 102 on set-top terminal 6 or its remote control 59. This causes a second channel display 106 to be displayed. In the preferred embodiment of the channel selection function, a program information banner 114 is displayed indicating the current channel's channel number 116, the current channel's call sign 118, current time 120, the current program's name 123, running time 125, and elapsed time 127. Banner 114 may also include information regarding the program following the program currently being transmitted. Banner 114 is preferably displayed for a fixed period of time.(e.g., 2 seconds) or until an information key 104 is depressed on set-top terminal 6 or its remote control 59. Pressing channel up/down key 102 again causes set-top terminal 6 to select the next channel in order. For example, as shown, pressing the up side of channel up/down key 102 causes the display to switch from channel 4 (KNBC) to channel 5 (HBO). Similar to the initial display of second display 106, the initial display of a third channel display 108 can include a program information banner 122.

Additionally, in the preferred embodiments of the present invention, pressing information key 104 from a first channel display 100 causes a program information banner 124 to be displayed on first channel display 100. Similar to program information banners 120 and 122, program information banner 124 can display the current channel's channel number, the current channel's call sign, the current time, the current program name, the program's running time, and the program's elapsed time. Like banner 114, banner 124 may also include information regarding the program following the program currently being transmitted. Pressing information key 104 again with program information banner 124 displayed preferably causes a more detailed program information banner 126 to be displayed on first channel display 100. Unlike banners 114, 122, and 124, more detailed program information banner 126 preferably does not display the running time and elapsed time but rather displays a brief description of the program's contents. As shown, program information banner 126 may omit the current program's name or, as in the preferred embodiments, may include the current program's name.

As an alternative to changing channels using channel up/down key 102 as shown in FIG. 4, channel selection can be accomplished by entering the number of a channel on a numeric keypad. Such a keypad is preferably on remote control 59 and can also be on set-top terminal 6. The channel number is entered on the numeric keypad one digit at a time from left to right, optionally preceded by zeros if the number of digits in the channel number is less than the number of digits required for the channel selection function. For example, in a set-top terminal with three-digit selection, a subscriber enters the channel number "125" by pressing the one-key, followed by the two-key, and then by the five-key. To enter the number "50" on a three-digit selection set-top terminal 6, the subscriber enters the number zero, then five, then zero, or simply enters a five followed by a zero. In the latter case, set-top terminal 6 automatically adds the leading zero to the channel number and selects the new channel accordingly.

Figure 5:
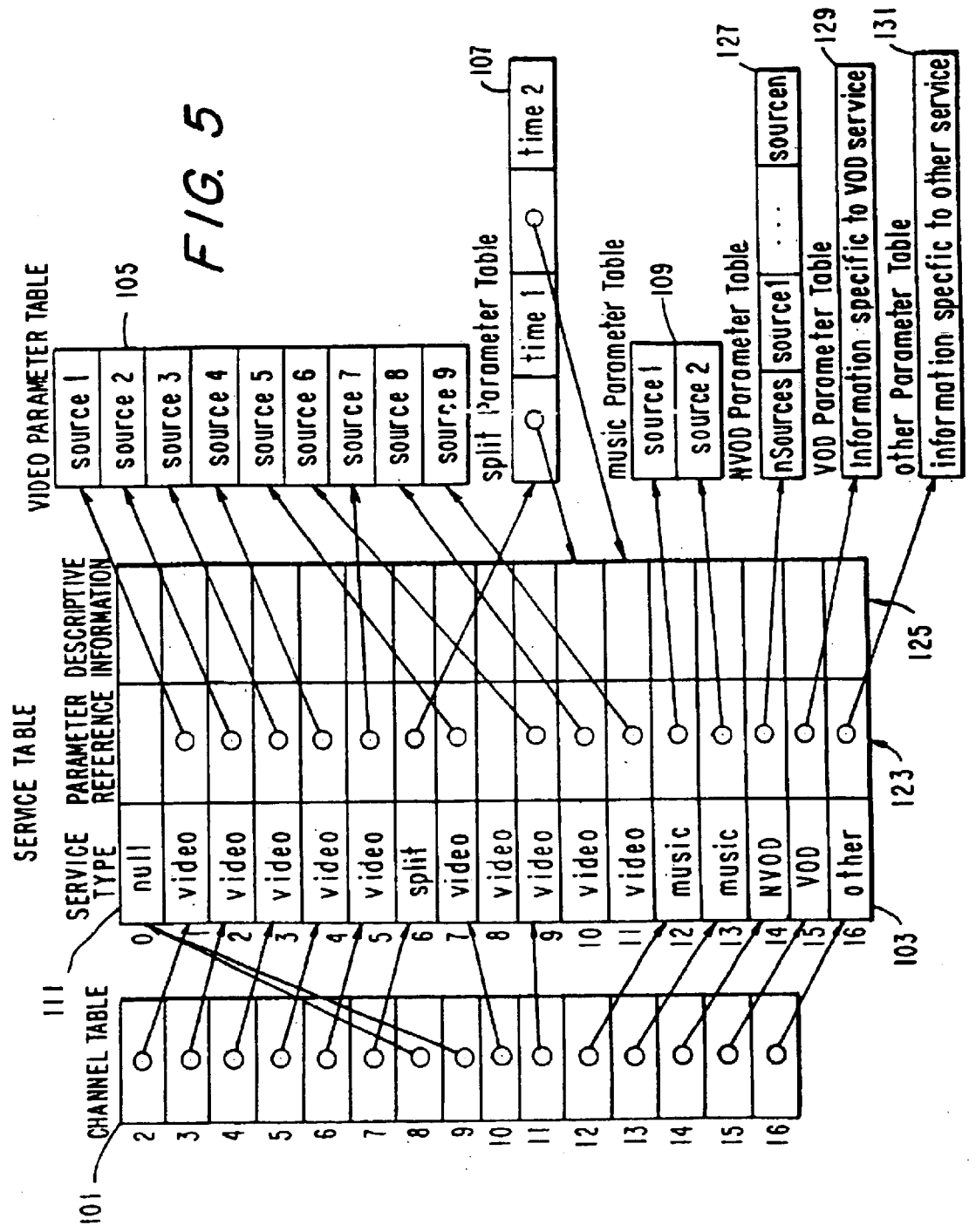
FIG. 5 is a data structure diagram illustrating a channel selection function of a preferred embodiment of the present invention.

In the preferred embodiments, the channel selection function of the present invention includes a plurality of channel cross-reference tables as shown in FIG. 5. These tables cross reference set-top terminal channels with a variety of television services, which can include various types of video and audio programming and online services. Transparent to subscribers, selection of a channel transfers control to a specific application program that, along with one or more appropriate parameters obtained from the cross-reference tables, activates (i.e., displays on the selected channel) the television service associated with that selected channel. The channel selection function advantageously enables set-top terminal 6 to process data from sources other than just traditional analog video broadcast sources. These other sources can include, for example, MPEG video, VBI, IP, and ROM.

Referring to FIG. 5, channel table 101 associates channels of set-top terminal 6 with a plurality of television services listed in service table 103. When a subscriber selects a channel, that channel is first identified in channel table 101 where a pointer associates the channel with a particular service in service table 103. For example, channel 5 is associated with service 4, channel 7 is associated with service 6, and channel 14 is associated with service 14.

Service table 103 preferably indicates the type of service provided. For example, as shown in column 111, services 1–5 are video services, service 6 is a split service (described below), services 12 and 13 are music services, and service 14 is an NVOD service. Optionally, a channel does not have to be associated with a television service, in which case it is associated with "null" service 0 (e.g., channels 8 and 9 are associated with service 0). Other service types, such as, for example, a home shopping service, a still image library service, an online database service, a World Wide Web browsing service, or an E-Mail service, can be added to service table 103 and are represented in service table 103 by "other" service 16.

Service table 103 preferably provides descriptive information for each television service listed. Represented by column 125, this information may include, for example, the service's logo, programming schedule, and program content, and can be used as a source for the program information banners described previously or the browse information banners and interactive program guide described in more detail further below.

Service table 103 further preferably provides parameter references as shown in column 123 for identifying sources of listed television services. The parameter references point to parameter tables, such as, for example, video parameter table 105, split parameter table 107, music parameter table 109, NVOD parameter table 127, VOD parameter table 129, and "other" parameter table 131.

Video parameter table 105 provides application parameters needed to activate video sources 1–9. The content of video sources 1–9 may include, for example, recently released movies, classic movies, science fiction programming, or weather information. Application software parameters are used by set-top terminal 6 (in particular, CPU 30) when executing application software, and may simply include the frequency of a particular source's signals or other more complex variables.

Split parameter table 107 allows a channel to be associated with two or more services, each during different time periods. These services can be of different types and from different sources. For example, if a subscriber selects channel 7, set-top terminal 6 determines from channel table 101 that channel 7 is associated with service 6. From service table 103, set-top terminal 6 determines that the source of service 6 is a split service governed by split parameter table 107. From split parameter table 107, set-top terminal 6 determines that channel 7 is associated with service 10 during time period one (time1) and service 11 during time period two (time2). Set-top terminal 6 then refers to video parameter table 105 to determine the sources and parameters for activating services 10 and 11. Thus, selecting channel 7 will cause set-top terminal 6 to activate source 8 during time period one and source 9 during time period two.

The other parameter tables function similarly to video parameter table 105. Music parameter table 109 identifies sources of music and provides the appropriate parameters for activating these sources. NVOD parameter table 127 provides application parameters for activating a Near-Video-On-Demand service and, similarly, VOD parameter table 129 provides application parameters for activating a Video-On-Demand service. Other Parameter Table 131 is representative of other television service sources and application parameters that can be provided by a cable system of the present invention.

In sum, the cross reference tables of the channel selection function enable set-top terminal 6 to execute software and activate a variety of television services. When a subscriber selects a channel, set-top terminal 6 identifies the type of service associated with the selected channel from channel table 101 and service table 103, and then executes the appropriate program (or special routine within the running program that allows channel selection) to tune in the frequency of the service's source by referring to the appropriate parameter table, descrambling the signal if necessary, and displaying the source's contents on the selected channel. Advantageously, set-top terminal 6 can respond to other types of services that require more interaction. For example, a request to view a channel incorporating a World Wide Web browser results in set-top terminal 6 executing either a resident copy of a Web browser or a downloaded copy from the headend, requesting log-in information from the subscriber, and establishing a browsing session with the headend. Thus the types of services that can be provided to subscribers are not limited by set-top terminal 6. Preferably, new types of services can be added to the cable system's offerings by downloading a new service type module to set-top terminal 6. The cross-reference tables (i.e., channel, service, and parameter tables) are accordingly updated and the new module can then be executed whenever a subscriber selects a channel corresponding to that service.

Furthermore, by configuring set-top terminal channel settings based on entries in service table 103 rather than on entries in channel table 101, changes in the cable channel lineup over which television services are transmitted to set-top terminal 6 do not invalidate a subscriber's set-top terminal channel settings. In other words, the subscriber's mapping of set-top terminal channels to television services is maintained even if the cable service provider reassigns the cable channels over which those services are transmitted. Preferably, when such a reassignment occurs, an updated channel-to-service mapping corresponding to the reassignment is downloaded to set-top terminal 6 to maintain the existing association of set-top terminal channels to television services. Thus, for example, once parents configure channel settings to block particular services deemed inappropriate for their children, a reassignment of cable channels over which those services are transmitted will not affect those services' blocked status. Similarly, other channel settings, such as a subscriber's favorite channel line-up, will also not be affected if such cable channel reassignments occur.

To prevent channel settings from becoming invalid during the lifetime of a set-top terminal, television services listed in service table 103 of a preferred embodiment of the present invention are typically not deleted or replaced. Instead, a new service is assigned to reserved space or space which is dynamically allocated within service table 103.

The manner in which requests for services are made by different applications within set-top terminal 6 are simplified in a preferred embodiment of the present invention by incorporating a uniform resource locator (URL), similar to that on the Internet, to uniformly identify services requested. Services are identified by a URL that incorporates information regarding the format, physical location, logical location, and identity of the service requested (e.g., format://physical/logical/identity). For example, if a service is requested that resides on a server at the headend, the URL identifies the format (e.g., the headend's format), the particular server at the headend, the directory on that server, and the file in that directory. Alternatively, if a service is requested that resides in set-top terminal 6, the URL identifies the format (e.g., code segment format), the physical location (i.e., set-top terminal 6), the particular block of memory, and the memory address of the requested service.

Figure 6:
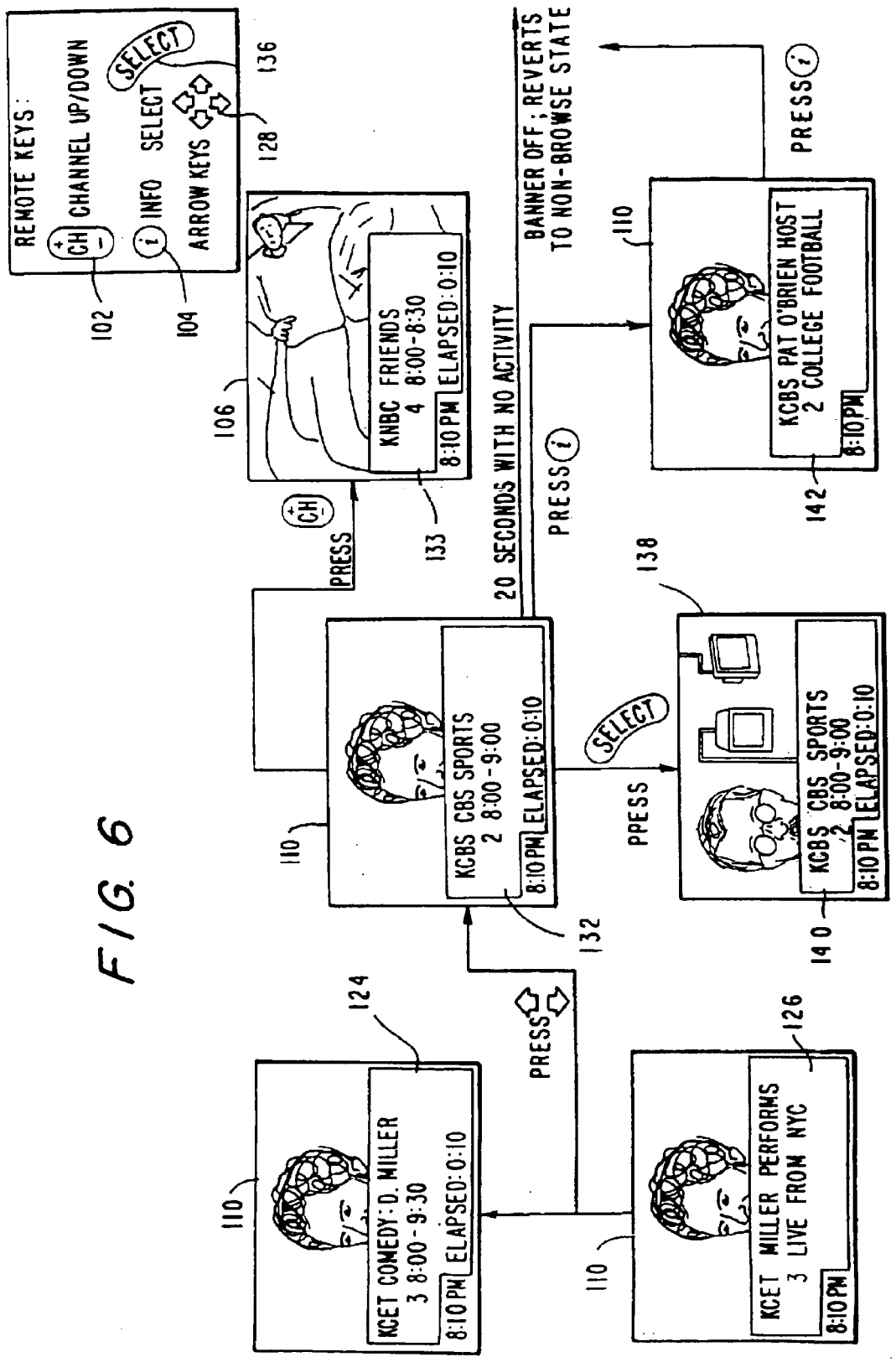
FIGS. 6–7 are flow diagrams illustrating a browse function of a set-top terminal of a preferred embodiment of the present invention.

FIG. 6 illustrates the "Browse" mode of the present invention. The browse mode is entered by pressing the up, down, left, or right arrow keys whenever a program information banner or more detailed program information banner is being displayed. For example, from a television display 110 incorporating either a program information banner 124 or a more detailed program information banner 126, pressing up or down arrow keys 128 causes a browse information banner 132 to be displayed. Browse information banner 132 displays information for programs other than that currently being displayed on display 110. As shown, a program entitled "Comedy: D. Miller" is being displayed on display 110 (see program information banner 124). However, browse information banner 132 reflects information for a program entitled "CBS Sports." The subscriber can therefore determine what other programs are available for viewing while still observing the currently selected program. By repeatedly pressing up or down arrow keys 128, information regarding other concurrently transmitted television programs can also be displayed on browse information banner 132. Pressing information key 104 whenever a browse information banner 132 is displayed causes banner 132 to be replaced by a more detailed browse information banner 142 displaying a brief description of the browse program rather than the browse running time and elapsed time. As with the program information banner 126, browse information banner 142 may omit the browse program's name (as shown) or, as in the preferred embodiments, may include the browse program's name.

The browse mode of set-top terminal 6 can be exited by pressing channel up/down key 102, by pressing select key 136, by pressing information key 104 whenever more detailed browse information banner 142 is displayed, or by waiting a fixed period of time (e.g., 20 seconds) without pressing any remote control 59 or set-top terminal 6 key. More particularly, pressing channel up/down key 102 with a displayed browse information banner 132 causes the following: the banner is removed from the display, the channel tuner selects and displays the next channel following the previously displayed channel (in this case channel 4 follows the previously displayed channel 3 since the up side of channel up/down key 102 was pressed), and a program information banner 133 is displayed for the new channel as shown in channel display 106. Alternatively, pressing select key 136 with browse information banner 132 displayed causes set-top terminal 6 to tune in and display browse channel 138 and to briefly display a program information banner 140.

Figure 7:
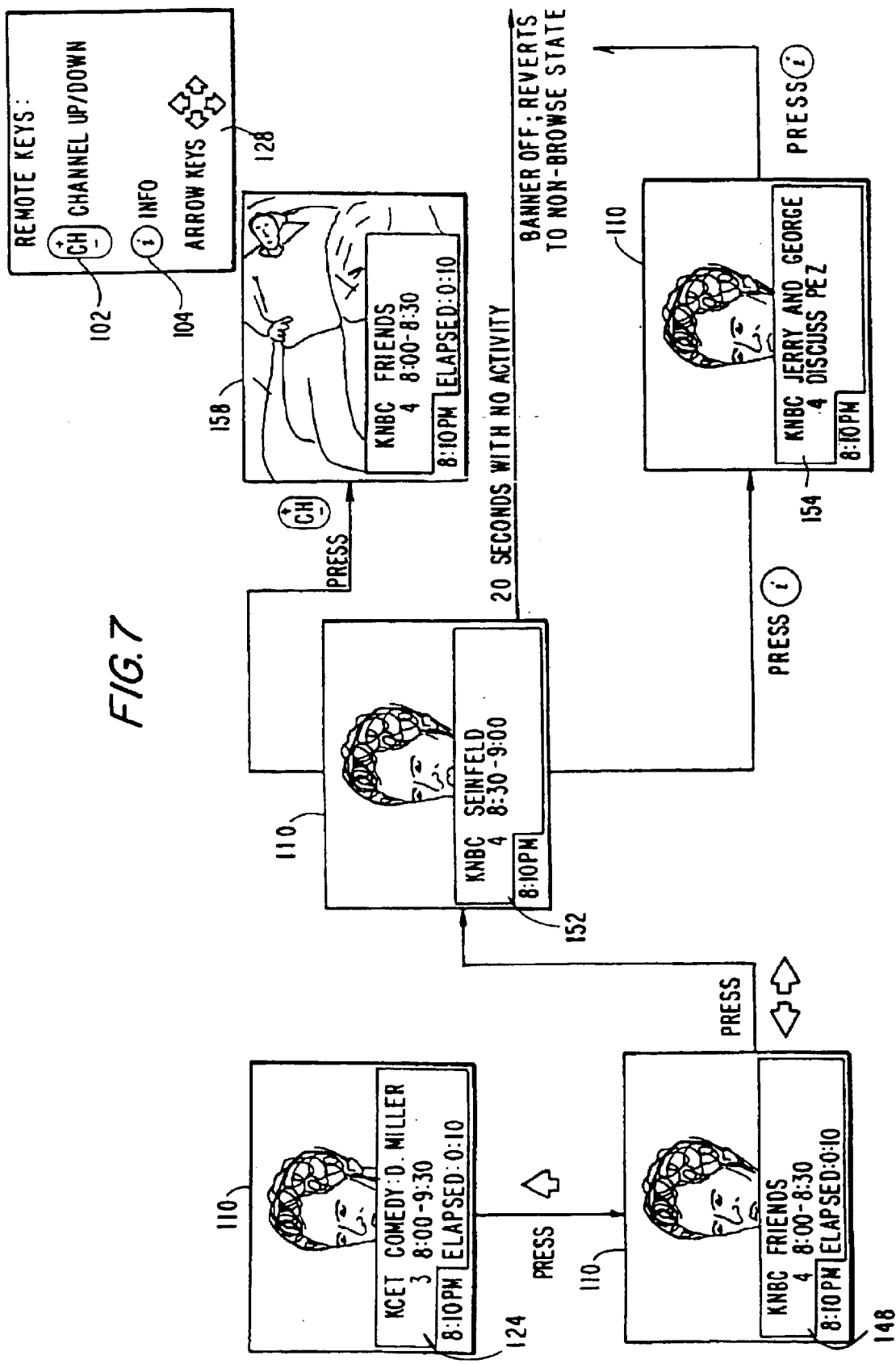

The browse information banner can also be used to display information for programs that were or will be transmitted. For example, as shown in FIG. 7, browse information banner 152 can be used to display information for a program airing in twenty minutes from the current time. This can be done, for example, as follows: from a program information banner 124 displayed within a television display 110, the browse mode of set-top terminal 6 is entered by pressing up arrow key 128. With the browse mode entered, a browse information banner 148 displays information for a browse channel (i.e., channel 4, KNBC) during a browse period which straddles the current time (i.e., 8:10 p.m.). By pressing right arrow key 128, the browse period changes to the period for the next program on the browse channel. Alternatively, the subscriber can press left arrow key 128 to change the browse period to the previous program on the browse channel. In a similar fashion, by repeatedly pressing up, down, left, and right arrow keys 128, the subscriber can view information for programs on other channels and at different times.

As described in connection with FIG. 6, once the subscriber has viewed browse information banner 152, more detailed information can be obtained or the subscriber can exit the browse mode of set-top terminal 6. For example, by pressing information key 104 with the browse information banner 152 displayed, the subscriber causes browse information banner 152 to be replaced by a more detailed browse information banner 154. Banner 154 may replace the program name, running time, and elapsed time of banner 152 with a brief description of the browse program's contents. Alternatively, the browse mode may be exited by pressing channel up/down key 102 to view a new channel display 158 or by not pressing any keys on remote control 59 or terminal 6 for a fixed period of time (e.g., 20 seconds).

Although the embodiment of the browse banner shown in FIGS. 6 and 7 is activated from the program information banner by pressing the up or down arrow keys, the browse banner of the present invention can also be activated by pressing the left or right arrow keys from the program information banner.

Figure 8:
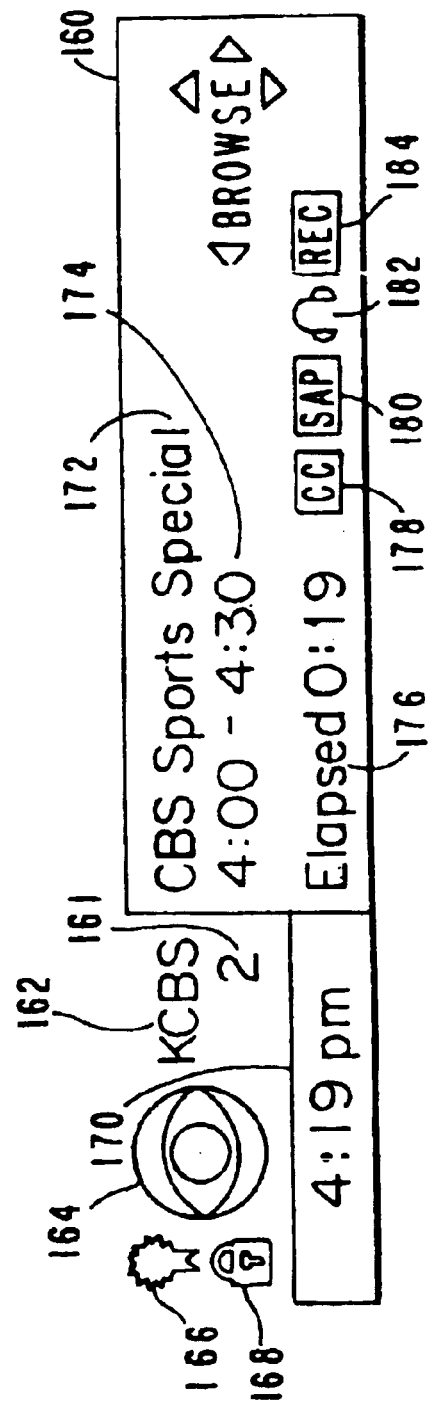
FIG. 8 is layout diagram illustrating a browse banner of a preferred embodiment of the present invention.

FIG. 8 provides a more detailed illustration of an embodiment of the browse information banner of the present invention. As shown, browse information banner 160 can display the browse channel's channel number 160, call sign 162, logo 164, a favorite channel icon 166, a blocked channel icon 168, current time 170, the browse program's name 172, running time 174, elapsed time 176, and icons to indicate whether the browse program is closed-captioned 178, has a second audio program 180, is in stereo 182, and is designated to be recorded 184.

Figure 9:
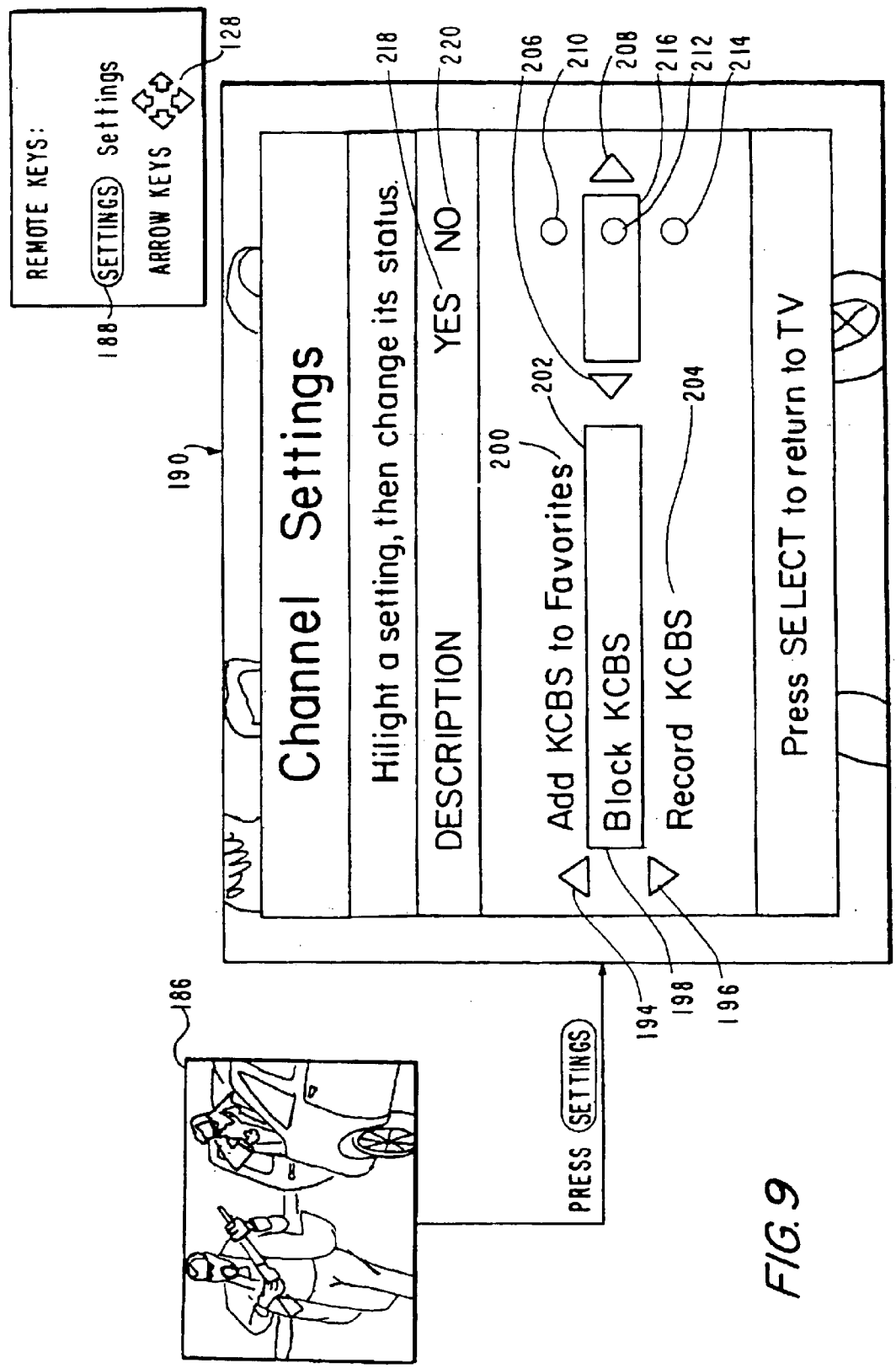
FIGS. 9–13 are flow diagrams illustrating channel and general setting functions of a set-top terminal of a preferred embodiment of the present invention.

As shown in FIG. 9, a channel settings menu 190 allows the subscriber of set-top terminal 6 to change the favorite, blocked, and record status for each channel. The subscriber enables channel settings menu 190 by pressing a settings key 188 on set-top terminal 6 or its remote control 59 from any television display 186. As illustrated, channel settings menu 190 may be incorporated into the previously viewed television display 186 while leaving the television audio unaffected. Within channel settings menu 190, settings may be provided which allow the subscriber to add the current channel (i.e., KCBS) to the favorite channel list (setting 200), block the current channel (setting 202), and record the current channel (setting 204). To select any of settings 200, 202, or 204, the subscriber highlights one of the settings by positioning the setting within cursors 198 and 216 by pressing up or down arrow keys 128. In the preferred embodiments of the present invention, cursors 198 and 216 remain in a fixed vertical position within menu 190 as the subscriber presses up and down arrow keys 128 and the list of settings scrolls such that the settings list comprising settings 200, 202, and 204 moves in the opposite direction of the key pressed. That is, when the subscriber presses up arrow key 128, the list moves down and the cursor remains fixed, thereby giving the net effect of the cursor moving up within the list. Set-top terminal 6 indicates that the subscriber may press up and down arrow keys 128 to highlight different settings using cursors 198 and 216 by providing up and down arrow indicators 194 and 196. With cursors 198 and 216 on the desired setting, the subscriber may then enable or disable the highlighted setting by pressing left and right arrow keys 128. Similarly to up and down arrow indicators 194 and 196, menu 190 provides left and right arrow indicators 206 and 208 to indicate that the subscriber may press left and right arrow keys 128 to enable or disable the highlighted setting. Setting indicators 210, 212, and 214 will shift position to beneath either the "YES" column 218 or "NO" column 220 to indicate to the subscriber whether each function is enabled or disabled, respectively.

Figure 10:
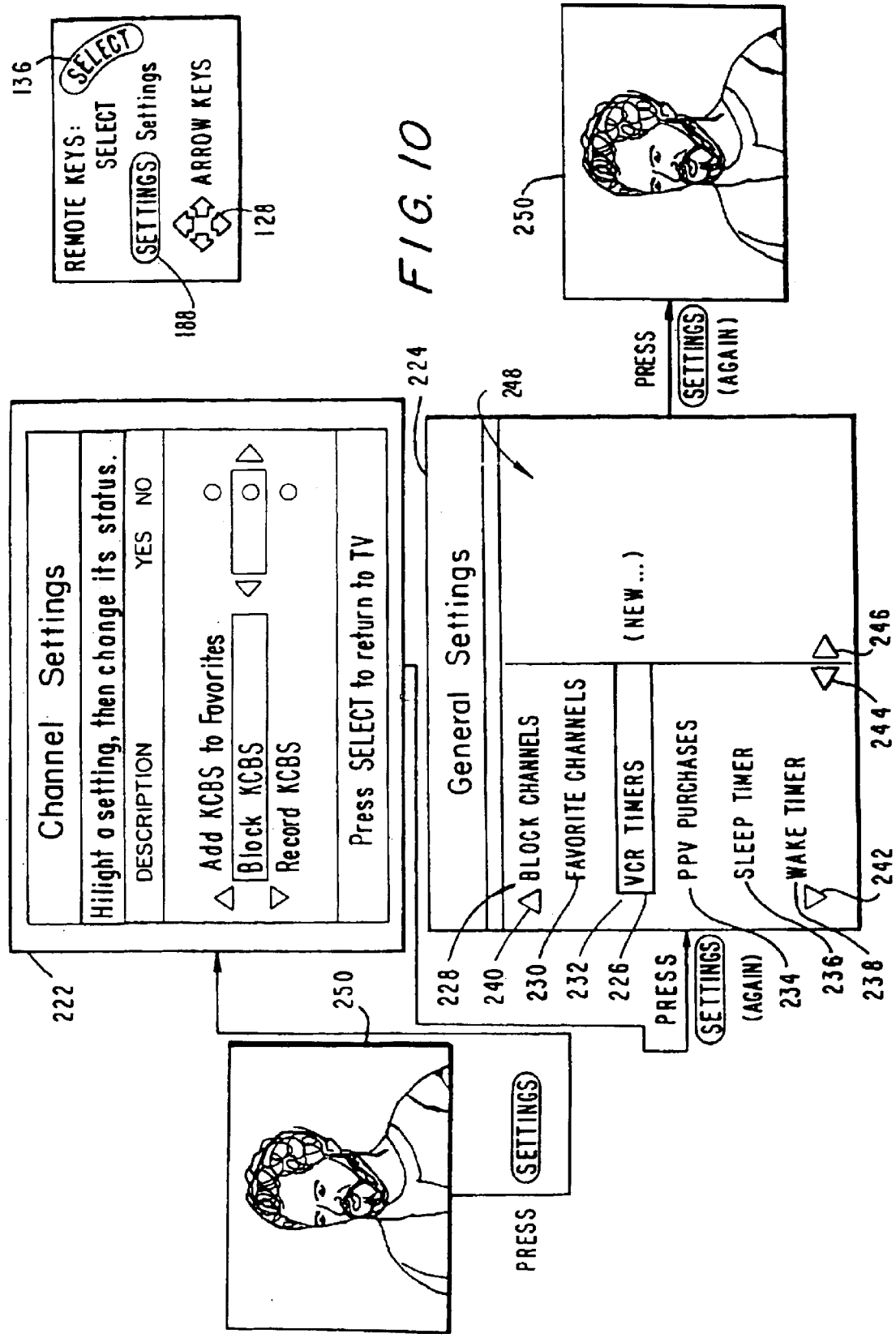

A general settings menu 224, as shown in FIG. 10, is also provided in a preferred embodiment of the present invention. Menu 224 enables a subscriber to make further settings adjustments to set-top terminal 6. The subscriber enters general settings menu 224 by pressing settings key 188 from channel setting menu 222. As with the channel settings menu 222, general settings menu 224 may be incorporated into the previously displayed television display 250 without affecting the television audio. Within general settings menu 224, the subscriber may control settings such as blocked channels 228, favorite channels 230, VCR timers 232, IPPV purchases 234, sleep timers 236, and wake timers 238. Other settings available in general settings menu 224, but not illustrated, can include, for example, reminder timers, view all timers, block times, setup blocking PIN, setup purchase PIN, set power-on channel, enable second audio program (SAP), set audio output level, set AC outlet function, set VCR type, set clock options, control VCR on/off, and enable watch and record. Similarly to channel settings menu 190 (FIG. 9), a subscriber selects the desired setting by positioning the desired setting 228, 230, 232, 234, 236, or 238 within a cursor 226 using up and down arrow keys 128, as is indicated by up and down arrow indicators 240 and 242. As with channel settings menu 190, in the preferred embodiments of the present invention, cursor 226 remains in fixed vertical position within general settings menu 224 and the list of settings scroll in a direction opposite to the direction of the up and down arrow keys depressed.

Once the desired setting has been highlighted by cursor 226, the subscriber may then view or modify contents of the setting by pressing right arrow key 128 (as is indicated by right arrow indicator 246) or select key 136 to move cursor 226 to right half 248 of general settings menu 224. In cases where a setting has not been previously set or the contents of the setting have been erased, an indication such as "(New ...)" will be displayed in right half 248 of menu 224 to indicate to the subscriber that the setting is empty. When the subscriber has completed using general settings menu 224, the subscriber may exit the menu by pressing settings key 188 to return to previous television display 250. Alternatively to exiting the general settings menu 224, the subscriber may also select another general setting by returning to the left half of menu 224 by pressing left arrow key 128, as indicated by left arrow indicator 244.

Figure 11:
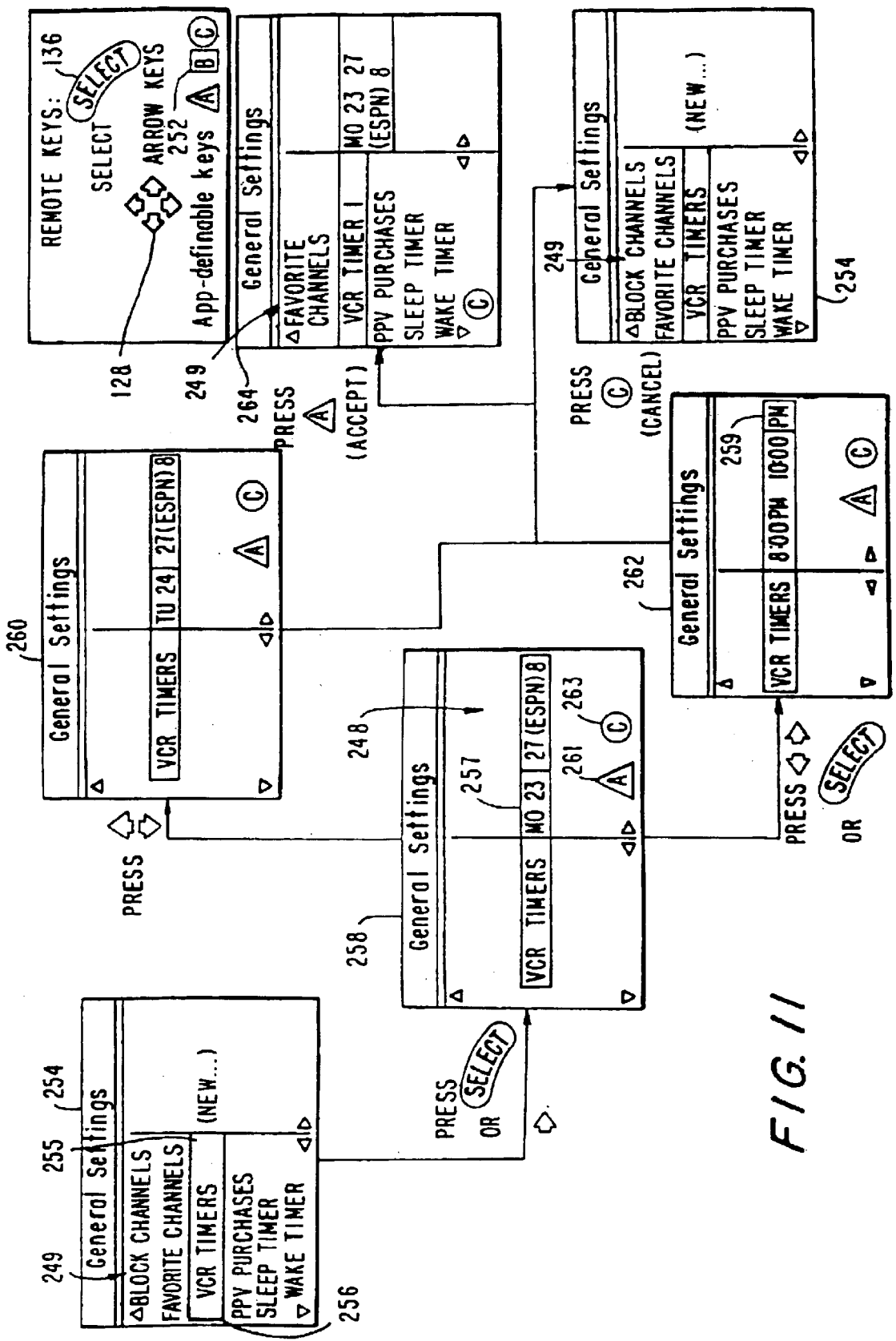

FIGS. 11 through 15 illustrate the VCR timers, IPPV purchases, all timers, and favorite channel settings of the general settings menu. Referring to FIG. 11, one embodiment of the VCR timers setting is shown. Selecting the VCR timers setting by pressing right arrow key 128 or select key 136 with VCR timers setting 256 highlighted in general settings menu 254 causes cursor 255 to be removed from the display and a new cursor 257 to be displayed in the left-most column of right half 248 of the general settings menu as shown in menu 258. In cases in which the VCR timers setting is selected when contents for the setting do not exist, set-top terminal 6 will determine default contents for the setting. The contents may be either the current program being viewed prior to entering the general settings menu, or may be the next program to be aired if within a fixed period of time (e.g., 10 minutes) of the start time of the next program. Pressing either up or down arrow keys 128 causes each parameter to cycle to the next higher or lower value for that parameter. As shown in menu 260, pressing up arrow key 128 causes the date to change from "Mo 23" to "Tu 24." Pressing right arrow key 128 or select key 136 causes cursor 257 to be removed from the display and a new cursor (e.g., cursor 259) to be displayed in the next, rightward, parameter as shown in menu 262. Alternatively, pressing left arrow key 128 causes cursor 257 to be removed from the display and a new cursor to be displayed in the previous parameter. By using arrow keys 128 in this fashion, the subscriber is able to select the date, channel, start time, and stop time for the VCR timers setting.

Once the subscriber has modified the contents of the VCR timer setting, the subscriber may accept or cancel the modifications as indicated by "A" and "C" indicators 261 and 263. To accept the modified setting, the subscriber presses the "A" application definable key 252. If the subscriber accepts the settings, a cursor will be displayed in list of settings 249 and the modified setting will be displayed as shown in menu 264. To cancel the modified setting, the subscriber presses "C" application definable key 252. Alternatively, if left arrow key 128 is pressed when a cursor is displayed in the left-most column in right half 248 of the general settings menu (as shown in menu 258), any changes to the setting will be canceled. Once canceled, a cursor will be displayed in list of settings 249 and the prior contents of the setting will be displayed.

Figure 12:
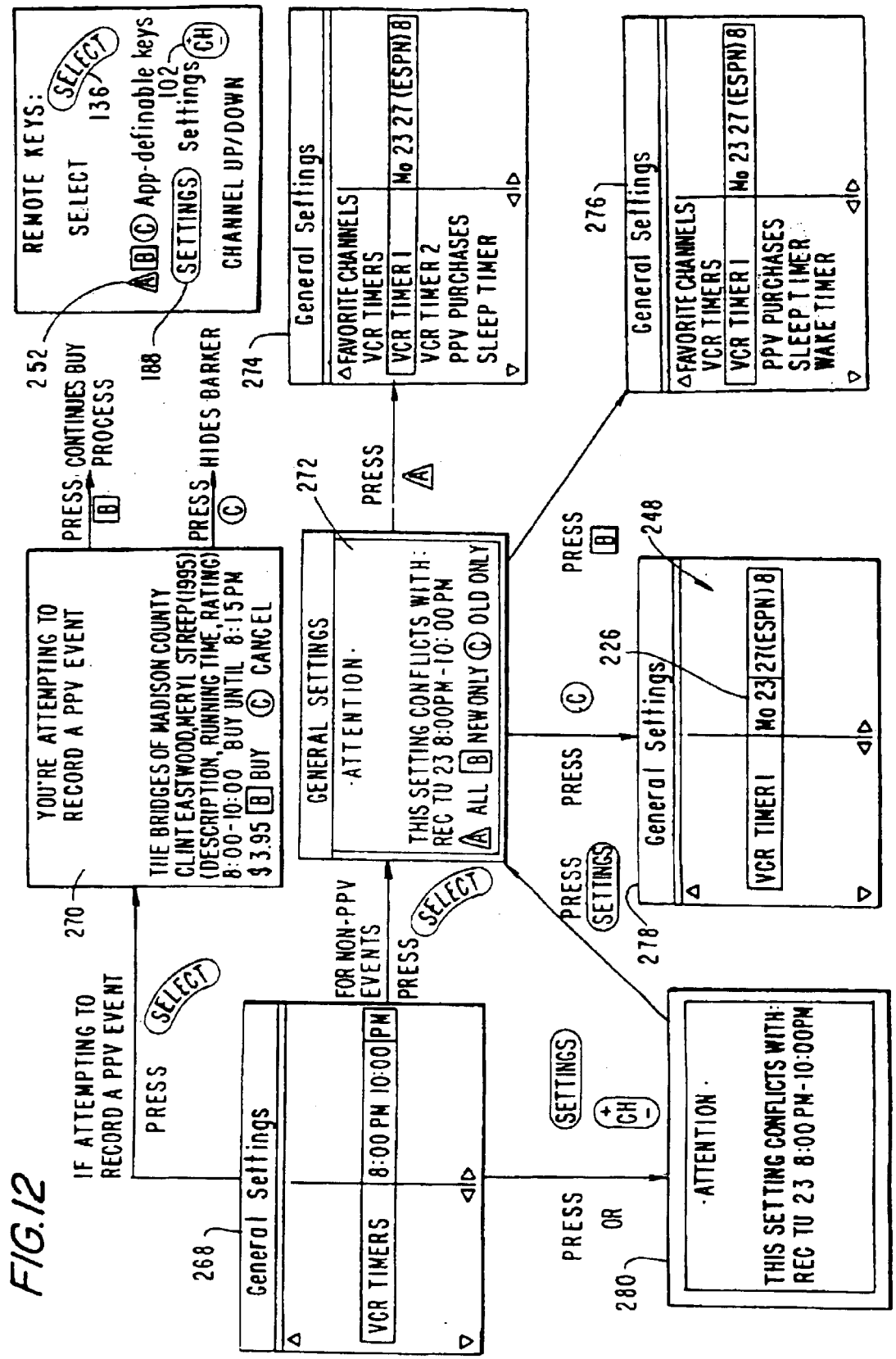

FIG. 12 illustrates the conflict checking feature of the present invention. Upon pressing select key 136, settings key 188, or channel up/down key 102 after modifying a timer setting's contents from within general settings menu 268, set-top terminal 6 verifies that there are no conflicts created by the modified setting. Conflicts can arise, for example, when there are overlapping timers, unusual settings (such as VCR record timers which exceed typical tape length), record timers for unpurchased Impulse Pay-Per-View (IPPV) events, attempts to set up more than a limited number of VCR timers (e.g., eight), and attempts to purchase more than a limited number of IPPV events (e.g., eight). For example, upon pressing select key 136 from general settings menu 268 when attempting to record an IPPV event, set-top terminal 6 displays an interactive warning window 270 alerting the subscriber that the IPPV event sought to be recorded has not been purchased. Interactive warning window 270 then allows the subscriber to press "B" or "C" application definable keys 252 to either buy the IPPV event or cancel the warning. Pressing select key 136 from general settings menu 268 for non-IPPV events causes another interactive warning window 272 to be displayed when there are conflicting timers. For example, interactive warning window 272 is displayed when there is an attempt to record two different programs at overlapping times. As illustrated, the subscriber has the choice of selecting one of "A," "B," and "C" application definable keys 252 in response to this warning in the preferred embodiment. Pressing "A" key 252 causes set-top terminal 6 to keep both settings and apply logic to resolve the conflict as shown in menu 274 ("VCR Timer 1" referring to the first setting and "VCR Timer 2" referring to the second). This can be accomplished, for example, in cases where two recording timers partially overlap by recording up until the start time of the second program and dropping the end of the first program. Pressing "B" key 252 in response to interactive warning window 272 causes the conflict to be resolved by a new setting that overwrites the old setting as shown in menu 276. Pressing "C" key 252 in response to interactive warning window 272 causes the old setting to be retained in general settings menu 278 and cursor 226 to remain displayed on right side 248 of the general settings menu to indicate to the subscriber that the most recent setting has not been accepted.

When the subscriber exits general settings menu 268 by pressing settings key 188 or channel up/down key 102 while leaving behind a conflicting setting, a non-interactive warning window 280 is displayed for a brief period of time (e.g., five seconds) to inform the subscriber of the conflict. To resolve the conflict, the subscriber must press settings key 188 to reenter the general settings menu. Upon reentering the general settings menu, the subscriber is prompted with interactive warning window 272 so the conflict can be resolved using the procedure previously described.

Figure 13:
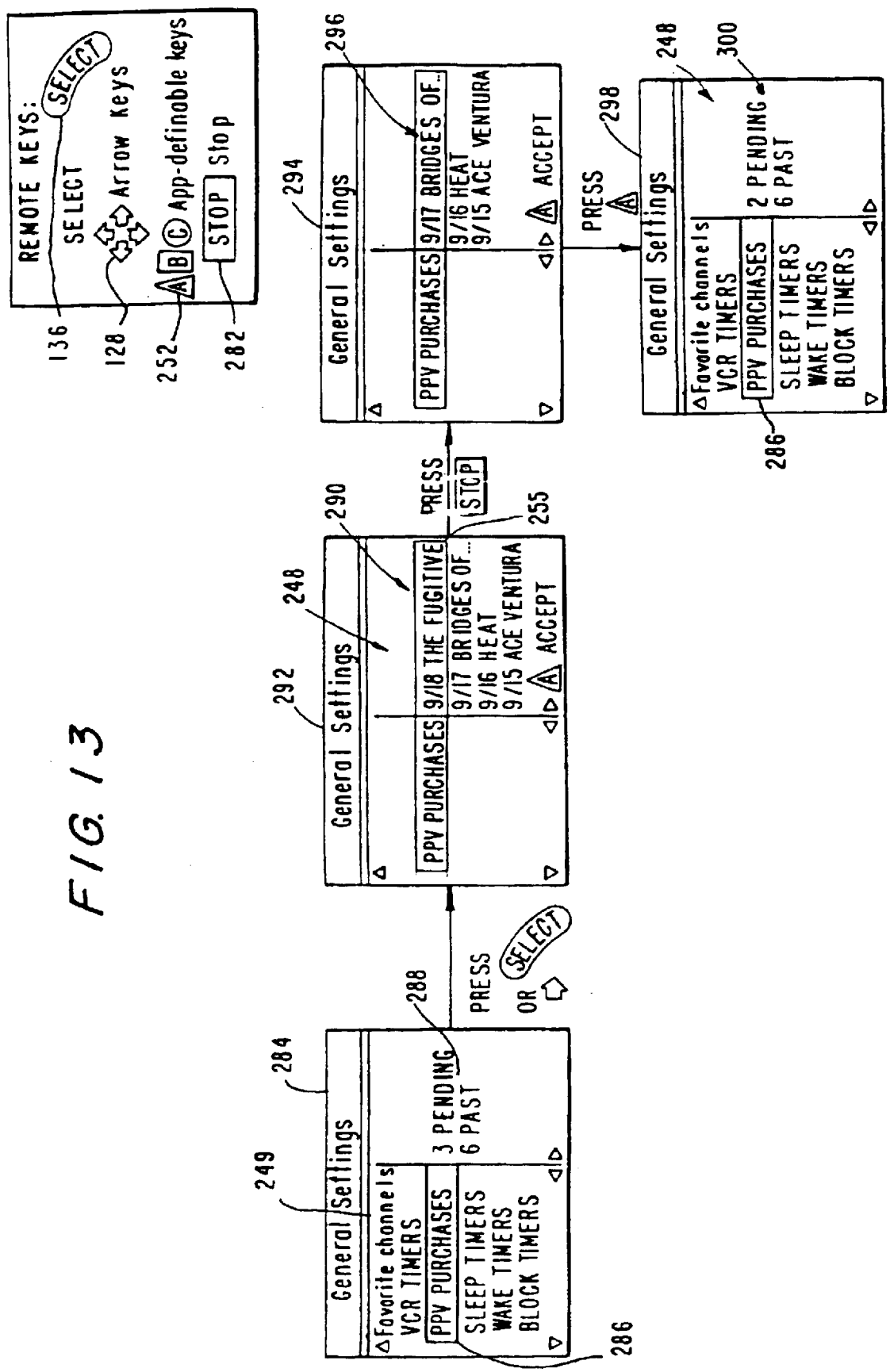

FIG. 13 illustrates the Impulse Pay-Per-View (IPPV) purchases setting of the general settings menu. As shown in general settings menu 284, whenever IPPV Purchases setting 286 is highlighted, a summary indicator 288 is displayed in right half 248 of the general settings menu. Indicator 288 indicates the number of past and pending IPPV purchases. Pressing right arrow key 128 or select key 136 causes summary indicator 288 to be replaced by list 290 of past and pending purchases as shown in general settings menu 292. In the preferred embodiments of the present invention, a pending purchase can be removed from list 290 by pressing stop key 282 with a particular purchase highlighted. For example, with "9/18 The Fugitive" highlighted in menu 292, pressing stop key 282 causes "9/18 The Fugitive" to be removed from subsequent list 296 in subsequent menu 294. As with highlighting different settings 249 in the general settings menu, the IPPV purchases are highlighted by positioning the IPPV purchase within cursor 255 using up and down arrow keys 128. Like the cursor in the general settings menu, cursor 255 is preferably fixed in the vertical position.

When done reviewing list 290 of past and pending IPPV purchases, the subscriber may press the "A" application definable key 252 to exit. In response, the present invention removes the list from right side 248 of the general settings menu, replaces the list with an updated summary indicator 300, and highlights IPPV Purchases setting 286. In an alternative embodiment of the present invention (not shown), the subscriber may also press "C" application definable key 252 to cancel any IPPV cancellations that were made by highlighting a pending IPPV event and pressing stop key 282.

Figure 14:
FIG. 14 is an illustrative screen display of a general setting menu of a set-top terminal of a preferred embodiment of the present invention.

FIG. 14 illustrates an embodiment of the all timers setting of the general settings menu. As shown, selecting all timers setting 323 within general settings menu 322 causes list 325 of type 324, day 326, date 330, time 332, channel number 334, and channel call sign 336 for each active timer in set-top terminal 6 to be displayed. As with IPPV purchases (see the description accompanying FIG. 13), pressing stop key 282 with any timer highlighted causes that timer to be canceled and accordingly removed from all timers list 325. As indicated by up and down arrow indicators 327 and 329, up and down arrow keys 128 are used to highlight timers within list 325 by positioning a timer within cursor 255. As with the other settings, cursor 255 is preferably fixed in the vertical position. Once the subscriber has completed reviewing and modifying all timers list 325, the subscriber may accept the changes by pressing "A" application definable key 252 as indicated by prompt 328. In an alternative embodiment of the present invention (not shown) the subscriber may also press "C" application definable key 252 to cancel any timer cancellations made by highlighting a timer and pressing stop key 282.

Figure 15:
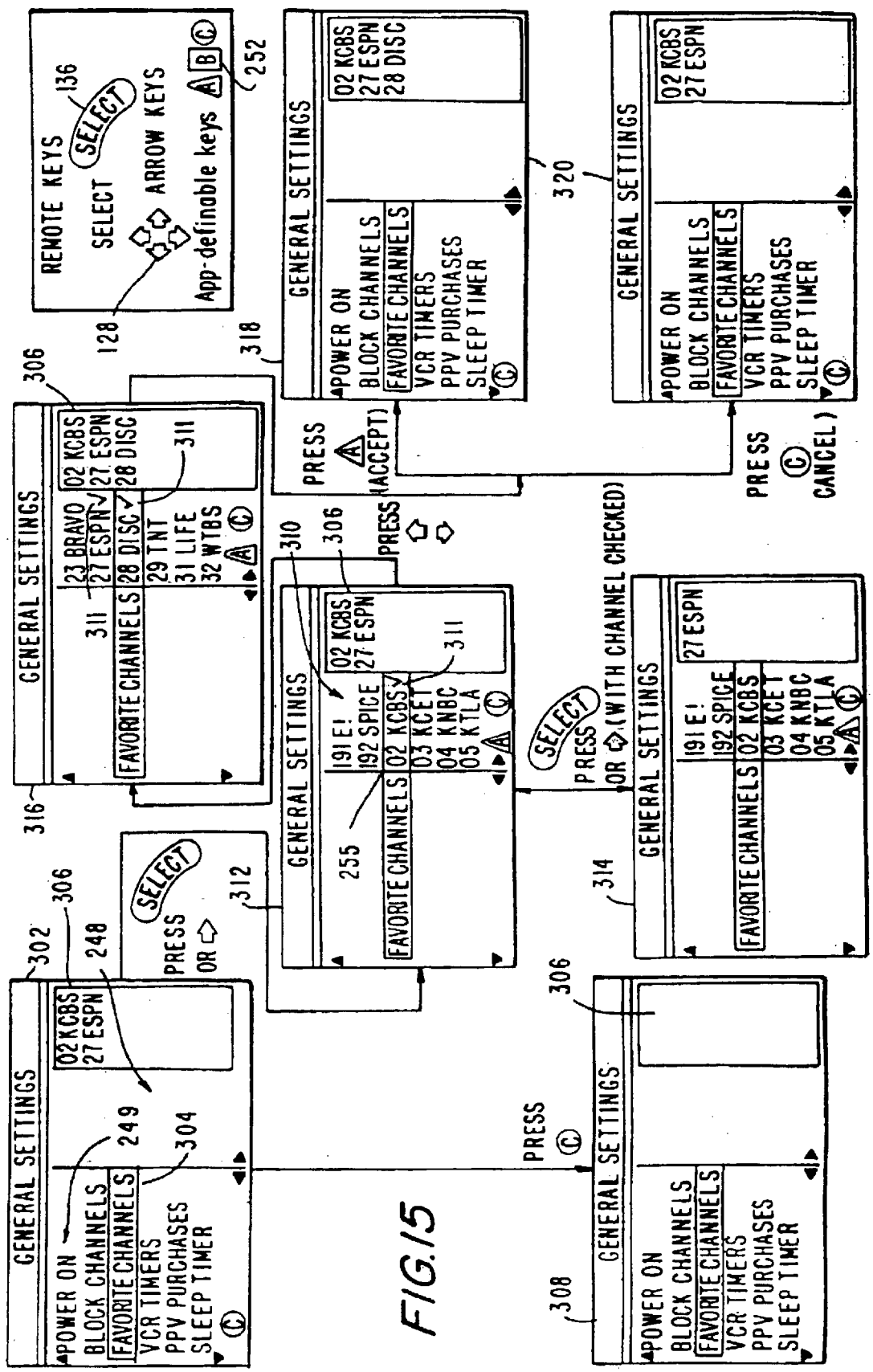
FIG. 15 is a flow diagram illustrating a general setting function of a set-top terminal of a preferred embodiment of the present invention.

The favorite channels setting of the general settings menu is shown in FIG. 15. By selecting favorite channels setting 304 of general settings list 249 the subscriber causes listing 306 of favorite channels to be displayed on right side 248 of general settings menu 302. Pressing "C" application definable key 252 causes list 306 to be cleared as represented by list 306 in menu 308. Pressing right arrow key 128 or select key 136, however, brings up an available channel list 310 as shown in menu 312. List 310 shows all of the available channels along with check marks 311 next to the channels which are included in favorite channel listing 306. Pressing right arrow key 128 or select key 136 while a channel within available channel list 310 is highlighted causes the highlighted channel to be toggled to and from favorite channel list 306 as shown in menu 314. That is, if the channel is included in list 306, and therefore checked in list 310, pressing right arrow key 128 or select key 136 causes the channel to be removed from favorite channel list 306 and unchecked in list 310. On the other hand, with a channel not listed in favorite channel list 306, and therefore not checked in available channel list 310, pressing right arrow key 128 or select key 136 causes the channel to be added to favorite channel list 306 and checked in available channel list 310. As with other settings within the general settings menu, channels within list of available channels 310 are highlighted by positioning the channel within cursor 255 by pressing up and down arrow keys 128. General settings menu 316 illustrates a preferred embodiment of the present invention in which cursor 255 remains in fixed vertical position within list 310. As shown, available channel list 310 was scrolled from that shown in menu 312 to highlight "28 DISC." Once highlighted, right arrow key 128 or select key 136 was pressed to add "28 DISC" to favorite channel list 306.

When the subscriber has finished viewing and editing favorite channel list 306, the subscriber may exit the favorite channels setting by pressing "A" or "C" application definable keys 252. Pressing "A" key 252 causes the additions and deletions to be accepted by set-top terminal 6 as shown in general settings menu 318. Pressing "C" key 252, however, causes all changes to be discarded and favorite channel list 306 to remain as it was prior to modification as illustrated in general settings menu 320.

Figure 16:
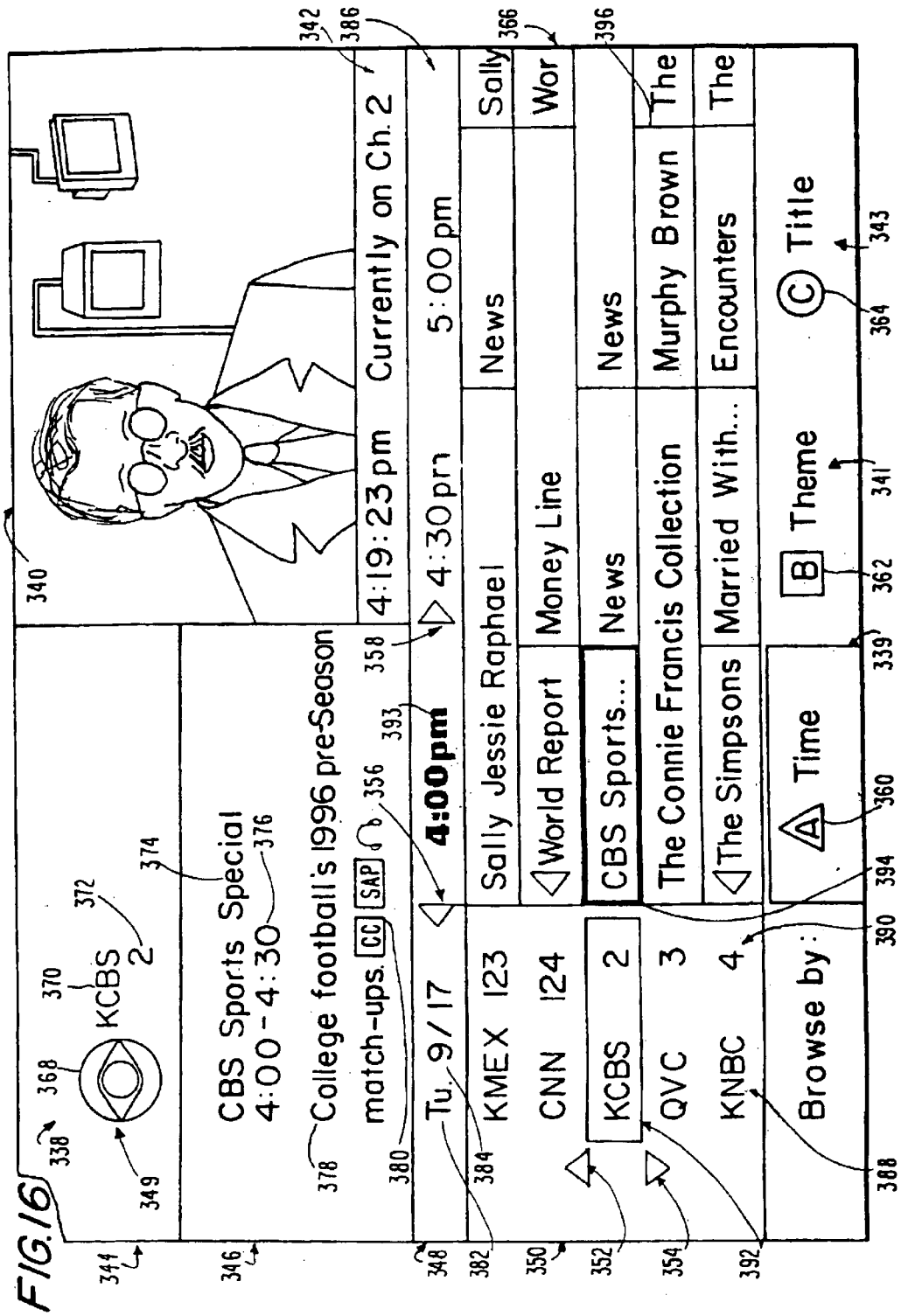

FIG. 16 illustrates the time mode of interactive program guide (IPG) 338 of the preferred embodiments of the present invention. As shown, guide 338 includes program viewing window 340, current time and channel indicator 342, highlighted channel banner 344, highlighted program summary 346, guide date and time bar 348, channel list 350, program grid 366, and key indicators 352, 354, 356, 358, 360, 362, and 364. As shown, region 339 around indicator 360 is highlighted as compared with regions 341 and 343 around indicators 362 and 364, respectively, to indicate that the interactive program guide is in the time mode rather than alternative theme or title modes. Program viewing window 340 displays a reduced size display of the normal television display so that the program being viewed prior to entering the program guide may continue to be viewed while in the guide. Incorporated into program viewing window 340 is a current time and channel indicator 342. Indicator 342 may be transparent or opaque, and displays the time and channel number currently being displayed. Highlighted channel banner 344 may indicate logo 368, call sign 370, and number 372 for the channel highlighted in channel list 350 by channel shadow 392. Highlighted program summary 346 may list program name 374, running time 376, brief description 378, and icons 380 indicating applicable characteristics of the program such as closed captioning, second audio program (SAP), and stereo for the program highlighted in program grid 366 by program cursor 394. Guide date and time bar 348 lists in a preferably horizontal arrangement, from left to right, day 382, date 384, and times 386 of programs listed in program grid 366. Times 386 are typically incremented in half hour steps, and span one and a half hours, although other time increments and spans can be used. Channel list 350 is positioned beneath day 382 and date 384 indicators of guide date and time bar 348, and lists call signs 388 and channel numbers 390 for each of the channels available to the subscriber. As shown, only a portion of channel list 350 is usually displayed as indicated by up and down arrow indicators 352 and 354.

Program grid 366 includes a plurality of rows, each including at least one program cell 396. The number of rows in grid 366 matches the number of displayed channels in channel list 350, and each row in grid 366 is horizontally aligned with the displayed channels in channel list 350 so that the displayed channels act as labels for each row. The size of each cell 396 in grid 366 is a function of the running time of the program identified in that cell. For example, the cell entitled "Encounters" in grid 366 is one half hour long to indicate that the program "Encounters" is one half hour long. Similarly, the cell entitled "Money Line" in grid 366 is one hour long to indicate that the program "Money Line" is one hour long. The start time of each program identified in a respective cell can be determined by referring to the time indicated in date and time bar 348 directly above the leftmost end of each cell. For example, the program entitled "Money Line" begins at 4:30 p.m. as indicated by the time indicator "4:30 p.m." positioned directly above the leftmost end of the cell identifying "Money Line."

The subscriber of interactive program guide 338 navigates the program listings of grid 366 to highlight a desired program cell 396 with cursor 394 by pressing up, down, left, and right arrow keys (not shown) as indicated by up, down, left, and right arrow indicators 352, 354, 356, and 358. In the preferred embodiments, cursor 394 is always shadowed in channel list 350 by channel shadow 392 and in date and time bar 348 by time shadow 393. In these embodiments, channel shadow 392 always remains horizontally aligned with cursor 394 to indicate the channel on which the program highlighted by cursor 394 can be found. Similarly, in these embodiments, time shadow 393 always remains vertically aligned with cursor 394 to show the beginning of the time frame highlighted by cursor 394. For example, "KCBS 2" in channel list 350 and "4:00 p.m." in date and time bar 348 are shadowed by channel shadow 392 and time shadow 393, respectively, to indicate that "CBS Sports . . . " is on channel "KCBS 2" at "4:00 p.m."

In the preferred embodiment of the present, invention, cursor 394 does not move within grid 366 of the interactive program guide. Program cells 396 of grid 366, call signs 388 and channel numbers 390 of channel list 350, and times 386 of date and time bar 348 scroll instead. For example, as a subscriber presses up and down keys 128 (on remote control 59 or keypad 53 on set-top terminal 6), call signs 388 and channel numbers 390 in channel list 350 and program cells 396 in grid 366 scroll down and up, respectively. As the subscriber presses left and right arrow keys 128, times 386 in date and time bar 348 and program cells 396 in grid 366 scroll right and left, respectively. In the vertical directions, call signs 388, channel numbers 390, and cells 396 scroll one row for each depression of up or down arrow key 128. In the horizontal direction, times 386 and cells 396 scroll one time increment (e.g., one half hour as illustrated) for each depression of the left or right arrow key 128. Alternatively, times 386 and cells 396 can horizontally scroll to the next program cell 396 immediately following the currently highlighted program cell 396 when the subscriber presses right arrow key 128, and scroll to the previous program cell 396 immediately preceding the currently highlighted program cell 396 when the subscriber presses left arrow key 128. After the cells have scrolled up or down, or left or right, the stationary cursor 394 expands or contracts to highlight (preferably entirely) the leftmost program cell, and only the leftmost program cell, that has moved under the cursor's stationary position. Thus, the stationary cursor reacts in the same manner (to highlight the underlying cell) irrespective of the direction of movement of the underlying program grid 366.

As shown in FIG. 16, in a preferred embodiment of the present invention, channel list 350 rolls over when either the beginning or end of the list is reached. For example, as a subscriber scrolls list 350 upward, thereby giving the appearance of the channel shadow moving downward with respect to the list, the subscriber eventually reaches the end of the list of available channels. Rather than simply preventing the subscriber from scrolling list 350 any further when at the end of the list, set-top terminal 6 displays the beginning of the list following the end of the list and allows the channel shadow to move to the top of the list. Channel list 350 thus appears to be a circular list of channel numbers. Similarly, when the subscriber scrolls list 350 downward, thereby giving the appearance of the channel shadow moving upward with respect to the list, the bottom of list 350 will appear as the subscriber scrolls past the beginning of list 350. This feature of list 350 may also be applied to other lists within the present invention, including lists of settings, IPG guide data (in grid format), etc. Alternatively, the present invention can incorporate lists that do not roll over. In those cases, the subscriber cannot continue scrolling the channel list in the same direction once the top or bottom of the channel list has been reached.

As described in connection with FIG. 5, the present invention makes special provisions for channels which are split in time between two or more sources. As shown in FIG. 17, channel "147" within interactive program guide display 361 is split between "BRAV" 363 and "LIFE" 365. As illustrated, channel "147" switches from "BRAV" to "LIFE" at 5:00 p.m. Similarly, other splitting arrangements can be configured. For example, channel "147" (or any other channel number) can be used for three different daily sources, such as "BRAV" from 12:00 a.m. to 7:59 a.m., "LIFE" from 8:00 a.m. to 3:59 p.m., and "QVC" from 4:00 p.m. to 11:59 p.m. In such an arrangement, channel 147 can be presented in program grid 366 in at least two manners. First, each of the sources, "LIFE," "BRAV," and "QVC," can be assigned a row in grid 366 at all times during the day regardless of whether the source is "ON AIR" during the time window displayed in the guide. Second, only those sources that are at least partially "ON AIR" during the time window displayed in the guide are allocated a line in grid 366. In this second approach, for example, displaying programs with times ranging from 3:00 p.m. to 4:30 p.m. shows a split at 4:00 p.m. with only two lines of the program guide allocated to channel 147.

Figure 18:
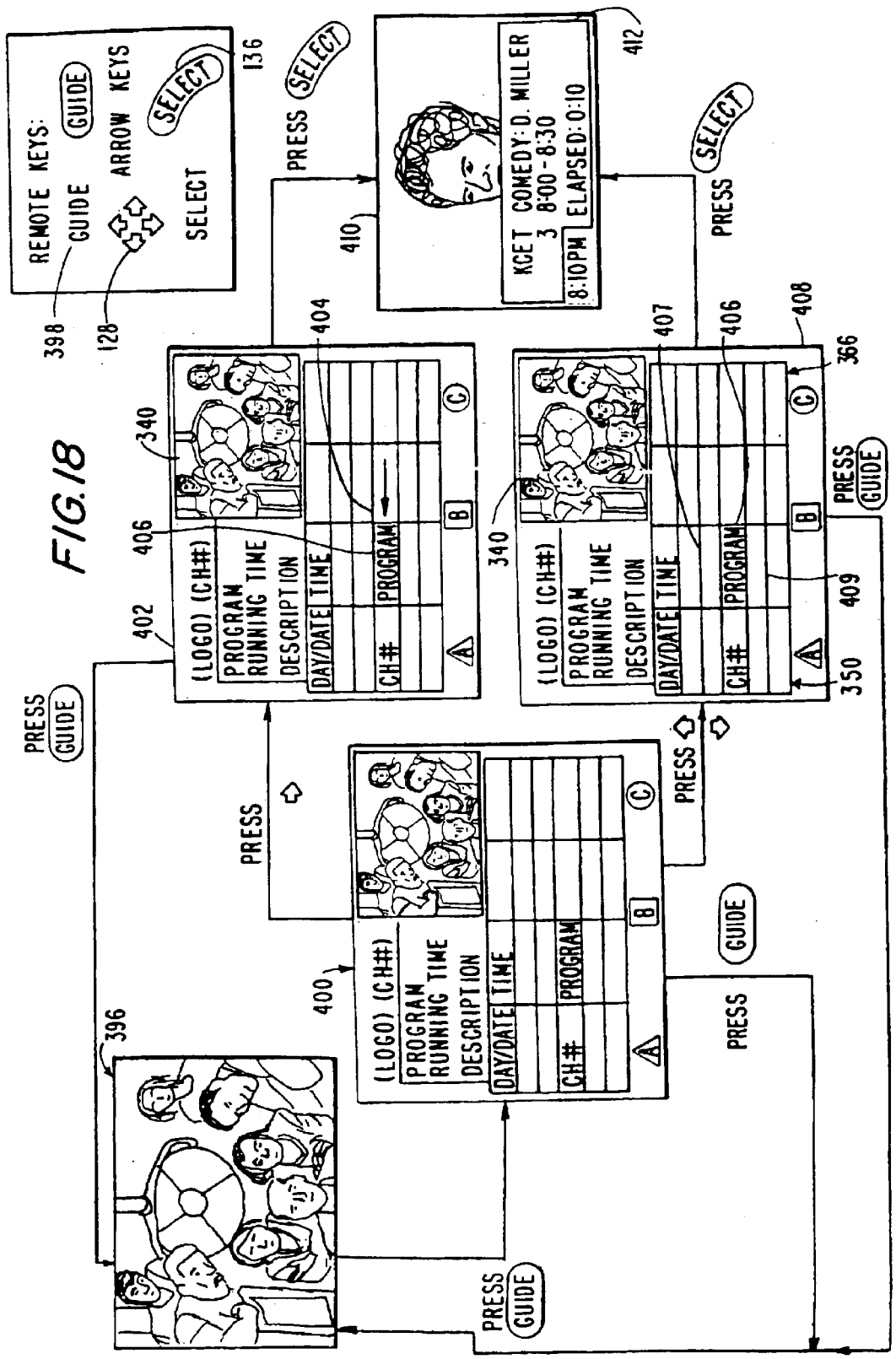
FIG. 18 is a flow diagram illustrating entry, navigation, and tuning within the time mode of an interactive program guide of a set-top terminal of a preferred embodiment of the present invention.

FIG. 18 further illustrates the navigation features of the interactive program guide of the preferred embodiments of the present invention. Pressing guide key 398 from any television display 396 causes set-top terminal 6 to enter the time mode of interactive program guide 400. As shown, pressing right arrow key 128 causes the contents of cell 404 to scroll to cell 406 as illustrated in IPG 402. Similarly, the contents of all other cells scroll from their current position to the cell immediately to their left. Likewise, pressing left arrow key 128 causes the contents of the cells to scroll to the right. Thus the cell contents scroll in time, causing the cursor to highlight either the contents of an earlier or later cell under the action of left and right arrow keys 128, respectively. Similarly, pressing either up or down arrow keys 128 causes the cell contents to scroll vertically either down (with the contents of cell 407 moving to the position of cell 406) or up (with the contents of cell 409 moving to the position of cell 406), respectively, as shown in IPG 408. As the cell contents of grid 366 scroll up and down, the contents of channel list 350 also simultaneously scroll in the same direction.

After scrolling the contents of grid 366 to highlight a program other than the one currently being displayed, pressing select key 136 causes the interactive program guide to be removed from the display and the channel selection function to select the new program as illustrated by display 410. As shown, a program information banner 412 may be incorporated into display 410 for a fixed period of time (e.g., two seconds) to indicate to the subscriber that the selected program is being displayed. In cases where the subscriber does not wish to switch to a new program, pressing guide key 398 with the interactive program guide displayed causes the display to revert back to original television display 396.

Figure 19:
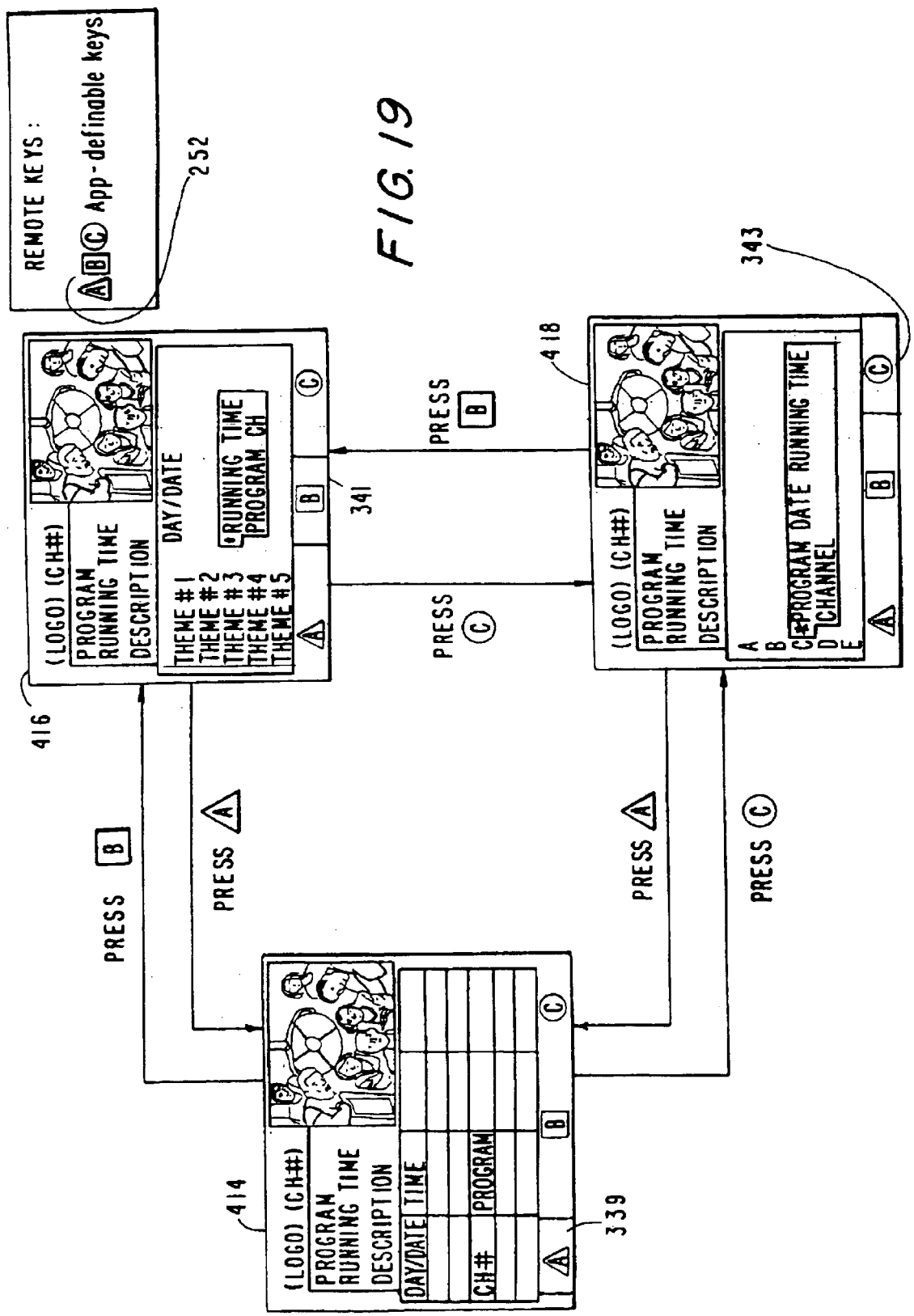
FIG. 19 is a flow diagram illustrating switching modes within an interactive program guide of a set-top terminal of a preferred embodiment of the present invention.

FIG. 19 illustrates switching between different modes of the interactive program guide. From time mode display 414 of the guide, pressing "B" application definable key 252 causes theme mode display 416 of the guide to be presented. As illustrated, region 341 is highlighted to indicate the theme mode. Pressing "C" application definable key 252 from time mode display 414 causes title mode display 418 of the guide to be displayed. Similar to the theme mode, region 343 is highlighted to indicate the title mode. From either the theme mode or title mode, pressing "A" application definable key 252 causes the display to switch to time mode display 414. From the theme mode, pressing "C" application definable key 252 causes title mode display 418 to be displayed. From title mode display 418, pressing "B" application definable key 252 causes theme mode display 416 to be displayed. Accordingly, pressing "A" key 252 from any IPG display causes time mode display 414 to be displayed, pressing "B" key 252 from any IPG display causes theme mode display 416 to be displayed, and pressing "C" key 252 from any IPG display causes title mode display 418 to be displayed.

Figure 20:
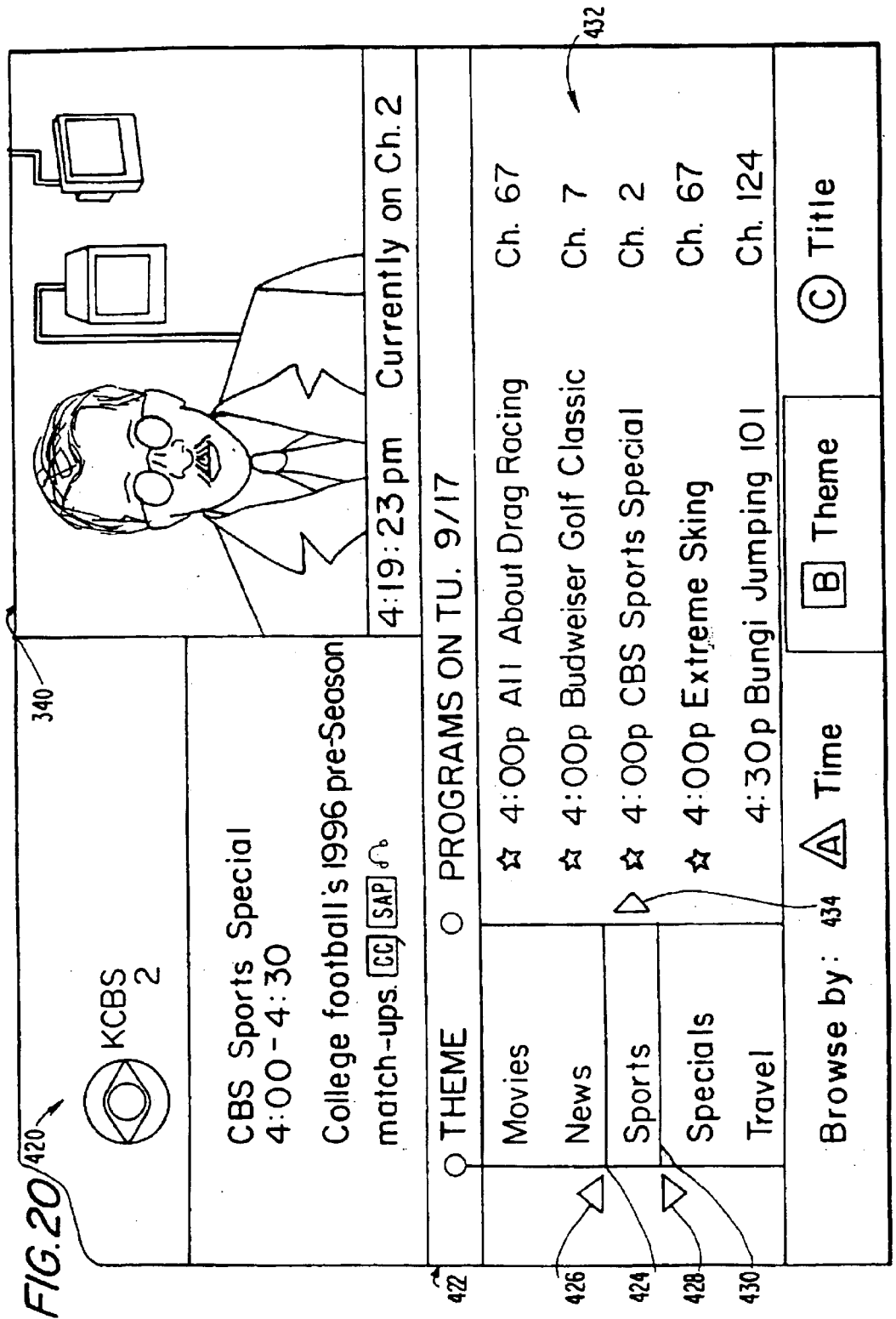
FIGS. 20–21 are illustrative screen displays of a theme mode of an interactive program guide of a set-top terminal of a preferred embodiment of the present invention.

The theme mode display of the interactive lo program guide is further illustrated in FIG. 20. As shown, date and time bar 348, channel list 350, and program grid 366 of the title mode display (FIG. 16) are replaced by theme and programs bar 422, theme list 424, and program list 432 in theme mode display 420. Similarly to channel listing 350, all available themes will not be displayed simultaneously when the length of themes listing 424 is greater than the available space in theme mode display 420. Up and down arrow indicators 426 and 428 are provided to indicate to the subscriber that list 424 may be scrolled by pressing up or down arrow keys (not shown). Using up and down arrow keys, the subscriber can scroll list 424 to highlight a desired theme with cursor 430. A right arrow indicator 434 is also provided to indicate to the subscriber that a highlighted theme must be selected by pressing right arrow key (not shown) or select key (not shown) to scroll though program list 432. As shown, when the subscriber enters theme mode display 420, the default theme and highlighted program may correspond to the program being viewed in program viewing window 340 or, alternatively, a highlighted program in a prior mode display of the interactive program guide. For example, entering the interactive program guide while watching "CBS Sports Special" and then selecting the theme mode will cause the theme "Sports" to be highlighted with "CBS Sports Special" centered in program list 432 next to right arrow indicator 434.

Figure 21:
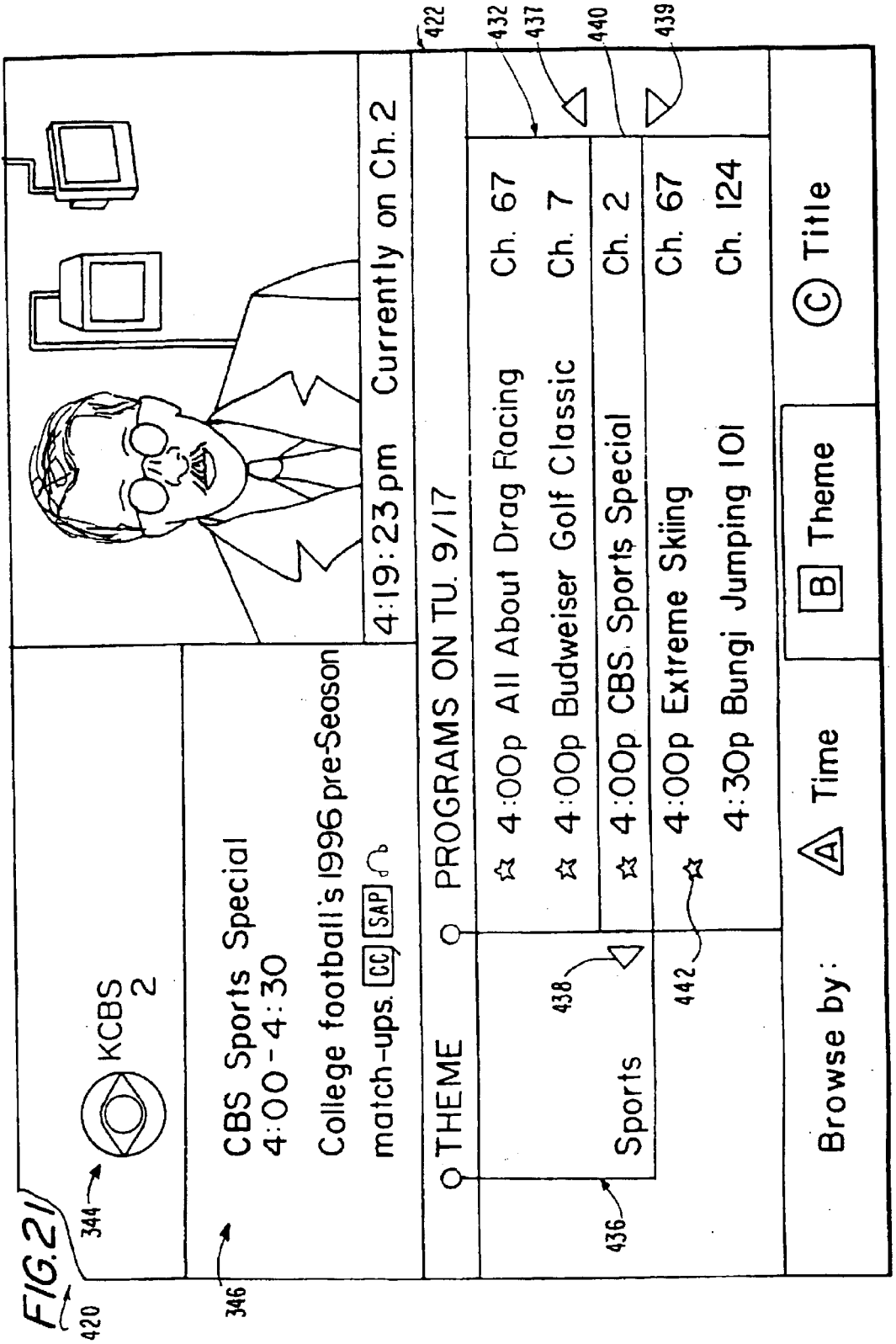

Once the subscriber has highlighted and selected a theme from theme list 424, set-top terminal 6 replaces theme list 424 with a selected theme indicator 436 as illustrated in FIG. 21. Up and down arrow indicators 437 and 439 are also provided to indicate that the subscriber may scroll through and highlight with cursor 440 a program within program list 432 by pressing up and down arrow keys 128. As with other lists in the present invention, cursor 440 is preferably stationary within the IPG display and list 432 scrolls to make the cursor appear to move with respect to list 432.

In some embodiments of the present invention, by scrolling through program list 432 the subscriber can see not only those programs within the selected theme, but also programs in other themes. This is facilitated by program list 432 comprising all programs for which data is available and by program list 432 being sorted primarily by program theme. In addition to being primarily sorted by theme, programs in program list 432 may also be secondarily sorted by time and title (as shown) or by any other set of program characteristics. When a subscriber selects a particular theme, set-top terminal 6 displays that portion of program list 432 in which the programs of the selected theme are positioned. The subscriber may then scroll through not only that portion of the list containing the programs of the selected theme but also programs in other theme areas.

By highlighting a desired program in program list 432, information for that program may be displayed to the subscriber. As shown in FIG. 21, information for the program highlighted in program list 432 is displayed in channel banner 344 and program summary 346. More particularly, channel banner 344 may indicate the channel number, call sign, and logo for the channel showing the highlighted program, and program summary 346 indicates the program title, running time, description, and characteristics for the highlighted program. As also shown, redundant information such as the date of the programs listed in program list 432 may be incorporated into theme and programs bar 422 when appropriate to save space in theme mode display 420. Stars 442 (or any other symbol) may be indicated for those programs in list 432 currently available for viewing. Likewise, other indicators can be displayed to indicate other program characteristics such as favorite channel, blocked channel, etc.

Once a subscriber has completed viewing the program list 432, the subscriber may select a program for viewing or alternatively return to the theme list to select another theme. The subscriber may select a program for viewing by highlighting a program with cursor 440 and then pressing the select key (not shown). Set-top terminal 6 then switches to the corresponding channel when the program is a past or current program, or sets a reminder timer when the program is on at some future time. Alternatively, the subscriber may return to theme list 424 to select another theme by pressing the left arrow key (not shown) as indicated by left arrow indicator 438.

Figure 22:
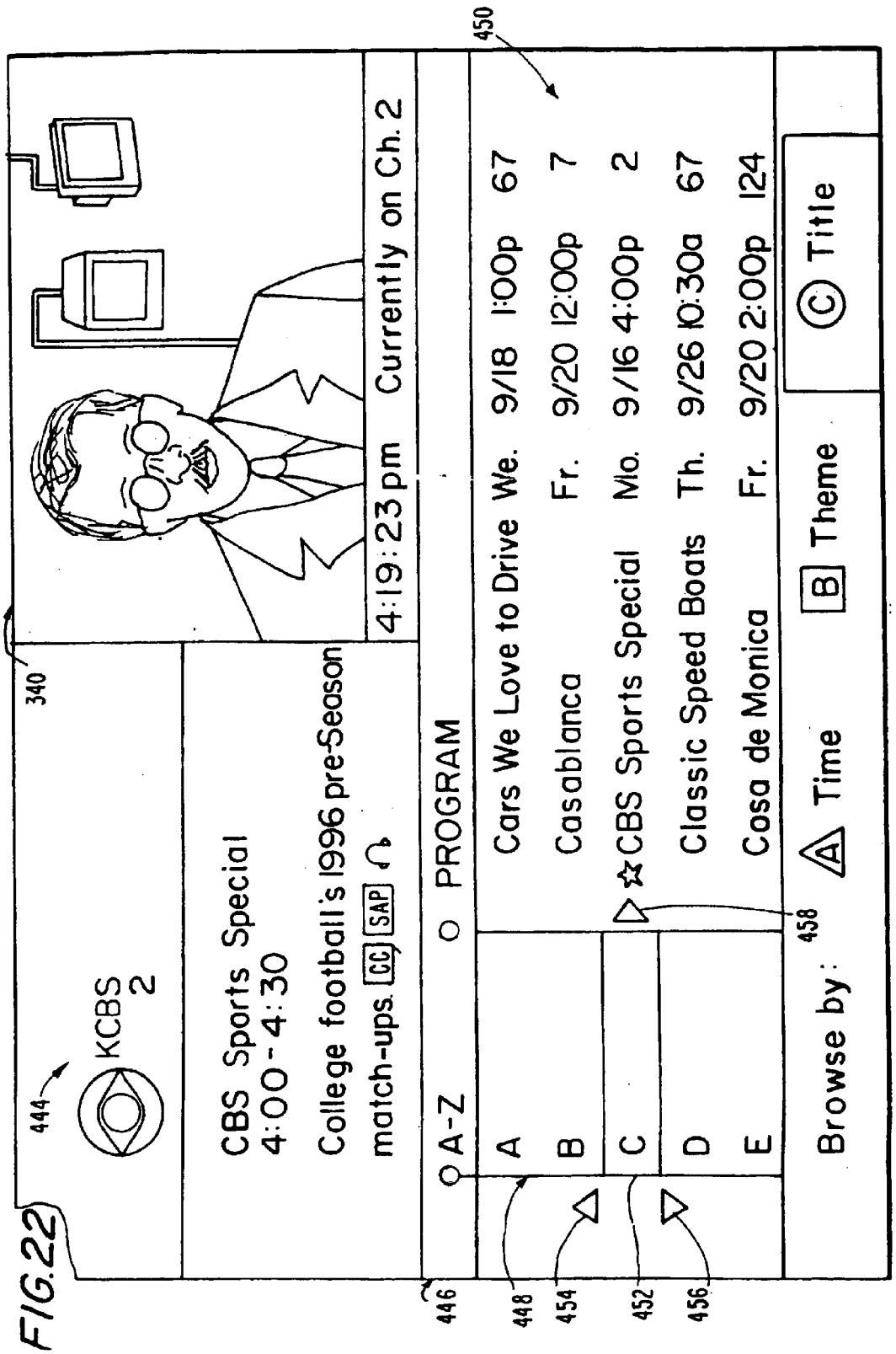
FIGS. 22–23 are illustrative screen displays of a title mode of an interactive program guide of a set-top terminal of a preferred embodiment of the present invention.

The title mode of the interactive program guide of the present invention is illustrated in FIG. 22. Like the theme mode, the title mode replaces date and time bar 348, channel list 350, and program grid 366 of the time mode display (FIG. 16) with alphabet and program bar 446, alphabet list 448, and program list 450 as shown in title mode display 444. Alphabet list 448 displays the letters of the alphabet from A through Z and allows the subscriber to highlight a desired letter using cursor 452. Similarly to the theme mode display, a default letter and program name are displayed upon entering the title mode display of the interactive program guide. The default letter and program name selected may be based upon the program currently displayed in program viewing window 340 or, alternatively, a program highlighted in a previous mode of the interactive program guide. For example, if "CBS Sports Special" is being displayed in program viewing window 340, the default letter and program are accordingly "C" and "CBS Sports Special," respectively.

By using up and down arrow keys (not shown), as indicated by up and down arrow key indicators 454 and 456, a subscriber can highlight a desired letter with cursor 452 by scrolling alphabet list 448. As with other lists in the present invention, cursor 452 is preferably stationary within the IPG display and list 448 scrolls to make the cursor appear to move with respect to list 448. Once a desired letter has been highlighted, the subscriber may select that letter and enter program list 450 by pressing right arrow key (not shown) or select key (not shown), as indicated by the right arrow indicator 458.

Figure 23:
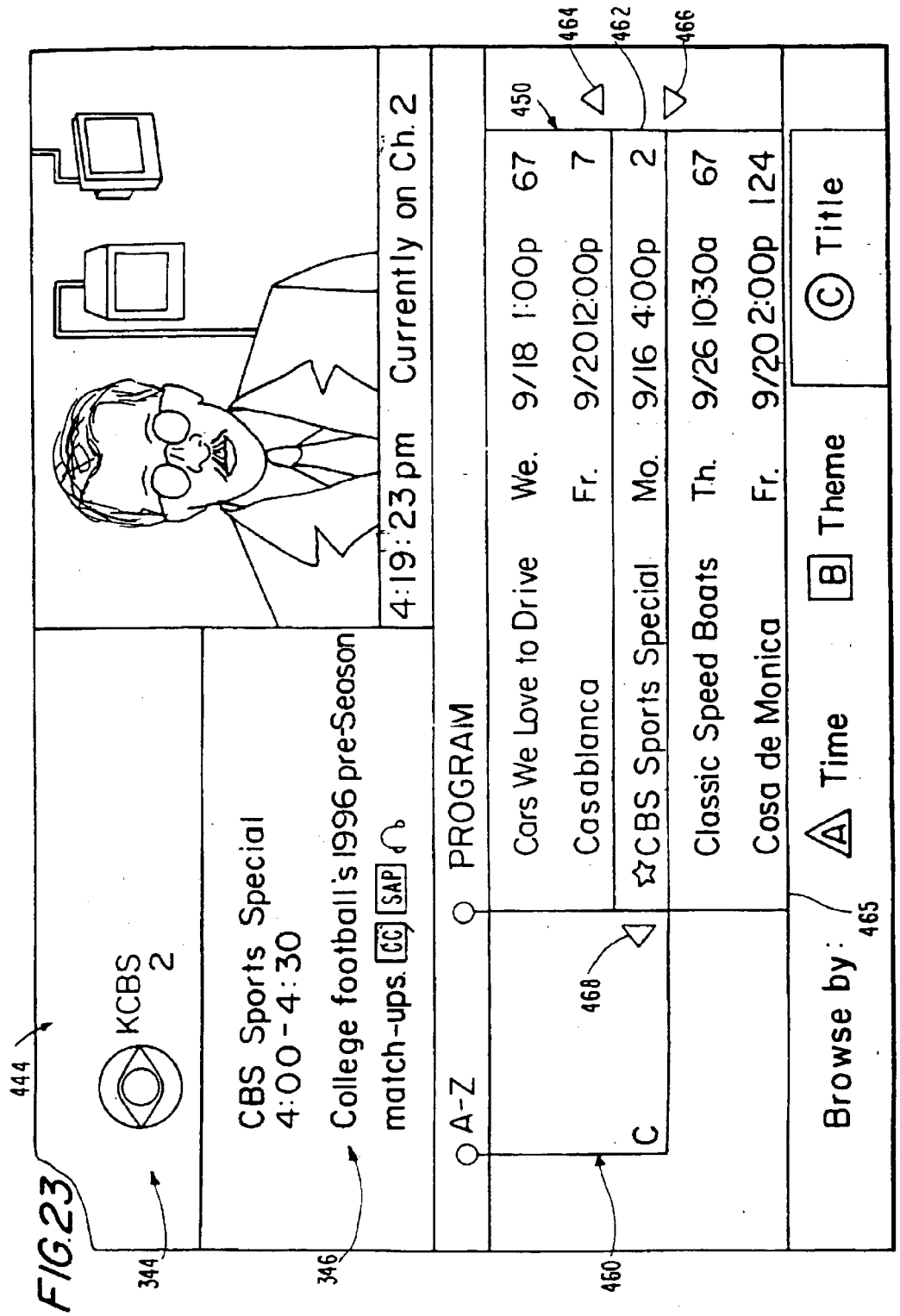

As shown in FIG. 23, once the subscriber has selected a letter from alphabet list 448 (FIG. 22), a selected letter indicator 460 replaces alphabet list 448 to indicate that a letter has been selected, and a cursor 462 appears in program list 450. This cursor is used to scroll through and highlight a program in program list 450. Up and down arrow indicators 464 and 466 are provided in display 444 to indicate to the subscriber that program list 450 is scrolled by pressing up and down arrow keys 128. As with other lists in the present invention, cursor 462 is preferably stationary within the IPG display and list 450 scrolls to make the cursor appear to move with respect to list 450.

In some embodiments of the present invention, a subscriber can see not only those programs beginning with the letter selected from alphabet list 448 by scrolling through program list 450, but also those programs beginning with other letters. This is facilitated by including in list 450 all programs for which data is available and sorting the list by program title. When displaying the list to a subscriber after the subscriber has selected a letter from list 448, set-top terminal 6 centers the displayed portion of list 450 on the portion of the list with program titles that begin with the selected letter.

Once a program has been highlighted using cursor 462, channel banner 344 and program summary 346 each display information for the highlighted program. More particularly, channel banner 344 indicates the channel number, call sign, and logo for the channel showing the highlighted program, and program summary 346 indicates the program title, running time, description, and characteristics for the highlighted program. As with the theme mode display, stars 468 may be displayed adjacent to some programs to indicate that those programs are currently available for viewing. Similarly, other icons can be displayed to indicate other characteristics of the programs in program list 450 such as favorite channel, blocked channel, etc.

Once a subscriber has completed viewing program list 450, the subscriber may select another letter from alphabet list 448 by pressing the left arrow key (not shown) as indicated by left arrow indicator 468. Alternatively, by pressing the select key (not shown) when any program is highlighted by cursor 462, the program guide switches to the corresponding channel if the program is a past or current program, or sets a reminder timer if the program is on at some future time.

Figure 24:
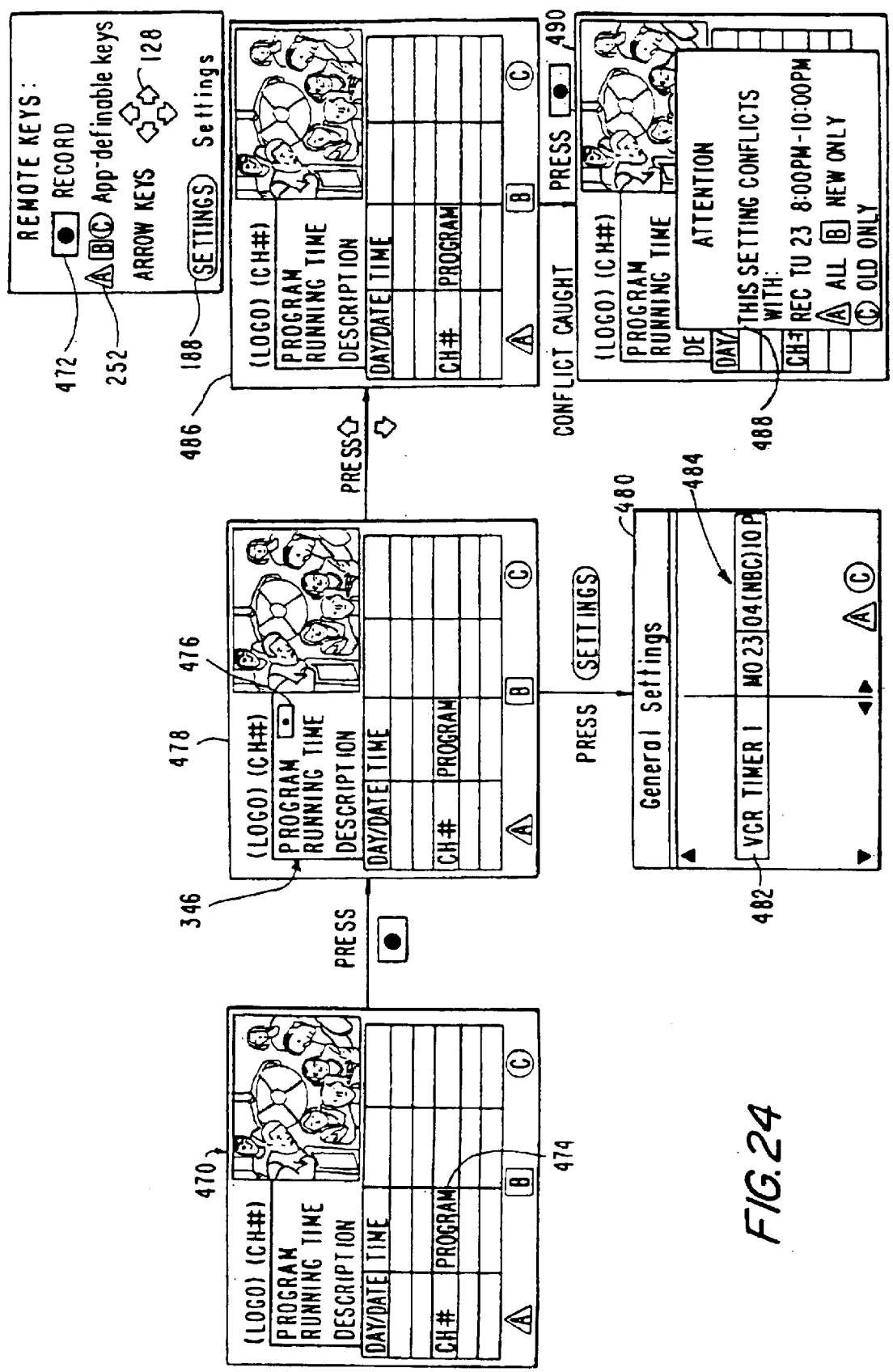
FIGS. 24–27 are flow diagrams illustrating the operation of an interactive program guide of a set-top terminal of a preferred embodiment of the present invention.

FIG. 24 illustrates the One-Touch Recording (OTR) feature of the present invention. From an interactive program guide display 470, pressing record key 472 with a program 474 highlighted causes a VCR timer to be set up for the highlighted program 474 and a to-be-recorded indicator 476 to appear in program summary 346, as illustrated in display 478. To fine-tune the settings of the VCR timer set up by the OTR feature, the subscriber may enter the general settings menu by pressing settings key 188. As shown in general settings menu 480, by highlighting and selecting VCR timers setting 482, the subscriber can modify the recording settings 484 for highlighted program 474.

As discussed in connection with the general settings menu (see FIG. 12), conflict detection and resolution is also incorporated into the OTR feature of the present invention. Conflict detection and resolution detects and alerts the set-top terminal subscriber of possible timer conflicts at the time the timers are set up to prevent timers from being erroneously set or over-written. For example, the OTR feature will alert the subscriber if an attempt is made to simultaneously record two or more programs as illustrated in FIG. 24. As shown, if after having set up a program to be recorded using One-Touch Recording (display 478), the subscriber attempts to record another program which is being shown at the same time by first highlighting (display 486) and then pressing record key 472, an attention banner 488 will be displayed (display 490) warning the subscriber of the conflict and enabling the conflict to be resolved.

Figure 25:
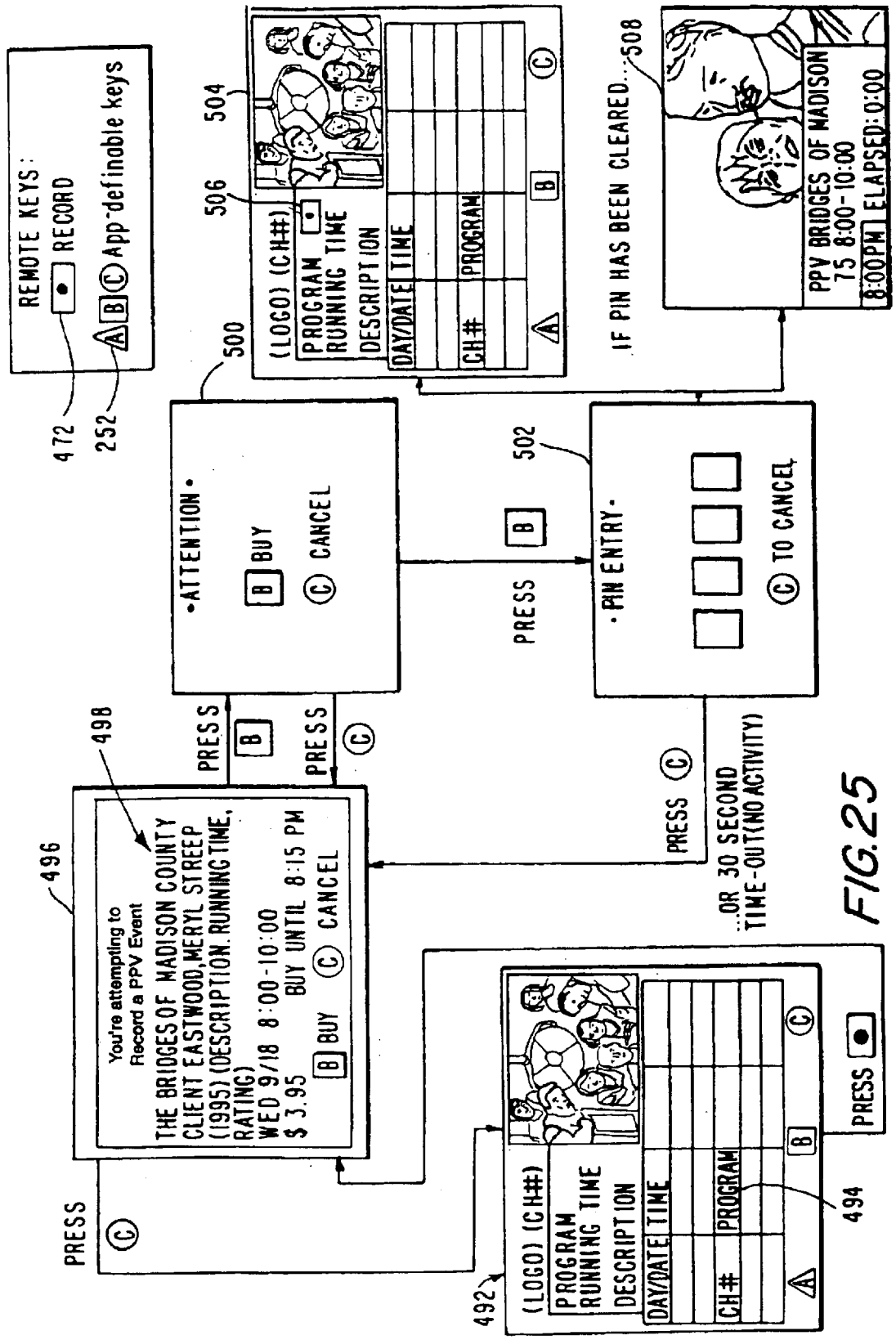

The One-Touch Recording feature of the present invention also automatically warns the subscriber if an attempt is made to record an Impulse Pay-Per-View program without having previously made arrangements to purchase the program. As shown in FIG. 25, pressing record key 472 with an Impulse Pay-Per-View program 494 highlighted causes a buy option window 496 to be displayed. In addition to providing the subscriber with a summary of program information 498, "B" and "C" application definable keys 252 are monitored to determine if the subscriber would like to purchase the program or cancel the OTR event. If the subscriber presses "B" application definable key 252 with buy option window 496 displayed, a buy confirmation window 500 is provided to confirm the subscriber's purchase request. If in response to the buy confirmation window 500 the subscriber presses "C" application definable key 252, the display will revert to buy option window 496. If the subscriber presses "B" application definable key 252 in response to buy confirmation window 500, set-top terminal 6 will prompt the subscriber for a purchase pin through a purchase PIN entry window 502. If the PIN entered by the subscriber matches the PIN's predefined value, the display will switch back to interactive program guide display 504 and note the future recording by providing a record icon 506 when the program to be recorded is a future event, or will immediately display the Impulse Pay-Per-View event, as illustrated by display 508, when the event is currently being shown.

Figure 26:
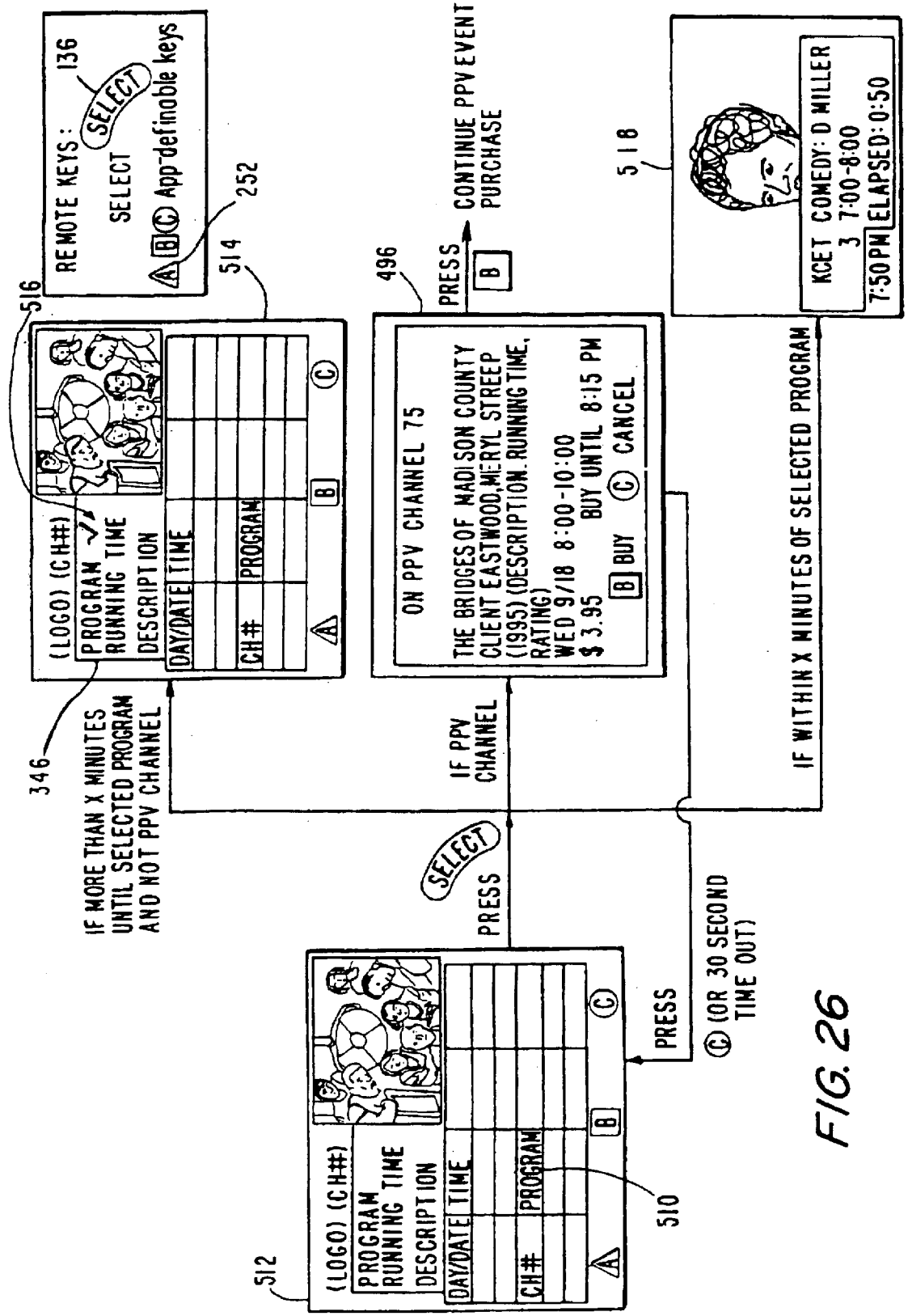

FIG. 26 illustrates the reminder timer function of the present invention. With a program 510 highlighted within an interactive program guide display 512, pressing select key 136 causes one of three things to occur. First, if the time between the current time and the start time of the program selected exceeds a threshold amount and the program selected is not on an Impulse Pay-Per-View channel, a reminder timer icon 516 is displayed in program summary 346 to indicate that set-top terminal 6 has set a reminder timer to remind the subscriber to watch the selected program as illustrated by display 514. Second, set-top terminal 6 will display a buy option window 496 when the subscriber has selected a program on an Impulse Pay-Per-View channel. The interaction with this window matches that for the recording of Impulse Pay-Per-View programs as described in connection with FIG. 25. Third, if the current time is within a threshold amount of time before the starting time of the selected program, set-top terminal 6 will tune to the channel on which the selected program is to be aired as illustrated by display 518.

Figure 27:
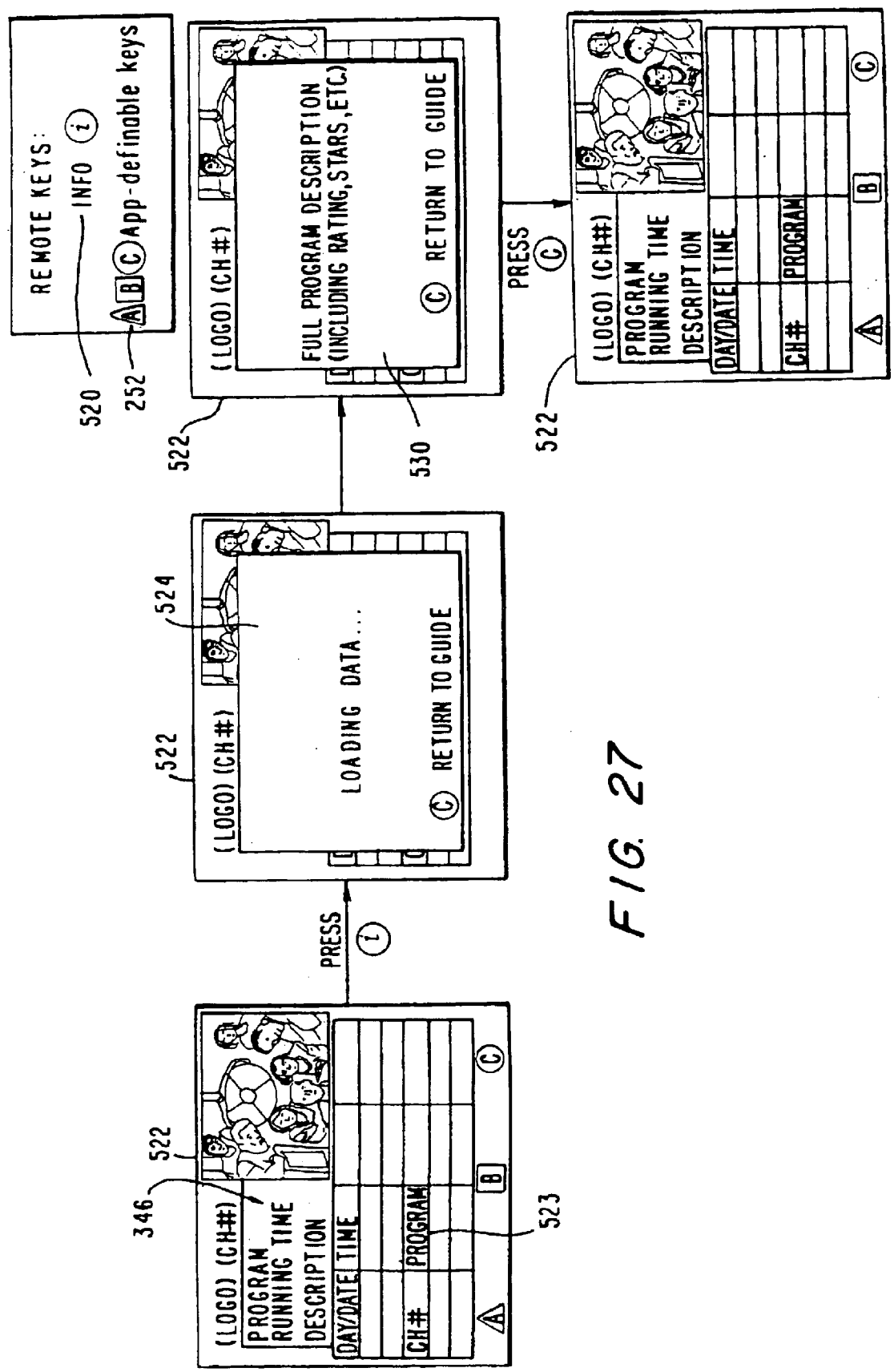

In addition to the information normally available in the program summary of the interactive program guide of the present invention, additional information may also be requested for a highlighted program by the subscriber pressing the information key on the set-top terminal or its remote control. FIG. 27 illustrates this process in a preferred embodiment of the present invention. After highlighting a program 523 within an interactive program guide display 522, the subscriber may request more information for the highlighted program by pressing information key 520 if the information provided in program summary 346 is inadequate. Set-top terminal 6 may then incorporate a loading data window 524 into display 522 while retrieving the requested information. Once the information has been retrieved, loading data window 524 is replaced by a full description display window 530. Full description display window 530 may include such information as a description of the program, the program's rating, the program's reviews, a list of the actors and actresses staring in the movie, etc. Once the subscriber has completed viewing full description display window 530, pressing "C" application definable key 252 will cause full description display 530 to be removed and a fresh interactive program guide display 522 to be displayed.

The information displayed in the interactive program guide of the present invention may be sent to set-top terminal 6 from headend 2 in at least three ways. First, the information may be periodically transmitted to set-top terminals 6, whereby the terminals store the information in their internal memory for use when necessary. Second, the information may be continuously transmitted to set-top terminals 6, whereby the terminals need not store the information in their internal memory, but rather accept the information required for display and discard all of the rest as the information is received. Third, the information may be requested when needed by a set-top terminal 6 over the return data channel of the present invention, after which headend 2 transmits the requested information back to the set-top terminal. Additionally, combinations of these approaches can also be implemented. For example, a week's worth of data can be regularly transmitted by the headend and stored in the set-top terminal's internal memory for display on demand by the subscriber. Other data, however, can be specifically requested by the set-top terminal when the subscriber wishes to view program information not regularly stored in the set-top terminal. Alternatively, rather than requesting the not-regularly-stored information, the terminal can wait for the data to be transmitted in an approach similar to the second approach above. As another example, the program summary data can be received and stored in the terminal's internal memory on a regular basis, with any full description information being requested from the headend by the set-top terminal as required.

Figure 28:
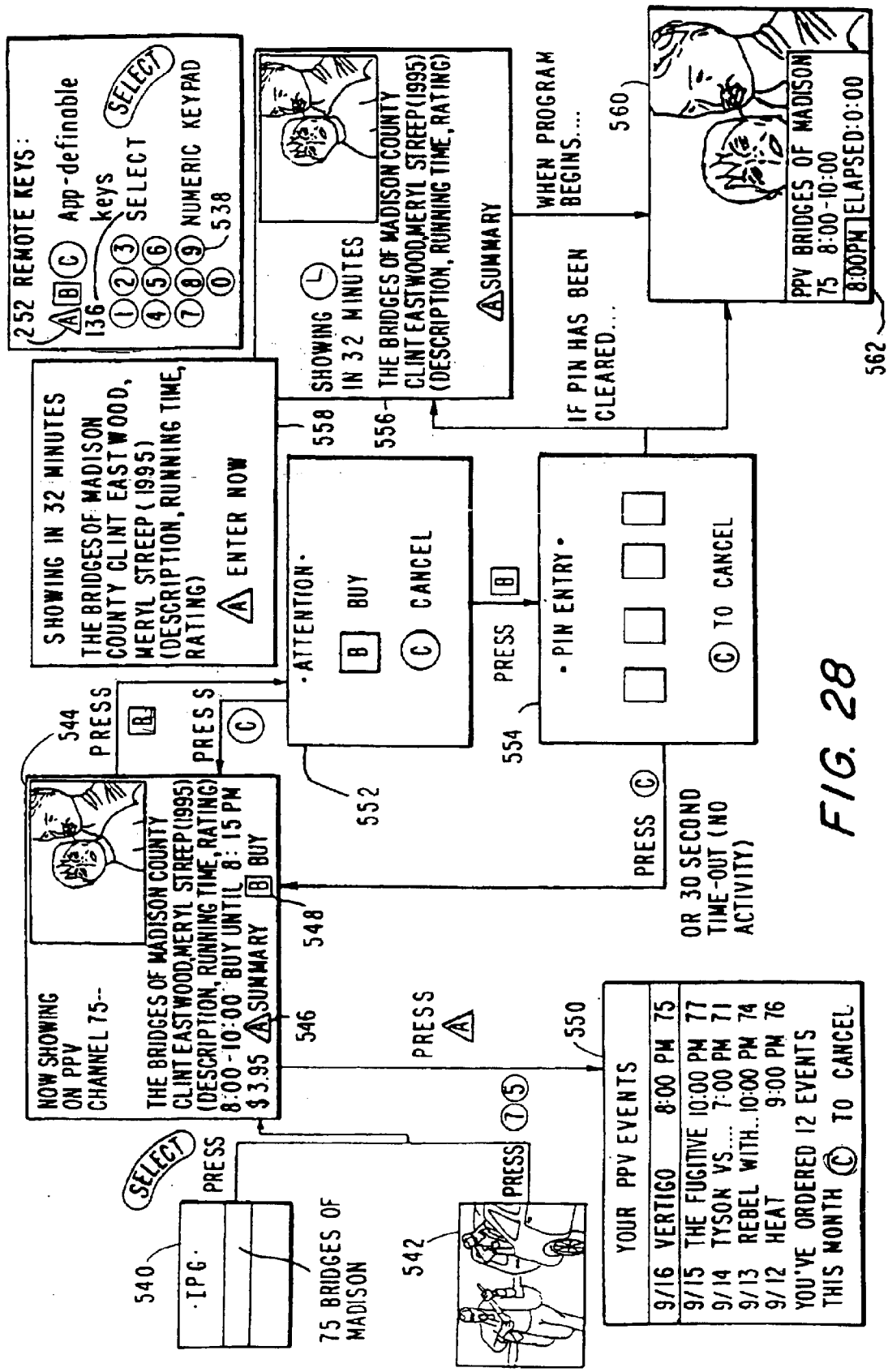
FIG. 28 is a flow diagram illustrating an Impulse Pay-Per-View function of a set-top terminal of a preferred embodiment of the present invention.

FIG. 28 illustrates a process for purchasing an Impulse Pay-Per-View (IPPV) event within the present invention. Selecting an IPPV channel from either an interactive program guide display 540 or a television display 542 causes an event barker 544 to be displayed. This barker informs the subscriber of a currently showing or upcoming IPPV event. Event barker 544 provides a summary indicator 546 and buy indicator 548 to instruct the subscriber to press "A" application definable key 252 to view a summary of purchased IPPV events 550 or press "B" application definable key 252 to purchase the IPPV event. Upon selecting to purchase the IPPV event, a buy confirmation window 552 is displayed instructing the subscriber to press "B" application definable key 252 again or press "C" application definable key 252 to go back to event barker 544. If the subscriber confirms the purchase of the IPPV event by pressing "B" application definable key 252 at buy confirmation window 552, a PIN entry screen 554 will prompt the subscriber to enter a predefined purchase PIN. If the subscriber correctly enters the predefined purchase PIN and the IPPV event has already started, the set-top terminal will immediately tune to and display the IPPV event as is illustrated in display 560. As is also shown, a program information banner 562 may be displayed momentarily to indicate to the subscriber that the program has been tuned and inform the subscriber of the program's elapsed time. If the subscriber has correctly entered the predefined purchase PIN and the event has not yet started or is a Near-Video-On-Demand (NVOD) or Pay-Per-Day (PPD) event, a countdown barker 556 will be displayed informing the subscriber of the time remaining until the beginning of the next showing of the program. At the time the program begins, the set-top terminal will automatically tune to and display the IPPV event. As illustrated by barker 558, the set-top terminal may give the subscriber the option of entering an IPPV event during the current showing by pressing "A" application definable key 252 when the IPPV event is a NVOD or PPD event.

Figure 29:
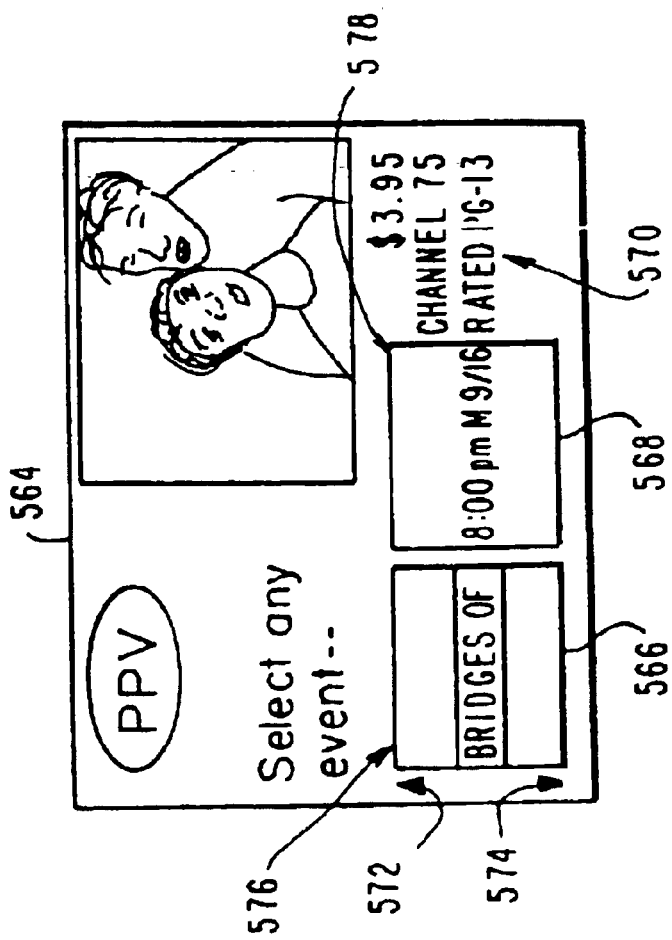
FIG. 29 is an illustrative screen display of an Impulse Pay-Per-View barker of an Impulse Pay-Per-View function of a set-top terminal of a preferred embodiment of the present invention.

FIG. 29 illustrates an alternative means through which a subscriber may select an IPPV event for purchase rather than selecting individual channels for each IPPV event. As shown an interactive barker 564 allows the subscriber to select an IPPV program title from a list of titles 566 and a time from a list of times 568. The subscriber may scroll through the lists of titles 566 by pressing up and down arrow keys (not shown) as indicated by up and down arrow indicators 572 and 574. After selecting a program, an IPPV program information banner 570 then indicates to the subscriber the program price, channel, rating, etc. To scroll the list of times 568, the subscriber presses left and right arrow keys (not shown) as indicated by left and right arrow indicators 576 and 578. Much like event barker 544 (FIG. 28), from barker 564 the subscriber may display a summary of IPPV purchases by pressing "A" application definable key 252 or purchase the selected program by pressing "B" application definable key 252.

Figure 30:
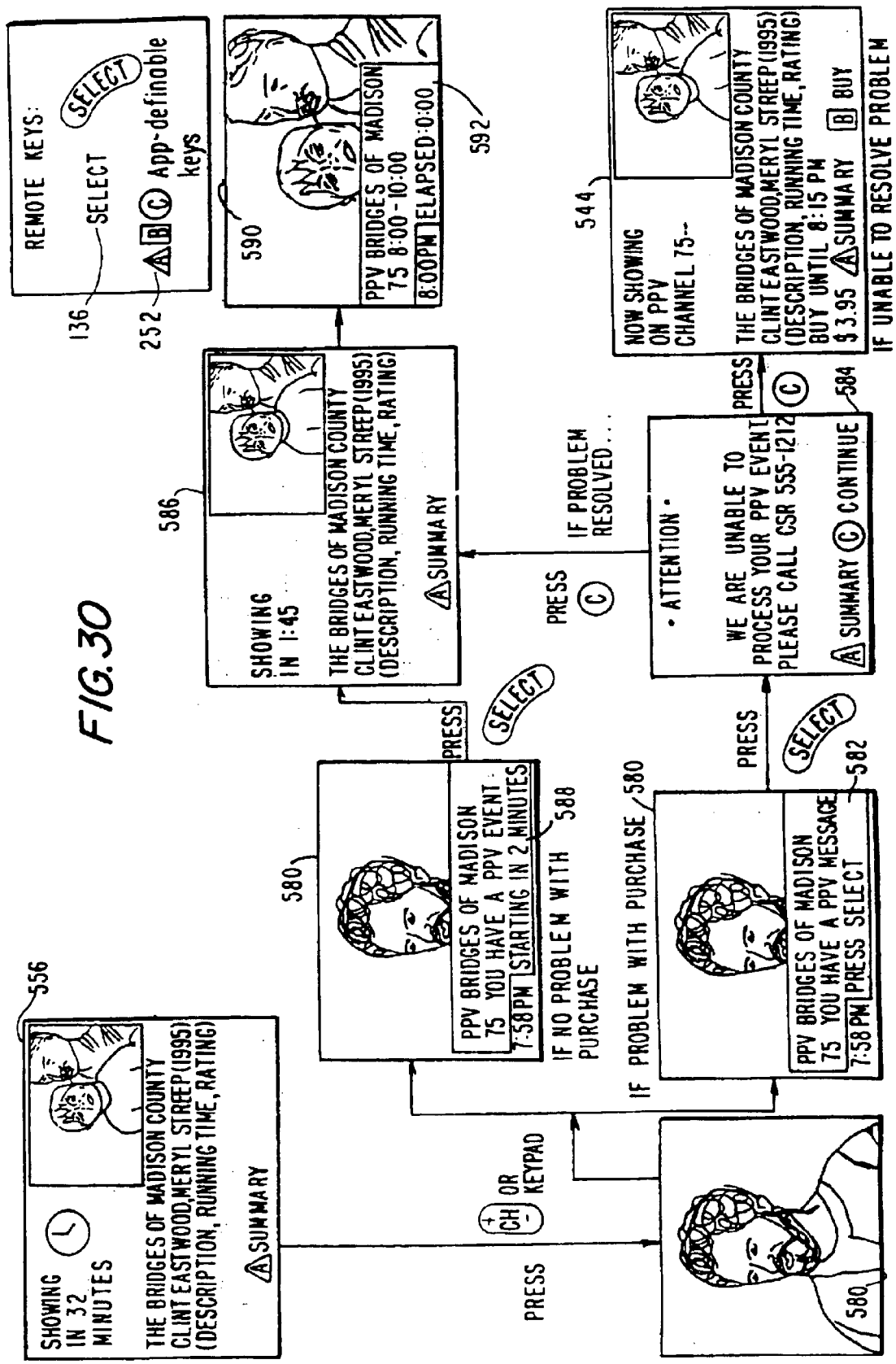
FIGS. 30–32 are flow diagrams illustrating the operation of an Impulse Pay-Per-View function of a set-top terminal of a preferred embodiment of the present invention.

Referring to FIG. 30, the operation of the countdown mechanism for IPPV purchases is now described. After a countdown barker 556 is displayed confirming the purchase of a future IPPV event, the subscriber is free to change channels to watch another program 580 while awaiting the IPPV event. If a problem occurs in purchasing the desired IPPV event, a message banner 582 will be displayed to indicate to the subscriber the presence of a problem. If the subscriber presses select key 136 in response to banner 582, a more detailed window 584 will be displayed to indicate to the subscriber how to proceed. Upon exiting window 584 by pressing "C" application definable key 252, the subscriber will return to event barker 544 if the purchase problem has not been resolved. If the purchase problem has been resolved, an updated countdown barker 586 will be displayed. If no purchase problems are encountered while viewing program 580, a notification banner 588 will be displayed at least one time period before the beginning of the IPPV event. By pressing select key 136 in response to barker 588, the subscriber will cause the set-top terminal to display an updated countdown barker 586. At the time the IPPV event begins, the IPPV event will be selected and displayed as illustrated by display 590. Along with display 590, a program information banner 592 may be displayed to indicate to the subscriber that the IPPV event has begun.

Figure 31:
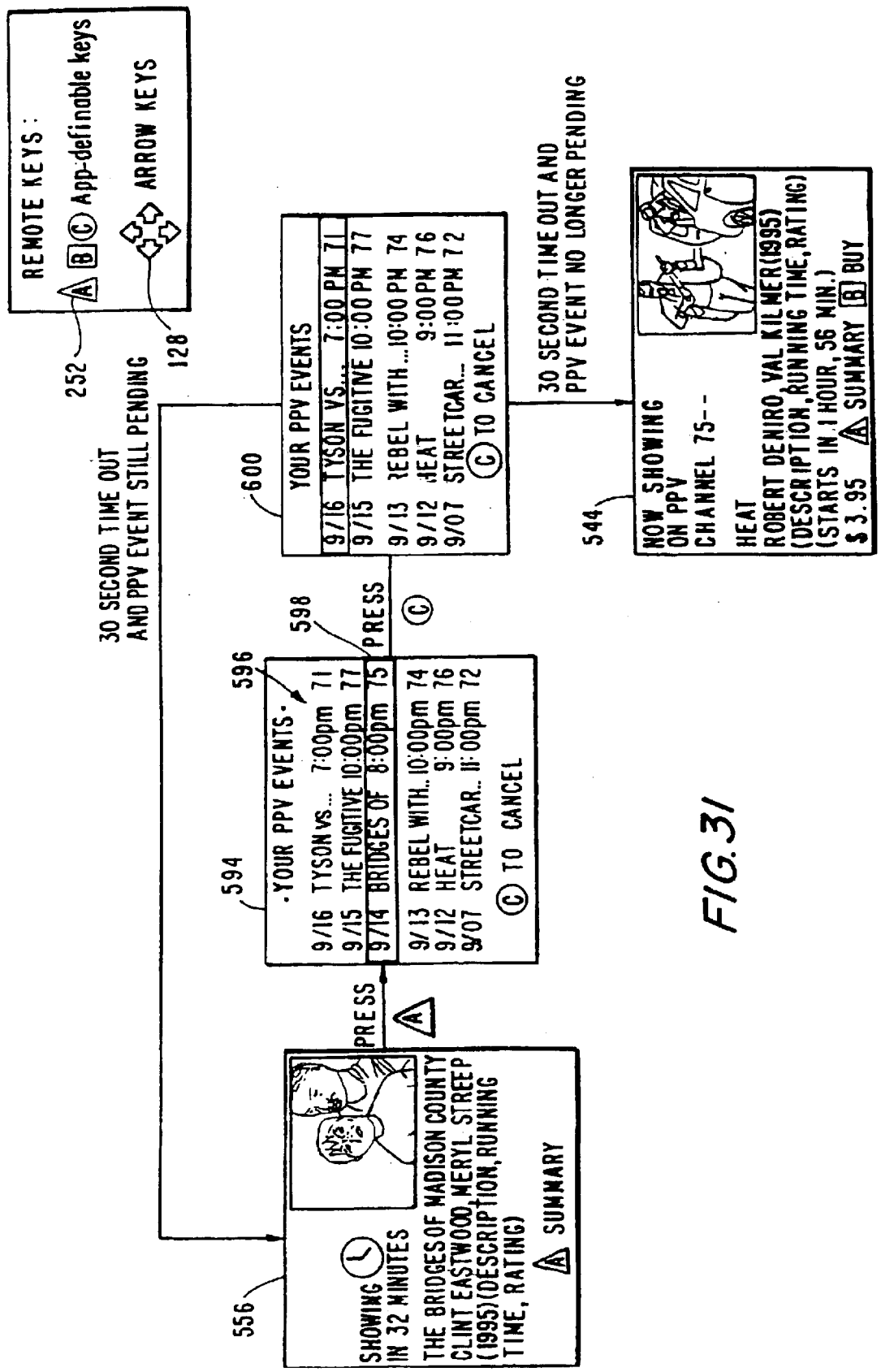

Preferred embodiments of the present invention incorporate a method for canceling pending IPPV purchases as illustrated in FIG. 31. By entering an IPPV summary display 594 from a countdown barker 556 (or any other display) by pressing "A" application definable key 252, a list 596 of pending and past IPPV purchases is displayed. After using up and down arrow keys 128 to highlight a pending purchase 598, the subscriber may cancel purchase 598 by pressing "C" application definable key 252. Once purchase 598 has been canceled, an updated summary display 600 is presented. After a brief period (e.g., 30 seconds) of inactivity, the display will revert to countdown barker 556 (if the IPPV event of barker 556 is still pending) or an event barker 544 for that IPPV channel.

Figure 32:
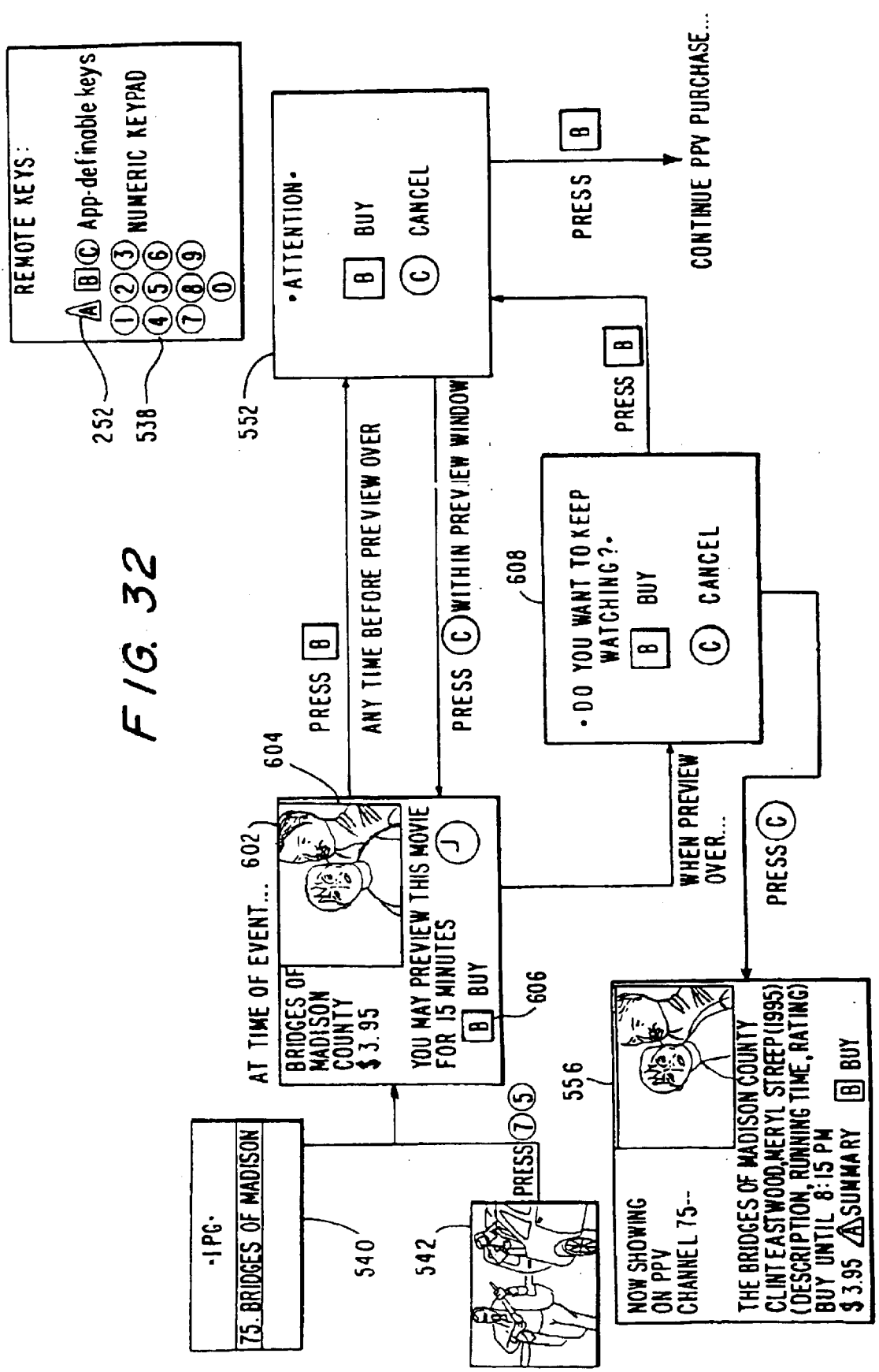

The free preview feature of the present invention is illustrated in FIG. 32. After selecting an IPPV channel from an interactive program guide display 540 or a normal television display 542, set-top terminal 6 may display a preview barker 602 showing a free preview of an IPPV event in a preview window 604. In response to barker 602, the subscriber may elect to buy the IPPV event by pressing "B" application definable key 252 as indicated by a buy option indicator 606. Set-top terminal 6 will then display a confirmation barker 552 to confirm the purchase request. In response, the subscriber may confirm the purchase request by pressing "B" key 252 again after which set-top terminal 6 will continue the IPPV purchase in accord with FIG. 28, or cancel the request by pressing "C" application definable key 252 after which the display will revert to preview barker 602. If the subscriber does not press "B" key 252 in response to preview barker 602 and the time period for the preview expires, a preview expiration barker 608 will be displayed. Expiration barker 608 allows the subscriber to return to event barker 556 by pressing "C" application definable key 252 or to purchase the IPPV event, and therefore continue to the confirmation barker 552, by pressing "B" application definable key 252.

Preferred embodiments of the present invention also provide for the operation of Near-Video-On-Demand (NVOD) programs. NVOD allows a program to be viewed more frequently than traditional IPPV events. This is accomplished in the present invention by transmitting the same program using two or more sources, each beginning a fixed period of time after the others. For example, transmitting an hour long program on four channels, each fifteen minutes apart, allows the program to be viewed beginning every fifteen minutes. In this way, the video is near on demand—the prospective subscriber only has to wait at most fifteen minutes to view the program.

Figure 33:
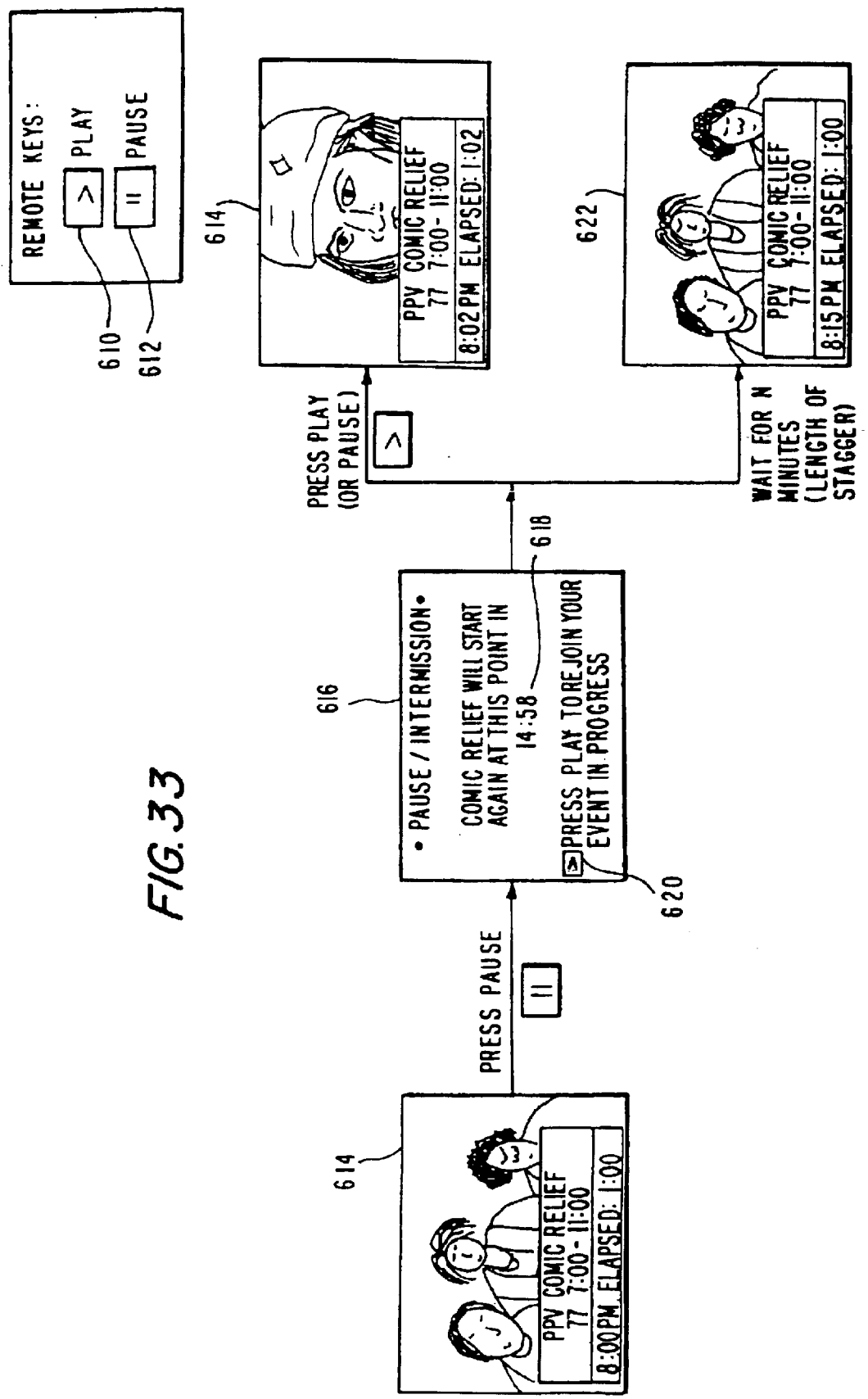
FIGS. 33–34 are flow diagrams illustrating the operation of a Near-Video-On-Demand function of a set-top terminal of a preferred embodiment of the present invention.

A pause feature is incorporated into the NVOD feature of the preferred embodiments of the present invention as illustrated in FIG. 33. The pause feature operates by presenting a pause barker 616 when the subscriber presses pause key 612 while viewing a NVOD event 614. Pause barker 616 notifies the subscriber that the program is "paused" and provides a countdown timer 618 informing the subscriber when the program will resume. This countdown timer begins with a time equivalent to the delay between consecutive transmissions of the same program. Upon expiration of countdown timer 618, the pause feature automatically switches to subsequent transmission 622 of the program. In this way, the program appears to have been paused for the fixed period of time. Alternatively, the subscriber can elect to continue viewing current transmission 614 of the program by pressing play key 610 as indicated by play indicator 620. By pressing play key 610, pause barker 616 is removed from display, transmission 614 is displayed, and any part of transmission 614 during which pause barker 616 was displayed is lost.

Figure 34:
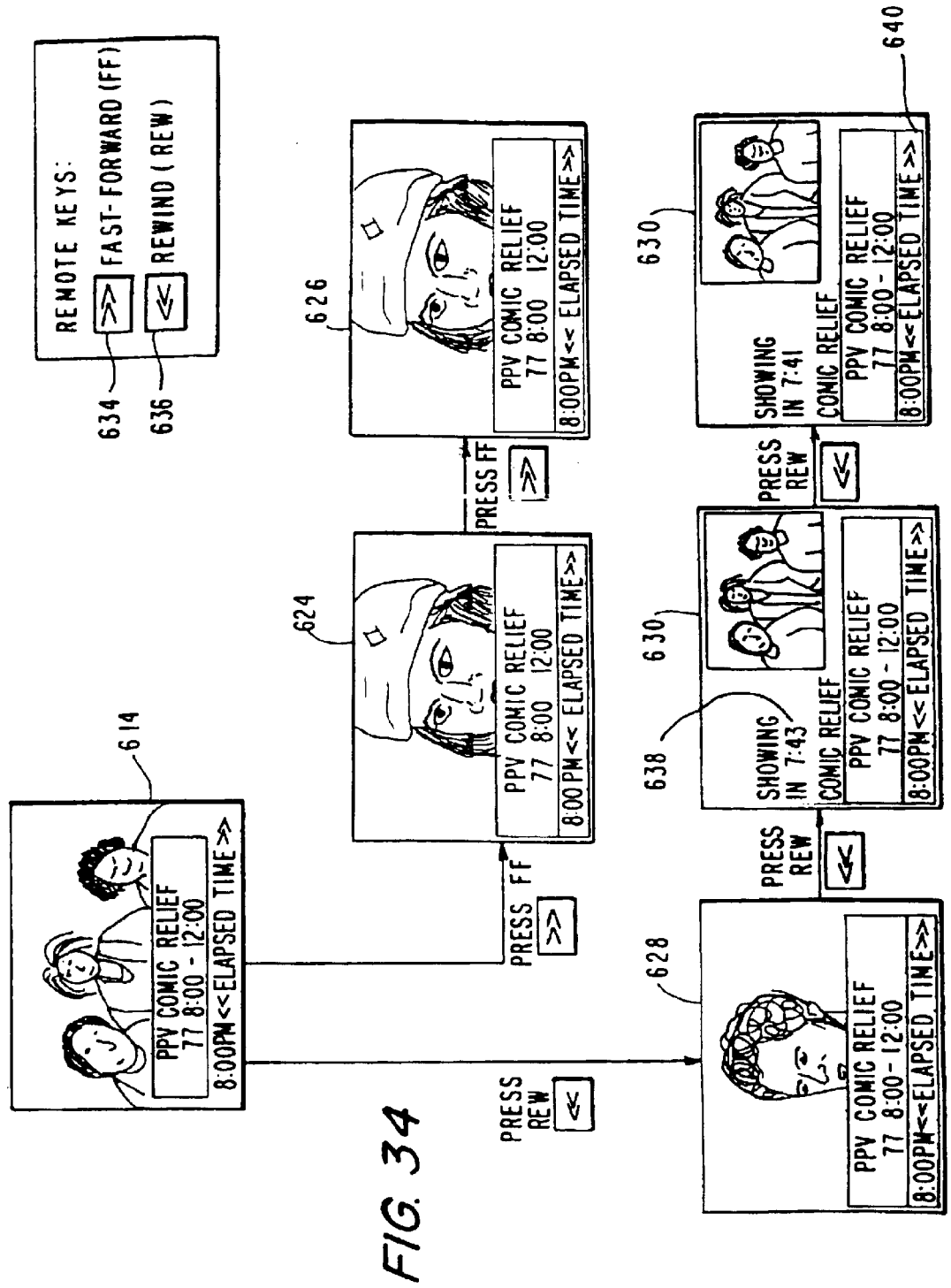

Similarly, NVOD provides skip forward and skip backward capabilities as well. As illustrated in FIG. 34, pressing fast-forward (FF) key 634 while viewing an nth transmission 614 of an NVOD program causes set-top terminal 6 to tune to (n−1)th transmission 624 of the same NVOD program—that is the transmission which began immediately prior to the nth transmission. Pressing FF key 634 again causes the set-top terminal to select (n−2)th transmission 626 of the NVOD program. Likewise, pressing rewind (REW) key 636 while viewing nth transmission 614 of an NVOD program causes the set-top terminal to tune to (n+1)th transmission 628 of the NVOD program. In instances where the subscriber presses REW key 636 and an (n+2)th transmission has not yet begun, a delay barker 630 is displayed indicating that the NVOD program cannot be skipped backward any further. Delay barker 630 displays a countdown timer 638 indicating to the subscriber the amount of time remaining before the (n+2)th transmission of the NVOD program begins. Pressing REW key 636 again with the delay barker 630 displayed causes the barker to indicate to the subscriber that the program cannot be further skipped backward by blinking the "elapsed time" text 640.

The present invention also incorporates a message transmission system. Messages may be sent from headend 2 to one or more subscribers at one or more set-top terminals 6, or may be sent from one subscriber within a household to another (e.g., automatic message from mother to son sent every Monday night at 8:15 p.m.: "take out trash"). The messages may be displayed upon the occurrence of a predetermined action by the subscriber or immediately by overriding whatever channel was previously being viewed by the subscriber. For example, FIG. 35 illustrates the display of an emergency broadcast message 642. As indicated by select key indicator 644, the subscriber can press the select key (not shown), or any other key, to get more information regarding the message being displayed. In response to the subscriber pressing select key 136, set-top terminal 6 may switch to another channel to display more information or display another message. Additionally, messages may be configured to turn on set-top terminal 6 and an attached television or other appliance to automatically display an important message. In this way, a subscriber can be effectively alerted to a crisis situation without the subscriber watching television at the time of the transmission. Messages can also activate a particular service within the set-top terminal. For example, a message can cause the set-top terminal to switch to and display a particular service on the subscriber's television. To indicate the presence of a message in set-top terminal 6, an LED on the terminal's face may illuminate or an icon may be incorporated into the display screen until a subscriber presses a key or a fixed amount of time has passed.

One skilled in the art will appreciate that the present invention can be practiced by other than the described embodiments, which are presented for purposes of illustration and not of limitation, and the present invention is limited only by the claims which follow.

What is claimed is:

1. An interactive program guide for displaying information regarding a plurality of television programs on an interactive program guide display, said interactive program guide comprising:
   a grid having a plurality of cells, each cell corresponding to a television program; and
   an indicator for designating a cell, said indicator anchored at a fixed position with respect to said display; wherein:
   said grid is moveable with respect to said indicator in two directions in each of two dimensions such that different cells can be designated by said indicator at said fixed position by movement of said grid.

2. The interactive program guide of claim 1 wherein said cells move horizontally and vertically with respect to said indicator.

3. The interactive program guide of claim 1 wherein said cells have a plurality of sizes and said indicator changes size to highlight a cell after said grid is moved.

4. The interactive program guide of claim 1 wherein said cells scroll in at least one of said two dimensions with respect to said indicator.

5. The interactive program guide of claim 1 wherein said indicator comprises a cursor.

6. A system for providing an interactive program guide that displays information regarding a plurality of television programs on an interactive program guide display, said system comprising:
   a receiver for receiving said information;
   a display driver for generating displayable video output for said display;
   a grid control for receiving user inputs; and
   a processor for causing said display driver to:
      display on said display a grid having a plurality of cells, each cell including at least a portion of said information received by said receiver;
      display on said display an indicator for designating a cell, said indicator anchored at a fixed position with respect to said display; and
      move said grid on said display in two directions in each of two dimensions with respect to said indicator at said fixed position in accordance with said user inputs received by said grid control.

7. The system of claim 6 wherein said grid can be moved horizontally and vertically with respect to said indicator.

8. The system of claim 6 wherein said cells have a plurality of cell sizes and said indicator can change size to highlight a cell after said processor causes said display driver to move said grid.

9. The system of claim 6 wherein said indicator comprises a cursor.

10. A system for providing an interactive program guide that displays information regarding a plurality of television programs on an interactive program guide display, said display including a grid of cells, each cell corresponding to a television program, said system comprising:
  means for designating a cell on said display at a fixed position with respect to said display; and
  means for moving said grid in each of two dimensions with respect to said fixed position such that different cells can be designated by said means for designating by movement of said grid, said movement independent of said means for designating.

11. The interactive program guide of claim 10 wherein said means for moving moves said grid horizontally and vertically with respect to said fixed position.

12. The interactive program guide of claim 10 wherein said means for moving scrolls said cells in at least one of said two dimensions with respect to said fixed position.

13. The interactive program guide of claim 12 wherein said means for moving scrolls said cells horizontally and vertically with respect to said fixed position.

14. A method of designating a cell in a grid of cells, said cells displaying information regarding a plurality of television programs on an interactive program guide display, said method comprising:
  designating any cell at only one fixed position on said display;
  moving said grid in a first direction in a first dimension to designate a first cell upon said first cell moving into said fixed position;
  moving said grid in a second direction in said first dimension to designate a second cell upon said second cell moving into said fixed position;
  moving said grid in both said first direction in said first dimension and said first direction in said second dimension to designate a third cell upon said third cell moving into said fixed position; and
  moving said grid in both said second direction in said first dimension and said second direction in said second dimension to-designate a fourth cell upon said fourth cell moving into said fixed position, wherein said first and second directions of said first dimension are opposite each other.

15. The method of claim 14 wherein said moving said grid in both said first direction in said first dimension and said first direction in said second dimension comprises moving said grid horizontally rightward and vertically downward with respect to said fixed position.

16. The method of claim 14 wherein said moving said grid in both said second direction in said first dimension and said second direction in said second dimension comprises scrolling said cells horizontally leftward and vertically upward with respect to said fixed position.

17. An interactive program guide for displaying information regarding a plurality of television programs on an interactive program guide display, said interactive program guide comprising:
  a grid having a plurality of cells, each cell corresponding to a television program; and
  an indicator having a fixed position on said display; wherein:
    said grid is moveable in each of two dimensions with respect to said indicator, said indicator highlighting a cell when said cell is positioned at said fixed position, said grid movement independent of said indicator fixed position.

18. The interactive program guide of claim 17 wherein said indicator comprises a cursor.

19. Software on a computer readable medium for designating a cell in a grid of cells, said cells displaying information regarding a plurality of television programs on an interactive program guide display, said software comprising;
  establishing only one fixed position on said display at which cells are designated;
  allowing said grid to move with respect to said fixed position in each of two directions in each of two dimensions; and
  designating a cell when said cell is positioned at said established position.

20. A method of designating a cell in a grid of cells, said cells displaying information regarding a plurality of television programs on an interactive program guide display, said method comprising;
  designating a cell on said display at a fixed position with respect to said display; and
  moving said grid in each of two dimensions with respect to said fixed position such that different cells can be designated at said fixed position by said moving of said grid, said moving independent of said designating.

* * * * *